(12) United States Patent
Gogotsi et al.

(10) Patent No.: US 10,873,107 B2
(45) Date of Patent: Dec. 22, 2020

(54) ADDITIVES FOR SUPPRESSING DENDRITIC GROWTH IN BATTERIES

(71) Applicant: Drexel University, Philadelphia, PA (US)

(72) Inventors: Yury Gogotsi, Ivyland, PA (US); Meng-Qiang Zhao, Philadelphia, PA (US); Xin-Bing Cheng, Beijing (CN)

(73) Assignee: Drexel University, Philadelphia, PA (US)

( * ) Notice: Subject to any disclaimer, the term of this patent is extended or adjusted under 35 U.S.C. 154(b) by 122 days.

(21) Appl. No.: 16/050,987

(22) Filed: Jul. 31, 2018

(65) Prior Publication Data

US 2019/0044185 A1 Feb. 7, 2019

Related U.S. Application Data

(60) Provisional application No. 62/539,609, filed on Aug. 1, 2017.

(51) Int. Cl.
*H01M 10/0562* (2010.01)
*H01M 10/052* (2010.01)
(Continued)

(52) U.S. Cl.
CPC ..... *H01M 10/0562* (2013.01); *H01M 10/052* (2013.01); *H01M 10/054* (2013.01); *H01M 10/0567* (2013.01); *H01M 10/0568* (2013.01); *H01M 10/0569* (2013.01); *C01B 11/062* (2013.01); *C01B 21/064* (2013.01); *C01B 21/072* (2013.01); *C01D 13/00* (2013.01);
(Continued)

(58) Field of Classification Search
None
See application file for complete search history.

(56) References Cited

U.S. PATENT DOCUMENTS

| 5,427,872 A | 6/1995 | Shen et al. |
| 9,193,595 B2 | 11/2015 | Barsoum et al. |

(Continued)

FOREIGN PATENT DOCUMENTS

| WO | WO2012177712 A1 | 12/2012 |
| WO | WO2015148450 A1 | 10/2015 |

(Continued)

OTHER PUBLICATIONS

Bai, Peng, et al. "Transition of lithium growth mechanisms in liquid electrolytes." Energy & Environmental Science 9.10 (2016): 3221-3229.

(Continued)

*Primary Examiner* — Daniel S Gatewood
(74) *Attorney, Agent, or Firm* — Mendelsohn Dunleavy, P.C.

(57) ABSTRACT

Battery electrolytes comprising: (a) a solvent suitable for use in a battery electrolyte such as an organic liquid solvent or an ionic liquid; (b) a lithium ion or sodium ion salt suitable for use in a battery electrolyte; and (c) a dispersion of nanoparticles of carbon, metal or metalloid oxides or hydroxides, carbides, nitrides, sulfides, graphene or MXene particles; or a combination thereof. The present invention is also directed to battery cells and batteries comprising these electrolytes and devices comprising these battery cells and batteries.

13 Claims, 39 Drawing Sheets

(51) Int. Cl.
| | |
|---|---|
| H01M 10/0569 | (2010.01) |
| H01M 10/0567 | (2010.01) |
| H01M 10/0568 | (2010.01) |
| H01M 10/054 | (2010.01) |
| C01B 11/06 | (2006.01) |
| C01D 13/00 | (2006.01) |
| C01B 21/072 | (2006.01) |
| C01B 21/064 | (2006.01) |
| C01D 15/00 | (2006.01) |

(52) U.S. Cl.
CPC ... *C01D 15/005* (2013.01); *H01M 2300/0028* (2013.01); *H01M 2300/0045* (2013.01); *H01M 2300/0068* (2013.01)

(56) References Cited

U.S. PATENT DOCUMENTS

| | | | |
|---|---|---|---|
| 9,576,694 | B2 | 2/2017 | Gogotsi et al. |
| 9,663,372 | B2 | 5/2017 | Gogotsi et al. |
| 2010/0239918 | A1* | 9/2010 | Pratt ............... H01M 10/056 429/307 |
| 2014/0178770 | A1 | 6/2014 | Xu et al. |
| 2015/0050537 | A1 | 2/2015 | Christensen et al. |
| 2015/0050543 | A1 | 2/2015 | Christensen et al. |
| 2017/0194663 | A1* | 7/2017 | Zhamu ............... H01M 4/134 |

FOREIGN PATENT DOCUMENTS

| | | |
|---|---|---|
| WO | WO2016049109 A2 | 3/2016 |
| WO | WO2017011044 A2 | 1/2017 |

OTHER PUBLICATIONS

Cheng, Xin-Bing, et al. "Dendrite-Free Nanostructured Anode: Entrapment of Lithium in a 3D Fibrous Matrix for Ultra-Stable Lithium-Sulfur Batteries." Small 10.21 (2014): 4257-4263.

Cheng, Xin-Bing, et al. "Dual-phase lithium metal anode containing a polysulfide-induced solid electrolyte interphase and nanostructured graphene framework for lithium-sulfur batteries." ACS nano 9.6 (2015): 6373-6382.

Cheng, Xin-Bing, et al. "Dendrite-Free Lithium Deposition Induced by Uniformly Distributed Lithium Ions for Efficient Lithium Metal Batteries." Advanced Materials 28.15 (2016): 2888-2895.

Cheng, Xin-Bing, et al. "A review of solid electrolyte interphases on lithium metal anode." Advanced Science 3.3 (2016): 1500213.

Ding, Fei, et al. "Dendrite-free lithium deposition via self-healing electrostatic shield mechanism." Journal of the American Chemical Society 135.11 (2013): 4450-4456.

Heine, Jennifer, et al. "Coated Lithium Powder (CLiP) Electrodes for Lithium-Metal Batteries." Advanced Energy Materials 4.5 (2014): 1300815.

Huang, Cheng, et al. "Manipulating surface reactions in lithium-sulphur batteries using hybrid anode structures." Nature communications 5 (2014): 3015.

Ji, Xiulei, Kyu Tae Lee, and Linda F. Nazar. "A highly ordered nanostructured carbon-sulphur cathode for lithium-sulphur batteries." Nature materials 8.6 (2009): 500.

Krueger, Anke, et al. "Deagglomeration and functionalisation of detonation diamond." physica status solidi (a) 204.9 (2007): 2881-2887.

Lee, Jaesong, and Jan B. Talbot. "Simulation of Particle Incorporation during Electrodeposition Process Primary and Secondary Currect Distributions." Journal of The Electrochemical Society 152.10 (2005): C706-C715.

Li, Weiyang, et al. "The synergetic effect of lithium polysulfide and lithium nitrate to prevent lithium dendrite growth." Nature communications 6 (2015): 7436.

Liang, Zheng, et al. "Polymer nanofiber-guided uniform lithium deposition for battery electrodes." Nano letters 15.5 (2015): 2910-2916.

Lin, Dingchang, et al. "Layered reduced graphene oxide with nanoscale interlayer gaps as a stable host for lithium metal anodes." Nature nanotechnology 11.7 (2016): 626.

Lu, Lei-Lei, et al. "Free-standing copper nanowire network current collector for improving lithium anode performance." Nano letters 16.7 (2016): 4431-4437.

Lu, Yingying, Zhengyuan Tu, and Lynden A. Archer. "Stable lithium electrodeposition in liquid and nanoporous solid electrolytes." Nature materials 13.10 (2014): 961.

Miao, Rongrong, et al. "Novel dual-salts electrolyte solution for dendrite-free lithium-metal based rechargeable batteries with high cycle reversibility." Journal of Power Sources 271 (2014): 291-297.

Medelien, V., V. Stankevič, and G. Bikulčius. "The influence of artificial diamond additions on the formation and properties of an electroplated copper metal matrix coating." Surface and Coatings Technology 168.2-3 (2003): 161-168.

Mochalin, Vadym N., and Yury Gogotsi. "Wet chemistry route to hydrophobic blue fluorescent nanodiamond." Journal of the American Chemical Society 131.13 (2009): 4594-4595.

Mochalin, Vadym N., et al. "The properties and applications of nanodiamonds." Nature nanotechnology 7.1 (2012): 11.

Pavlatou, E. A., et al. "Hardening effect induced by incorporation of SiC particles in nickel electrodeposits." Journal of Applied Electrochemistry 36.4 (2006): 385-394.

Peled, Emanuel. "The electrochemical behavior of alkali and alkaline earth metals in nonaqueous battery systems—the solid electrolyte interphase model." Journal of The Electrochemical Society 126.12 (1979): 2047-2051.

Qian, Jiangfeng, et al. "High rate and stable cycling of lithium metal anode." Nature communications 6 (2015): 6362.

Shrestha, Nabeen K., Takashi Takebe, and Tetsuo Saji. "Effect of particle size on the co-deposition of diamond with nickel in presence of a redox-active surfactant and mechanical property of the coatings." Diamond and related materials 15.10 (2006): 1570-1575.

Shkrob, Ilya A., et al. "Why bis (fluorosulfonyl) imide is a "magic anion" for electrochemistry." The Journal of Physical Chemistry C 118.34 (2014): 19661-19671.

Sun, Yongming, Nian Liu, and Yi Cui. "Promises and challenges of nanomaterials for lithium-based rechargeable batteries." Nature Energy 1.7 (2016): 16071.

Tu, Zhengyuan, et al. "Nanostructured electrolytes for stable lithium electrodeposition in secondary batteries." Accounts of chemical research 48.11 (2015): 2947-2956.

Wang, Dong, et al. "Towards High-Safe Lithium Metal Anodes: Suppressing Lithium Dendrites via Tuning Surface Energy." Advanced Science 4.1 (2017): 1600168.

Xu, Hui, et al. "Synthesis and properties of electroless Ni—P-Nanometer Diamond composite coatings." Surface and coatings technology 191.2-3 (2005): 161-165.

Xu, Wu, et al. "Lithium metal anodes for rechargeable batteries." Energy & Environmental Science 7.2 (2014): 513-537.

Yan, Kai, et al. "Selective deposition and stable encapsulation of lithium through heterogeneous seeded growth." Nature Energy 1.3 (2016): 16010.

Yang, Chun-Peng, et al. "Accommodating lithium into 3D current collectors with a submicron skeleton towards long-life lithium metal anodes." Nature communications 6 (2015): 8058.

Yao, Xiayin, et al. "All-solid-state lithium batteries with inorganic solid electrolytes: Review of fundamental science." Chinese Physics B 25.1 (2015): 018802.

Yun, Qinbai, et al. "Chemical dealloying derived 3D porous current collector for Li metal anodes." Advanced Materials 28.32 (2016): 6932-6939.

Zhang, Yaohui, et al. "Dendrite-free lithium deposition with self-aligned nanorod structure." Nano letters 14.12 (2014): 6889-6896.

Zhang, Rui, et al. "Conductive nanostructured scaffolds render low local current density to inhibit lithium dendrite growth." Advanced Materials 28.11 (2016): 2155-2162.

(56) References Cited

OTHER PUBLICATIONS

Zhao, Chen-Zi, et al. "Li2S5-based ternary-salt electrolyte for robust lithium metal anode." Energy Storage Materials 3 (2016): 77-84.

Zheng, Jin, Mingxue Tang, and Yan-Yan Hu. "Lithium Ion Pathway within Li7La3Zr2O12-Polyethylene Oxide Composite Electrolytes." Angewandte Chemie International Edition 55.40 (2016): 12538-12542.

Zhou, Dong, et al. "SiO2 Hollow Nanosphere-Based Composite Solid Electrolyte for Lithium Metal Batteries to Suppress Lithium Dendrite Growth and Enhance Cycle Life." Advanced Energy Materials 6.7 (2016): 1502214.

Zu, Chenxi, et al. "Insight into lithium-metal anodes in lithium-sulfur batteries with a fluorinated ether electrolyte." Journal of Materials Chemistry A 3.28 (2015): 14864-14870.

Aurbach, Doron, et al. "Advances in understanding mechanisms underpinning lithium-air batteries." Nature Energy 1.9 (2016): 16128.

\* cited by examiner

- Working Electrolyte: Adding ODA funtionalized nanodiamonds (NDODA, saturated, < 5 mg/mL) in $LiPF_6$ (1.0 M)-EC/DEC
- Control Electrolyte: LiPF6_$LiPF_6$ (1.0 M)-EC/DEC
- ND-ODA
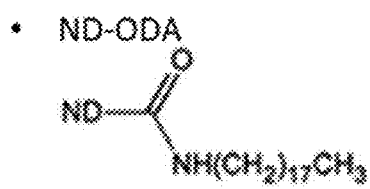
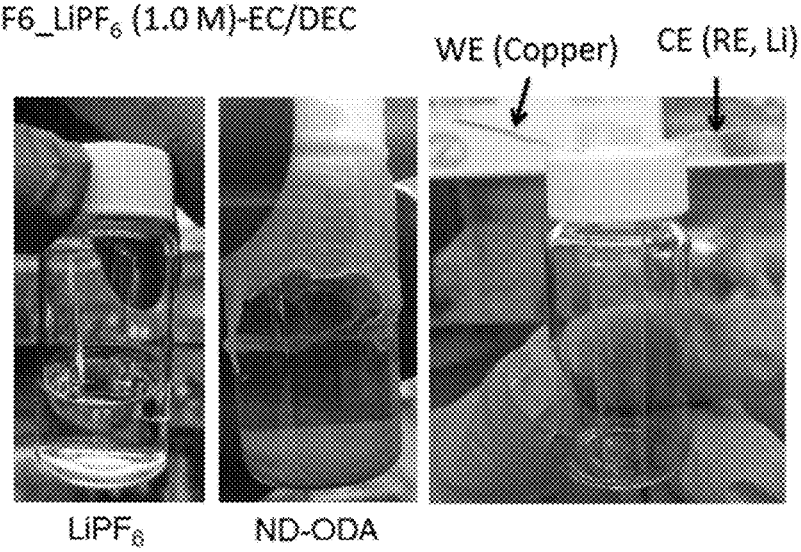
$LiPF_6$  ND-ODA
FIG. 2

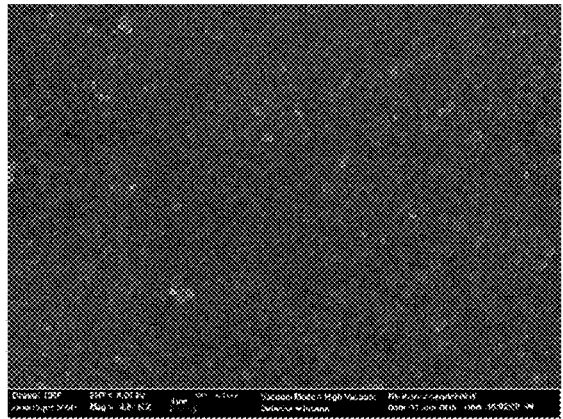 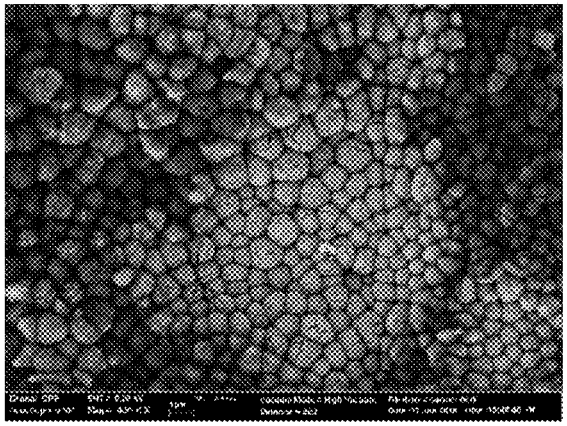
FIG. 7A  FIG. 7B
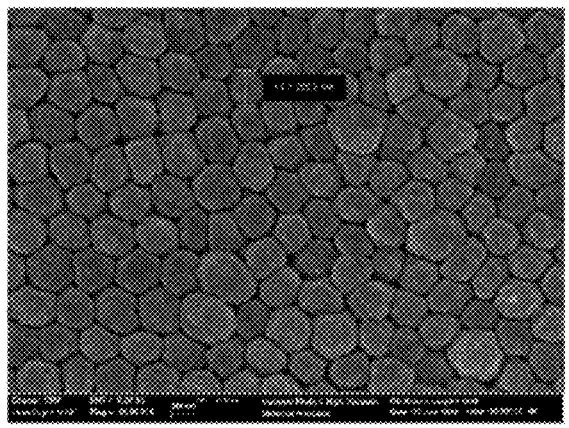 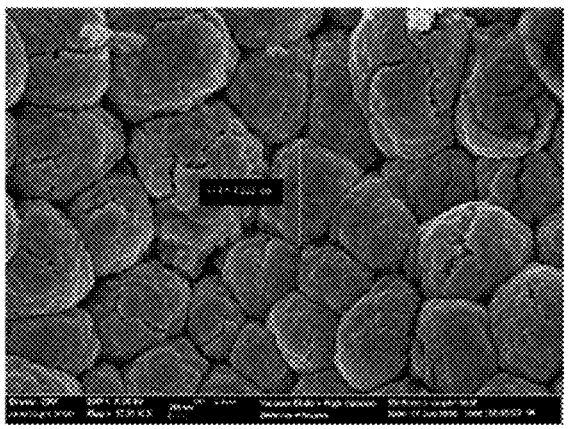
FIG. 7C  FIG. 7D

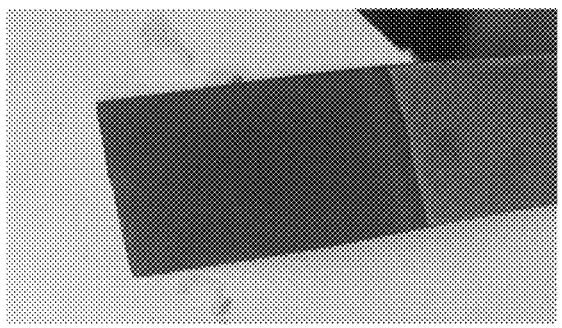
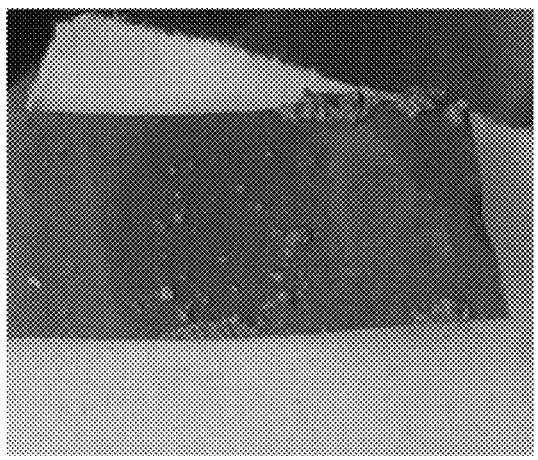
FIG. 10A  FIG. 10B
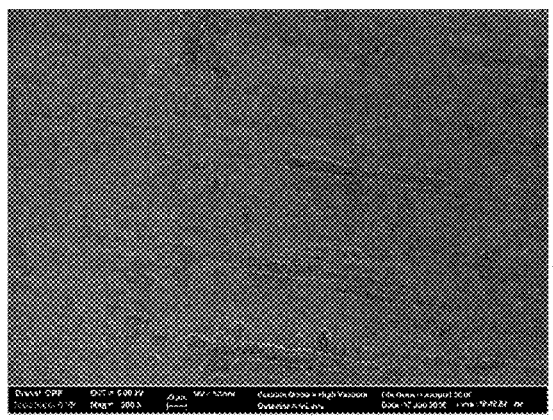
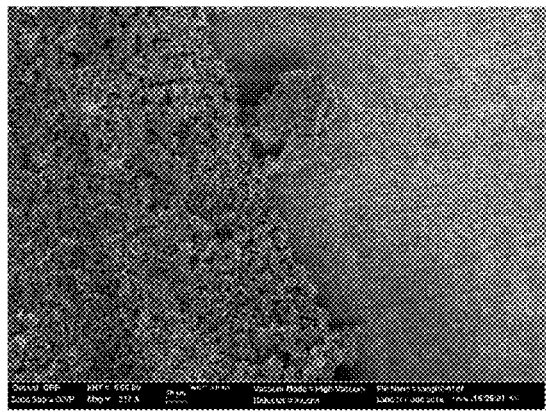
FIG. 10C  FIG. 10D

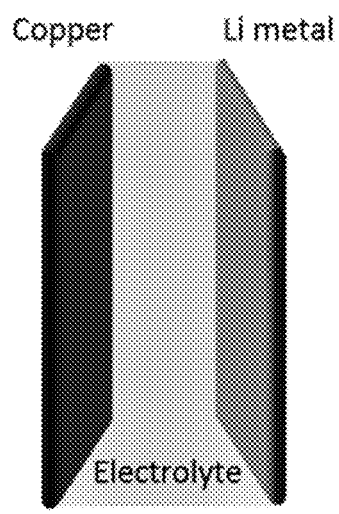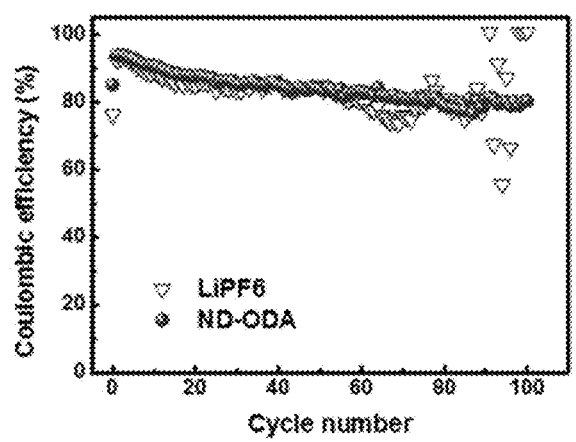
FIG. 12

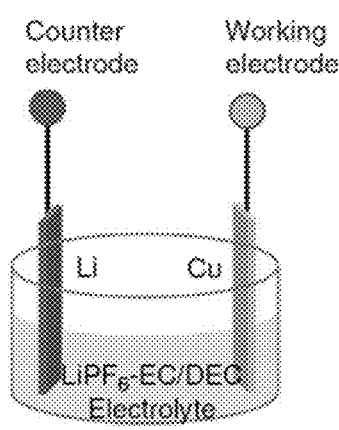
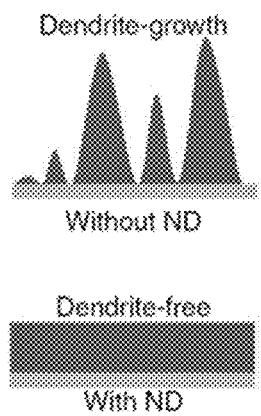
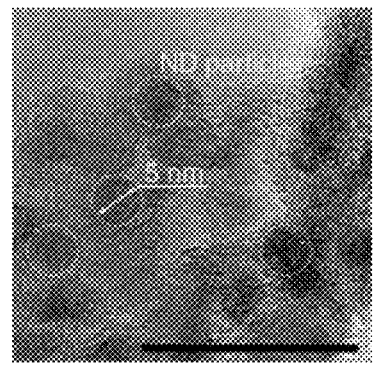
FIG. 15A      FIG. 15B      FIG. 15C
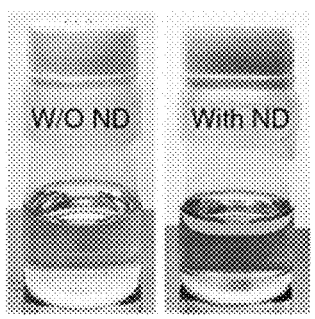
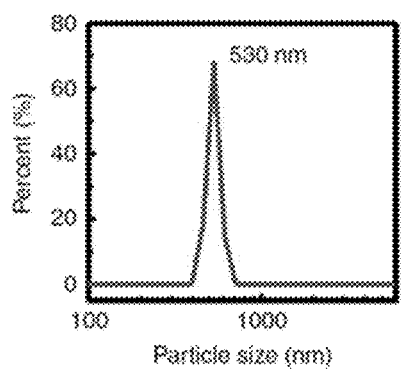
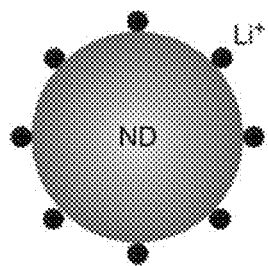
FIG. 15D      FIG. 15E      FIG. 15F

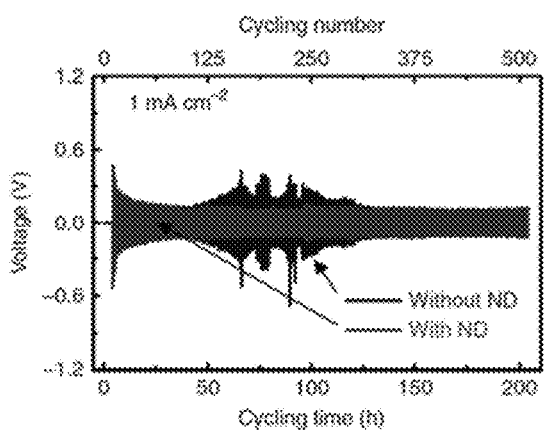 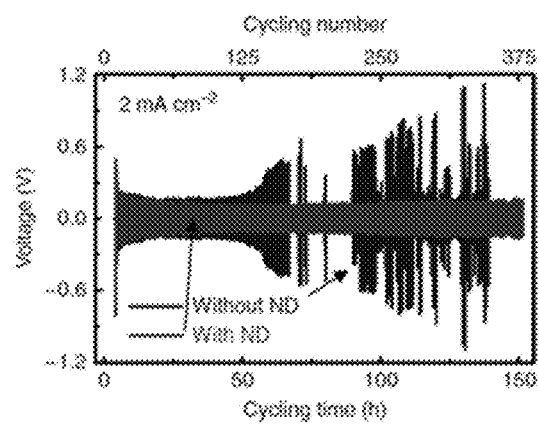
FIG. 18A    FIG. 18B
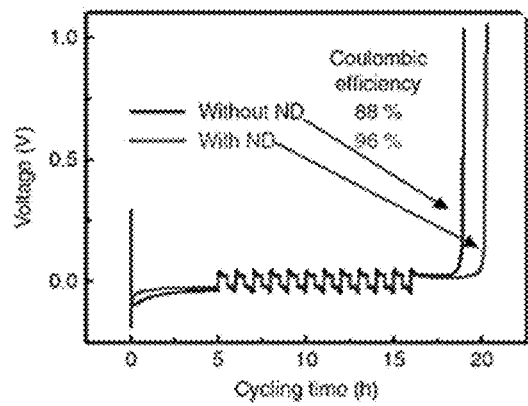 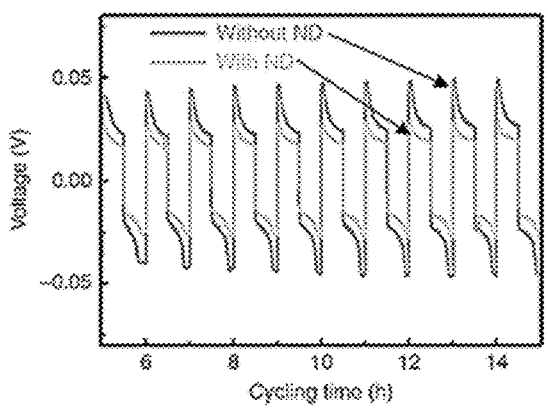
FIG. 18C    FIG. 18D
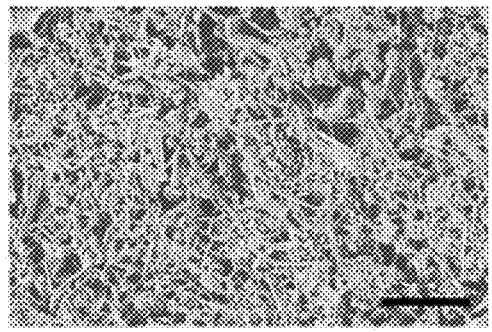 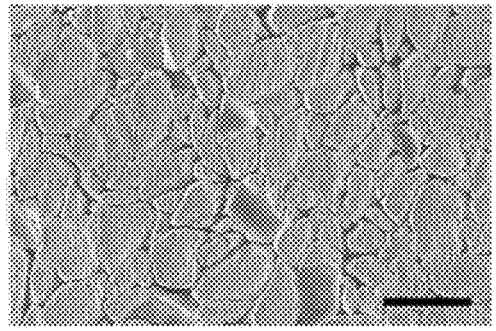
FIG. 18E    FIG. 18F

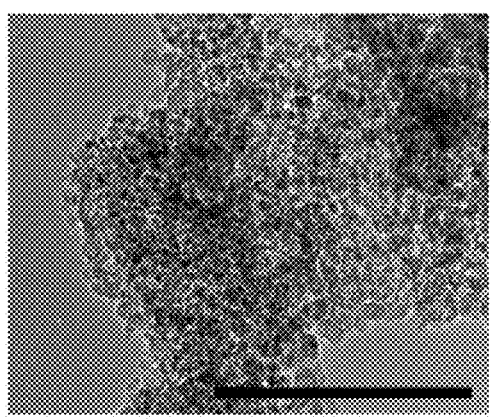
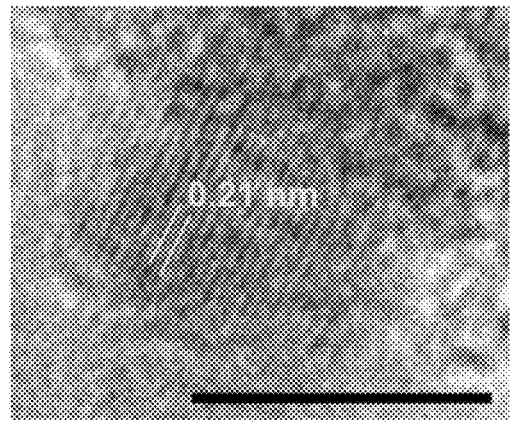
FIG. 20A                    FIG. 20B
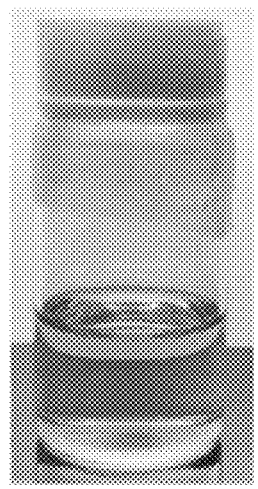
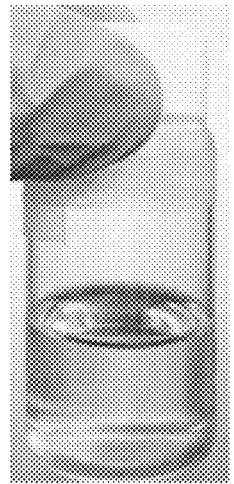
FIG. 20C                    FIG. 20D
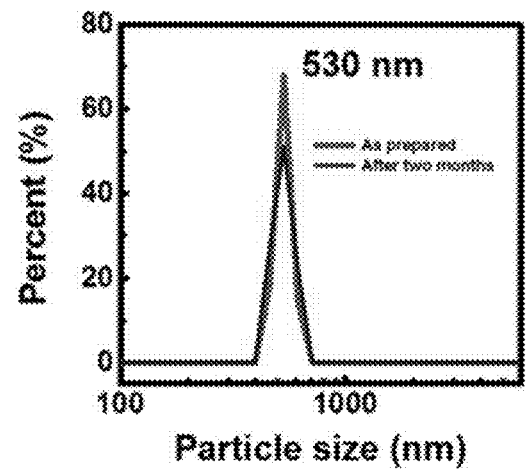
FIG. 20E

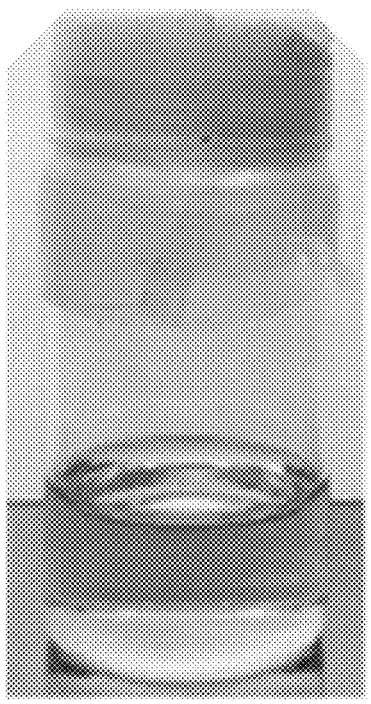 
FIG. 30A                    FIG. 30B

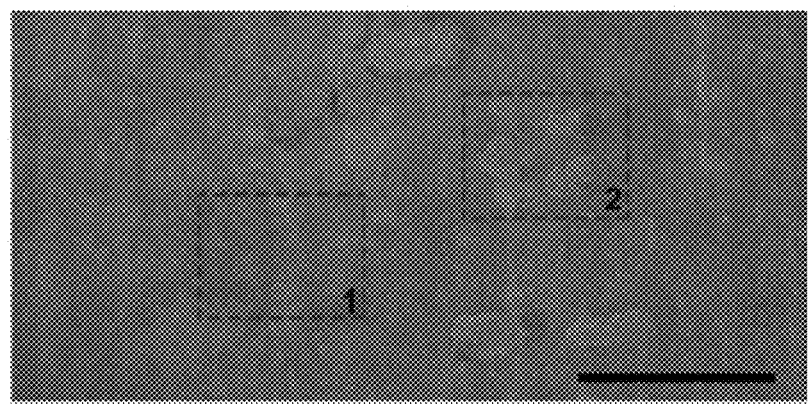
FIG. 31A
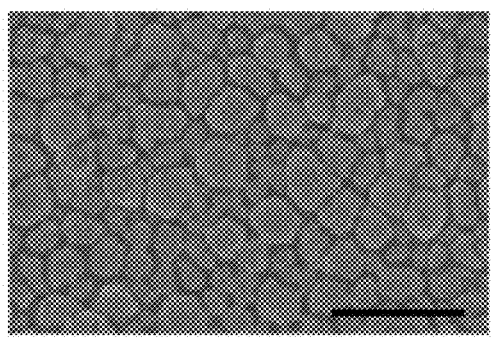 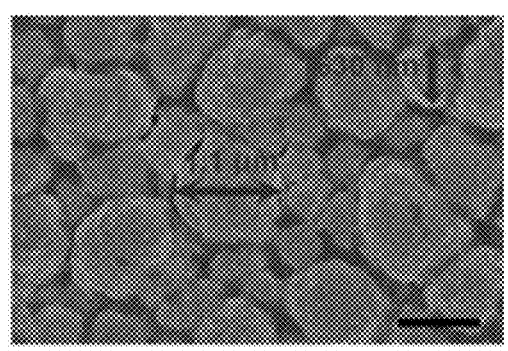
FIG. 31B          FIG. 31C
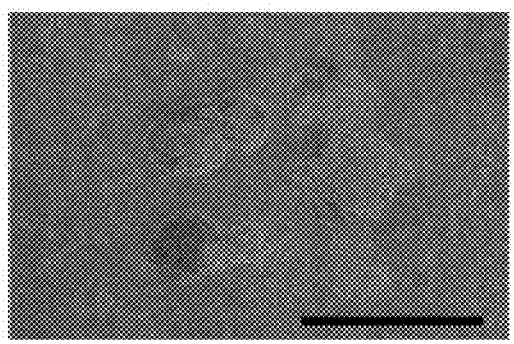 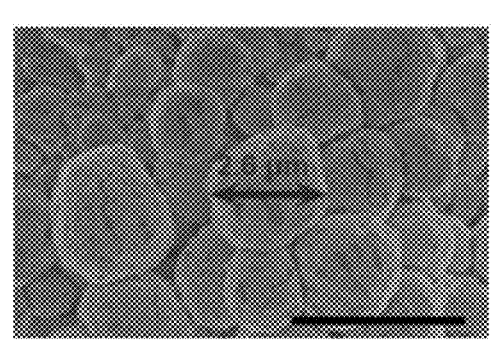
FIG. 31D          FIG. 31E

ADDITIVES FOR SUPPRESSING DENDRITIC GROWTH IN BATTERIES

CROSS REFERENCE TO RELATED APPLICATIONS

This application claims the benefit of U.S. Provisional Application No. 62/539,609, filed on Aug. 1, 2017, the entire disclosure of which is hereby incorporated by reference as if set forth fully herein.

TECHNICAL FIELD

The current invention is directed to suppressing dendritic growth in lithium- and sodium-based batteries.

BACKGROUND

Lithium metal is the most promising anode candidate for future high-energy-density lithium batteries because it shows the highest theoretical capacity (3,860 mAh/g) and the lowest electrochemical potential of all candidates (−3.040 V vs the standard hydrogen electrode). However, the uneven and dendritic lithium deposition during cycling, which will result in low Coulombic efficiencies, reduced energy storage, and safety issues, severely impede its practical applications. To realize stable and safe Li metal anodes, several strategies, including developing electrolyte additives, engineering high-modulus solid electrolyte, and designing electrochemically and mechanically stable artificial interfaces have been developed to stabilize the solid electrolyte interphase (SEI) and tackle the dendrite growth. However, until now, the development of methods that can efficiently achieve the uniform Li deposition while being cost-effective, simple, scalable, and applicable for secondary lithium battery industries is still a great challenge. This is a major problem and no practical solution has been found.

Rechargeable lithium (Li) metal-based batteries (LMBs) have been extensively investigated for electrochemical energy storage devices. The high-energy-density of Li metal anode has fueled potential applications of LMBs in portable electronics, electric vehicles, and most recently in aerospace fields. However, uncontrolled dendritic lithium growth that is inherent in these batteries (upon repeated charge/discharge cycling) has prevented their practical applications over the past 40 years. In the 1990s, Li-ion batteries (LIBs) were designed to remedy the dendrite problem by hosting Li in a graphitic electrode, leading to tremendous success of LIBs in the portable electronic and electric vehicle markets. However, the dendrite issue of Li metal is still a critical challenge, especially for the high-rate LIBs in transportation applications. Because of the small potential difference between Li ion insertion and plating, a working LIB can be easily transformed to a LMB by too rapid charging, operating it at very low temperature, or by overcharging the battery. Consequently, inhibiting dendrite growth is not only the first step to the commercialization of high-energy-density LMBs (such as Li-sulfur (S) and Li-oxygen batteries), but also a significant improvement in the safety for current LIBs.

Lithium (Li), the lightest metal, delivers a theoretical specific capacity of 3860 mAh g$^{-1}$, nearly ten times higher than traditional graphite anodes (372 mAh g$^{-1}$) in Li ion batteries (LIBs). The Li$^+$/Li redox couple provides the most negative potential of −3.04 V (vs. standard hydrogen electrode), rendering a high working voltage in a full cell. These features deliver a high-energy density when the Li metal anode is paired with the high-capacity cathode material to form a full cell. As a result, rechargeable Li metal-based batteries (LMBs), such as Li-sulfur (Li—S) and Li-oxygen (Li—O$_2$) batteries are regarded as promising candidates for high-energy-density storage. However, LMBs may develop dangerous Li dendrites, limiting their practical applications due to the following reasons: (1) dendritic deposition of Li can electronically connect the cathode and anode, resulting in the cell short circuiting, thermal runaway, and failure with possible explosion or fire; (2) Li dendrites increase the contact area, facilitating side reactions between the Li metal and organic electrolyte. The reaction products electronically isolate the Li metal from the conductive matrix, thus resulting in inactive (dead) Li, and, consequently, low Coulombic efficiency, large polarization, and poor lifespan of the LMB.

Strategies to suppress Li dendrites can be divided into four categories: (1) solid/gel polymer electrolyte[11-13], (2) Li metal/organic electrolyte interface modifications, (3) weakening space charge on the anode surface, and (4) anode matrix design. While extensive studies have been conducted to explore methods to suppress Li dendrite growth, investigations into the mechanism of nucleation and growth of Li metal are limited[27].

Li dendrite is referred to a branched or tree-like structure of Li metal depositing on the anode surface. To protect Li metal, it is rewarding to modify the solid electrolyte interphase (SEI), which is formed from the spontaneous reactions between Li metal and electrolyte.[1, 2] The use of various electrolyte additives, including lithium bis(trifluoromethanesulfonyl)imide (LiFSI), halogenated salt, 1,1,2,2-tetrafluoroethyl-2,2,3,3 tetrafluoropropylether (TTE), trace-amount of H$_2$O, Cs$^+$ ions, and concentrated electrolyte, are considered to enhance the stability and uniformity of the SEI layer. Nevertheless in most cases, the formed SEI layer in organic electrolyte has a low modulus and fails to withstand the mechanical deformation induced by the dendrite growth. The incomplete SEI layer cannot provide a continuous and effective protection for the Li deposits, rendering LMBs a low Coulombic efficiency and poor lifespan. Consequently, it is more valuable to inhibit the continuous growth of large dendrites by the modifying Li depositing behavior.

Similar issues are associated with sodium-based batteries. The present invention is directed to addressing at least some of these shortfalls.

SUMMARY

The present disclosure relates to battery cells having an electrolyte including sodium or lithium ions, and nanoparticles, batteries comprising the battery cells, electronic devices comprising the battery cells, and electrolyte compositions.

In a first aspect, the disclosure relates to a battery cell including (a) sodium or lithium ions, and (b) nanoparticles of carbon, metal or metalloid oxides or hydroxides, carbides, nitrides, sulfides, or combinations thereof. In the foregoing embodiment the nanoparticles of carbon may be selected from nanodiamonds and alliform carbon, the metal or metalloid oxides or hydroxide may be selected from hydrated alumina, silica, titania, and zirconia, the carbide may be SiC, and the nitrides may be selected from BN and Al$_3$N$_4$.

In a second aspect, the disclosure relates to a battery cell including (a) sodium or lithium ions, and (b) a colloidal dispersion of graphene or MXene particles.

In each of the foregoing embodiments, the battery cell may be selected from a lithium-ion battery cell, a lithium-sulfur battery cell, a lithium-air battery cell, or a sodium-ion battery cell.

In each of the foregoing embodiments, the electrolyte may include lithium ions. In the foregoing embodiment, the lithium ions may be present as complexes including lithium hexafluorophosphate (LiPF$_6$), lithium hexafluoroarsenate monohydrate (LiAsF$_6$), lithium perchlorate (LiClO$_4$), lithium tetrafluoroborate (LiBF$_4$), lithium triflate (LiCF$_3$SO$_3$), lithium bis(oxalate)borate (LiBOB), lithium bis(trifluoromethane) sulfonamide (LiTFSI), lithium bis(fluorosulfonyl)imide (LiFSI), lithium iron phosphate (LFP, LiFePO$_4$), or a mixture thereof.

In another embodiment, the electrolyte may include sodium ions. In the foregoing embodiment, the sodium ions may be present as complexes including sodium hexafluorophosphate (NaPF$_6$), sodium hexafluoroarsenate monohydrate (NaAsF$_6$), sodium perchlorate (NaClO$_4$), sodium tetrafluoroborate (NaBF$_4$), sodium triflate (NaCF$_3$SO$_3$), sodium bis(oxalate)borate (NaBOB), sodium bis(trifluoromethane)sulfonamide (NaTFSI), sodium bis(fluorosulfonyl)imide (NaFSI), sodium iron phosphate (NaFP, NaFePO$_4$), or a mixture thereof.

In each of the foregoing embodiments, the electrolyte may include an organic solvent, such as ethylene carbonate, diethyl carbonate, dimethyl carbonate, dioxolane, dimethoxyethane, or a combination thereof, containing the ion complexes.

In each of the foregoing embodiments, the electrolyte may include an ionic liquid. In the foregoing embodiment, the ionic liquid may comprise an alkyl-substituted imidazolium cation, pyridinium cation, or a combination thereof. In the foregoing embodiment, the ionic liquid may include a hexafluorophosphate (PF$_6^-$), a tetrafluoroborate (BF$_4^-$), a bistriflimide [(CF$_3$SO$_2$)$_2$N]$^-$, or a dicyanamide (DCI$^-$) anion.

In each of the foregoing embodiments, wherein the battery cell comprises a colloidal dispersion of MXene particles, the MXene particles may include any of the compositions described in at least one of U.S. patent application Ser. No. 14/094,966 (filed Dec. 3, 2013), 62/055,155 (filed Sep. 25, 2014), 62/214,380 (filed Sep. 4, 2015), 62/149,890 (filed Apr. 20, 2015), 62/127,907 (filed Mar. 4, 2015) or International Applications PCT/US2012/043273 (filed Jun. 20, 2012), PCT/US2013/072733 (filed Dec. 3, 2013), PCT/US2015/051588 (filed Sep. 23, 2015), PCT/US2016/020216 (filed Mar. 1, 2016), or PCT/US2016/028,354 (filed Apr. 20, 2016), preferably where the MXene composition comprises titanium and carbon (e.g., Ti$_3$C$_2$, Ti$_2$C, Mo$_2$TiC$_2$, etc.)

In each of the foregoing embodiments, the battery cell is configured to reduce growth of lithium or sodium dendrites when operating, for example, charging or discharging, relative to a corresponding battery absent the nanoparticles, graphene, or MXene particles.

In another aspect, the present disclosure relates to a battery including at least two battery cells of any one of the foregoing embodiments.

In another aspect, the present disclosure relates to an electronic device including the battery cell of any one of the foregoing embodiments, or the battery of the foregoing embodiments, where the electronic device is an electric vehicle; cell phone; computer; tablet computer, for example an iPad; portable media player for example an iPod; digital music player; camera; e-reader, for example a Kindle; or video player.

In another aspect, the present disclosure relates to an electrolyte composition including: (a) a solvent suitable for use in a battery electrolyte including: (i) an organic liquid solvent, selected from ethylene carbonate, diethyl carbonate, dimethyl carbonate, dioxolane, and dimethoxyethane; (ii) an ionic liquid selected from 1-ethyl-3-methylimidazolium tetrafluoroborate (EMI-BF$_4$), 1-ethyl-3-methylimidazolium bis(trifluoromethanesulfonyl)imide (EMI-TSFI), 1-butyl-1-methylpyrrolidinium tetrafluoroborate (BMP-BF$_4$), and 1-butyl-1-methylpyrrolidinium bis(trifluoromethanesulfonyl)imide (BMP-TSFI); or (iii) combinations thereof; (b) a lithium ion salt or sodium ion salt suitable for use in a battery electrolyte, selected from lithium or sodium salts of hexafluorophosphate (LiPF$_6$), hexafluoroarsenate monohydrate (LiAsF$_6$), perchlorate (LiClO$_4$), tetrafluoroborate (LiBF$_4$), triflate (LiCF$_3$SO$_3$), bis(oxalate)borate (LiBOB), bis(trifluoromethane)sulfonamide (LiTFSI), bis(fluorosulfonyl)imide (LiFSI), or a mixture thereof; and (c) a dispersion of (i) nanoparticles of carbon, selected from nanodiamonds and alliform carbon, metal or metalloid oxides or hydroxides, selected from hydrated alumina, silica, titania, and zirconia, carbides such as SiC, nitrides selected from BN and Al$_3$N$_4$, and sulfides; (ii) graphene or Mxene particles; or (iii) combinations thereof.

Herein, we disclose a novel method to suppress the lithium- and sodium-dendrite growth by adding nanodiamonds and other nanoparticles into conventional electrolytes for such batteries. Nanodiamond additives have been used for electrolytic and electroless metal plating for many years in machine-building, ship-building, aircraft, electronic, radio-engineering, medical, and jewelry industries. Adding nanodiamonds in electroplating electrolytes renders the co-deposition of nanodiamonds and metals, leading to the ultra-homogeneous deposition of metallic films with significantly improved mechanical and chemical properties. Based on this idea of nano-composite electroplating, inventors surprisingly discovered that dispersing nanodiamonds with concentration of 0.1-20 mg/mL within secondary lithium batteries electrolytes inhibited formation of lithium dendrites. Uniform and dendrite-free deposition of lithium metals at high current rates and high lithiation capacities were observed. In contrast to conventional electrolytes, the dendrite inhibiting electrolytes delivered much higher Coulombic efficencies, lower overpotentials, and longer service life when used in secondary lithium batteries.

Other inorganic nanoparticle additives, including carbon onions, Al$_2$O$_3$, TiO$_2$, SiO$_2$, and SiC, etc., may also be suitable for inhibiting dendrite formation in battery electrolytes. The effect of size and concentration of these nanoparticle additives, as well as their influences on the performance of secondary lithium batteries compared to conventional electrolytes will be investigated. Similar effects are expected to be seen in secondary sodium and zinc batteries.

In addition to nanodiamond particles, dispersions of graphene and 2D MXenes are also expected to perform well in this.

BRIEF DESCRIPTION OF THE DRAWINGS

FIG. 2 shows octadecylamine (ODA)-modified nanodiamonds according to the present invention. FIG. 2 shows that the modification of nanodiamonds increased their dissolubility in the electrolyte compared to the control sample which was a conventional Li ion electrolyte ($LiPF_6$ (1.0M)-EC/DEC, marked as $LIPF_6$).

FIG. 4 shows that the nanodiamonds octadecylamine (NDODA) electrolyte provided uniform and dendrite-free Li deposits.

FIG. 5 shows that for the conventional $LiPF_6$ electrolyte, the Li deposits where inhomogeneous and had large dendrites.

FIGS. 7A-7D show that the uniform deposition of Li nanodiamond-containing electrolyte can be attributed to its smaller deposited Li crystals. FIGS. 7A and 7C show the nanodiamond-containing electrolyte, and FIGS. 7B and 7D show the $LiPF_6$ electrolyte.

FIGS. 8A and 8C show the nanodiamond-containing electrolyte, and FIGS. 8B and 8D show the $LiPF_6$ electrolyte.

FIGS. 9A and 9C show the nanodiamond-containing electrolyte, and FIGS. 9B and 9D show the $LiPF_6$ electrolyte.

FIGS. 10A-10D show multi-step Li depositing-stripping-depositing-stripping-depositing carried out at 0.5 mA cm$^{-2}$ wherein each step took 3 hours. FIGS. 10A and 10C show the nanodiamond-containing electrolyte, whereas FIGS. 10B and 10D show the $LiPF_6$ electrolyte. It is clear from FIGS. 10B and 10D that large dendrites grew in the $LiPF_6$ electrolyte as compared to the nanodiamond-containing electrolyte.

FIG. 12 shows that the Li—Cu half-cell was cycled to evaluate the Li utilization in different electrolytes. Compared to $LiPF_6$ electrolyte, NDODA electrolyte rendered a stable and high coulombic efficiency.

FIG. 14 shows that Li deposits in two electrolytes provided similar XRD peaks. NDODA did not change the XRD patterns of Li deposits.

FIGS. 15A-15F show the properties of the nanodiamond electrolyte and its application in Li ion electroplating. The schematic illustration In FIG. 15A shows the electroplating bath and FIG. 15B shows the role of nanodiamond additives in suppressing Li dendrites. FIG. 15C shows a TEM image of nanodiamond particles, where the scale bar is 20 nm. FIG. 15D shows optical images of lithium hexafluorophosphate ($LiPF_6$)-ethylene carbonate (EC)/diethyl carbonate (DEC) electrolyte without and with nanodiamond additives (0.82 mg mL$^{-1}$). FIG. 15E shows the size intensity distribution of nanodiamond agglomerates in LiPF6-EC/DEC electrolyte. FIG. 15F is a schematic illustration of nanodiamond particles with adsorbed Li ions from the electrolyte. "ND" in the figures is the abbreviation for "nanodiamond"

FIG. 16A is a schematic illustration describing Li ion plating behavior in the $LiPF_6$-EC/DEC electrolyte with and without nanodiamond additives. FIGS. 16B, 16D, 16F, and 16H are SEM images of the Li deposits in $LiPF_6$-EC/DEC electrolyte without the nanodiamond additive. FIGS. 16C, 16E, 16G, and 16I are SEM images of the Li deposits in $LiPF_6$-EC/DEC electrolyte with the nanodiamond additive. The deposits of FIGS. 16B-16G were plated after one cycle at 0.5 mA cm$^{-2}$ with a plating time of 6 hrs. The deposits of FIGS. 16H-16I were plated after three cycles at 0.5 mA cm$^{-2}$ with a step time of 6 hrs. The insets in FIGS. 16B, 16C, 16H, and 16I are the optical images of the corresponding Li deposits, with scale bars of 1 μm. The scale bars in FIGS. 16B and 16C, 16D and 16E, 16F and 16G, and 16H and 16I of the SEM images are 100, 1, 50, and 5 μm, respectively.

FIG. 17A shows the surface energies of low index facets for nanodiamond and Cu. FIG. 17B shows the differences in charge density for Li on nanodiamond (110) and Cu (111) surfaces. FIG. 17C is a schematic of the diffusion barrier of Li on different surfaces. Except for the nanodiamond, the diffusion barriers of other materials are cited from reference 41. FIG. 17D shows the most stable adsorption sites and diffusion paths for Li on the nanodiamond (110) surface.

FIGS. 18A-18F show the long-term electrochemical cycling stability. FIGS. 18A and 18B show the charge-discharge curves of symmetrical Li|Li cells at 1 mA cm$^{-2}$ and 2 mA cm$^{-2}$, respectively. Each charge and discharge time is set as 12 min. FIG. 18C shows the voltage-time curves to calculate the average Coulombic efficiency of Li Cu cells at 0.5 mA cm$^{-2}$. FIG. 18D shows the enlarged view of FIG. 18C from 5~15 h. FIGS. 18E and 18F show the morphology of a Li deposit cycled at 0.5 mA cm$^{-2}$ in the electrolyte, where FIG. 18E is without and FIG. 18F is with the nanodiamond additive. The scale bars in FIGS. 18E-18F are 10 μm.

FIGS. 20A-20B show TEM images of nanodiamond particles. The scale bars in FIGS. 20A and 20B are 100 and 5 nm, respectively. FIGS. 20C-20E show the stability of the nanodiamond electrolyte. Optical images of the nanodiamond electrolyte, as prepared, is shown in FIG. 20C and, after 2 months, is shown in FIG. 20D. FIG. 20E shows the size intensity distribution of nanodiamond agglomerates in $KiPF_6$-ED/DEC electrolyte before and after 2 months.

FIGS. 24A and 24C are SEM images of Li deposits before 2 months, and FIGS. 24B and 24D are SEM images of Li deposits after 2 months. The scale bars in FIGS. 24A-24D are 5, 2.5, 1, and 0.6 µm, respectively.

FIGS. 26A and 26B show Li plating morphology at 1 mA $cm^{-2}$ and 3 mAh $cm^{-2}$, respectively. The scale bars in FIG. 26A and FIG. 26B are 30 and 5 µm, respectively.

FIGS. 29C and 29D show the elemental distributions corresponding to FIGS. 29A and 29B, respectively. The scale bars in FIGS. 29A and 29B are 4 and 2 µm, respectively.

FIGS. 30A-30B show optical images of $LiPF_6$-EC/DEC electrolytes with different nanodiamond concentrations. FIG. 30A has a concentration of 0.41 mg $mL^{-1}$ of nanodiamond, and FIG. 30B has a concentration of 4.1 mg $mL^{-1}$ of nanodiamond.

FIGS. 31A-31E show the morphology of Li deposits after galvanostatic plating one time in $LiPF_6$-EC/DEC electrolyte with 0.41 mg $mL^{-1}$ of nanodiamond. FIG. 31A shows SEM images of Li deposits. FIGS. 31B-31C and 31D-31E are enlarged views of regions 1 and 2, respectively, of FIG. 31A. The current and plating time was 0.5 mA $cm^{-2}$ and 6 hrs. The scale bars in FIGS. 31A-31E are 100, 3, 1, 40, and 4 µm, respectively.

FIGS. 32A-32C are SEM images of Li deposits, plated using a of current 0.5 mA $cm^{-2}$ and a plating time of 6 hr. The scale bars in 32A-32C are 100, 3, and 1 µm, respectively.

FIG. 33A shows the electrolyte with nanodiamond and FIG. 33B shows the electrolyte without nanodiamond.

FIG. 34A shows the charge-discharge curves of symmetrical Li|Li cells at 2 mA $cm^{-2}$. Each charge and discharge time is set as 12 min. FIG. 34B shows the plating and stripping capacities of cells in the 0.41 mg $mL^{-1}$ nanodiamond electrolyte adapted to calculate the average Coulombic efficiency in 12 cycles.

FIG. 36A shows the cycling stability of nanodiamond-containing electrolyte vs. nanodiamond-free electrolyte; FIG. 36B shows the cycling stability of 0.82 mg $mL^{-1}$ nanodiamond electrolyte.

FIGS. 37A-37F are SEM images before cycling (FIGS. 37A-37B), after 5 cycles (FIGS. 37C-37D), and after 20 cycles (FIGS. 37E-37F). The scale bars in FIGS. 37A, 37C, and 37E are 5 and in FIGS. 37B, 37D, and 37F are 1 µm.

FIGS. 38A-38F are SEM images before cycling (FIGS. 38A-38B), after 5 cycles (FIGS. 38C-38D), after 20 cycles (FIGS. 38E-38F). The scale bars in FIGS. 38A, 38C, and 38E are 5 µm, in FIGS. 38B, 38D, and 38F are 1 µm.

FIGS. 39A-39C are SEM images before cycling, FIGS. 39D-39E after 5 cycles, and FIGS. 39F-39G after 20 cycles in the Li|LFP cells. FIG. 39A is the as-received commercial Li foil. FIGS. 39B and 39C are the pressed Li foils used in the coin-cell assembly. The scale bars in FIGS. 39A and 39B are 100 µm, in FIG. 39C is 30 µm, in FIGS. 39D and 39F are 10 µm, and in FIGS. 39E and 39G are 3 µm.

DETAILED DESCRIPTION OF ILLUSTRATIVE EMBODIMENTS

Figure 1:
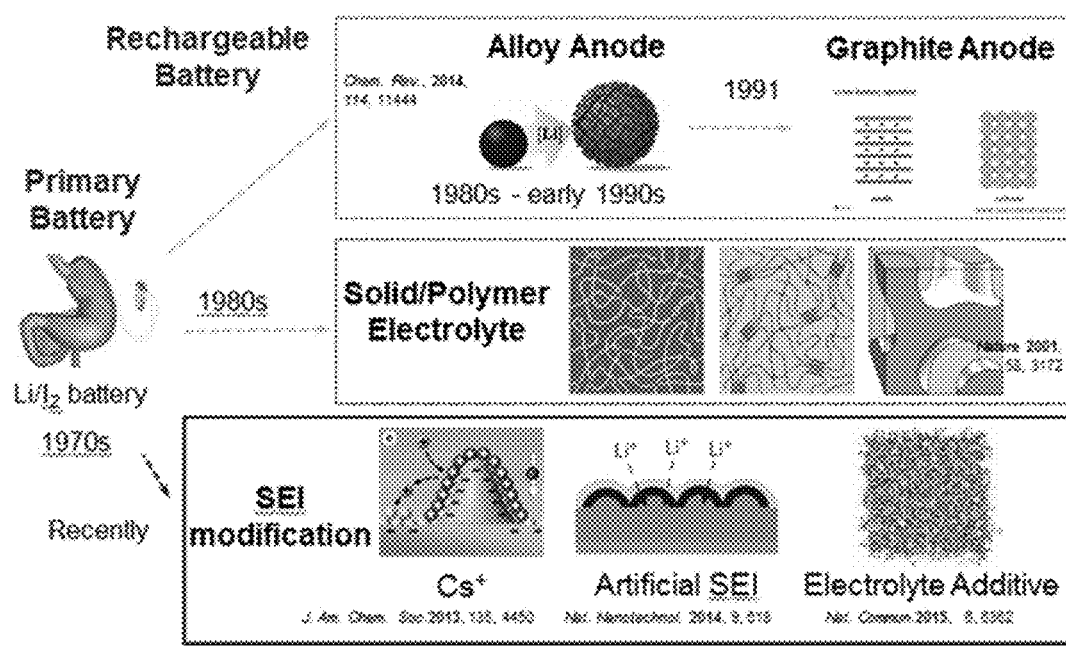
FIG. 1 shows published methods to suppress Li dendrite growth. These methods require a large volume change, leading to poor cycling life. (1) Alloy anodes, such as Li—Al, and Li—B alloys. (2) Solid/polymer electrolyte, but has low ion conductivity. (3) Solid electrolyte interphase (SEI) modification, however it does not work well at high current and long cycling time, and is expensive.
Figure 3A:
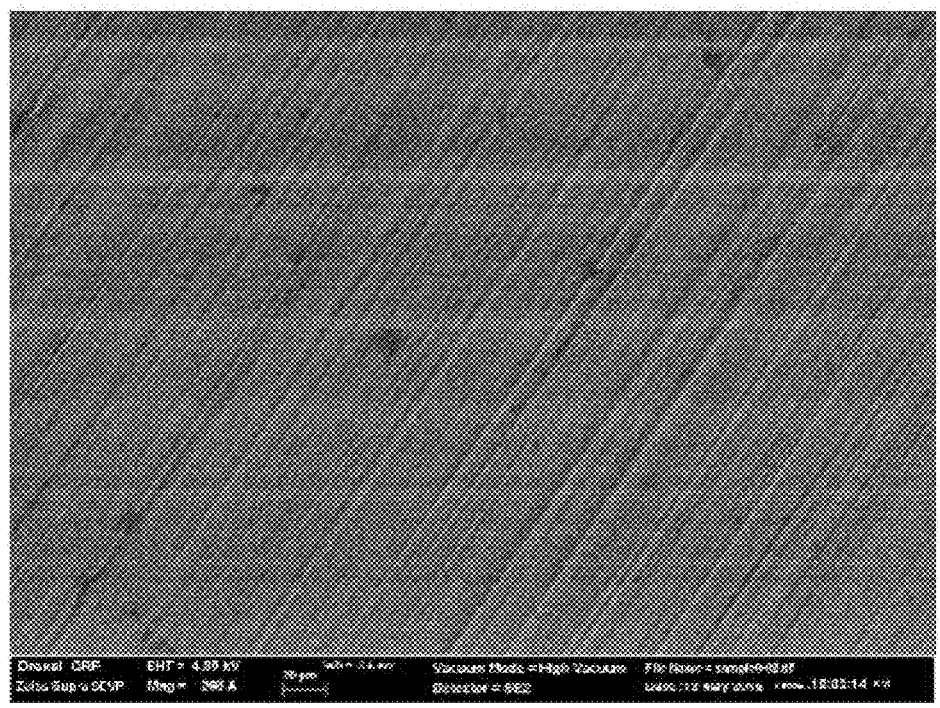
FIGS. 3A-3B show that the copper film current collector was relatively uniform prior to Li depositing.
Figure 3B:
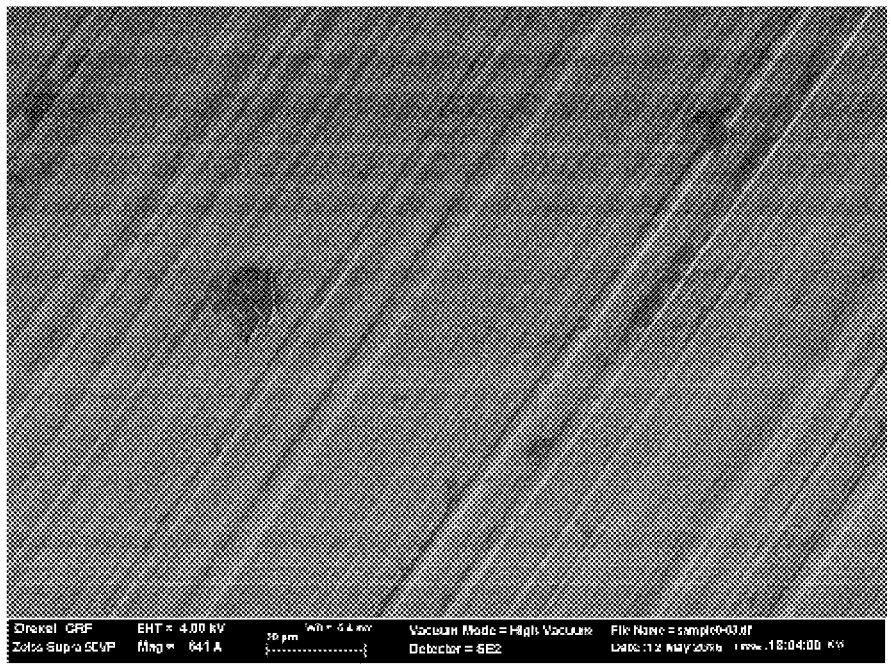
Figure 4:
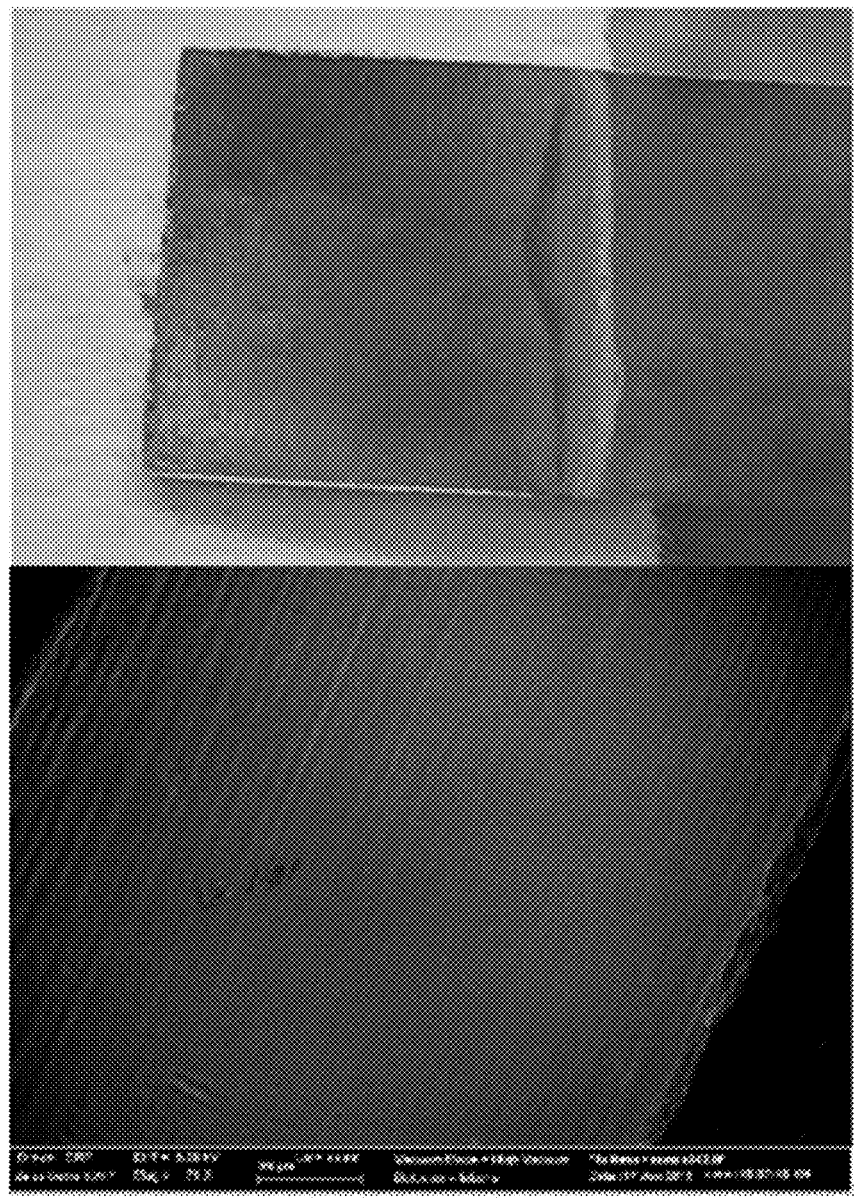
FIG. 4 shows the copper film after the one-step Li deposition at 0.5 mA cm$^{-2}$ for 6 hrs.
Figure 5:
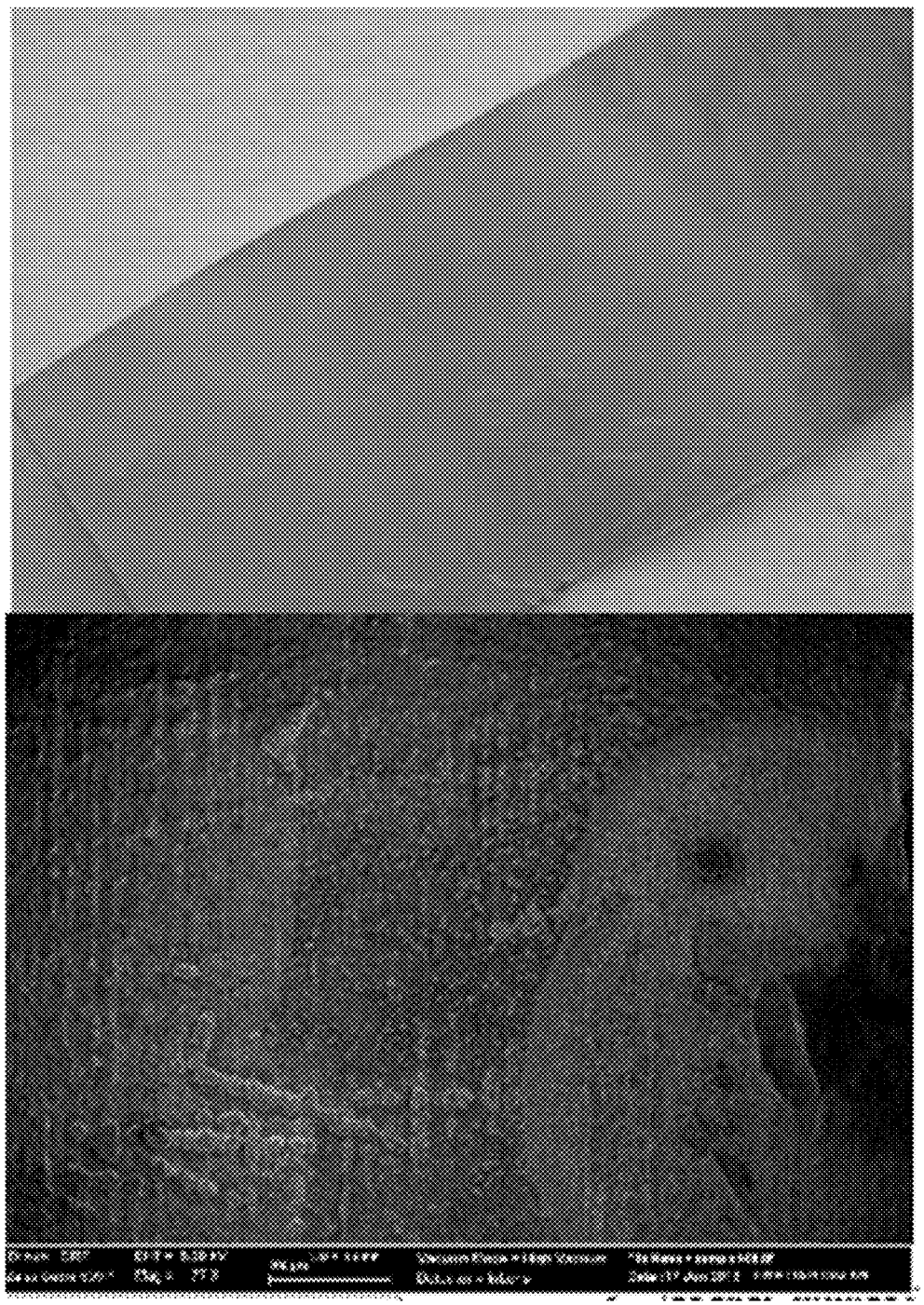
FIG. 5 shows the copper film after the one-step Li deposition at 0.6 mA cm$^{-2}$ for 6 hrs.
Figure 6A:
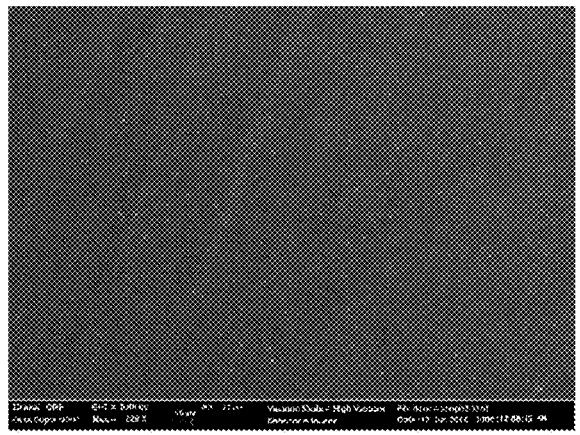
FIGS. 6A and 6B show Li deposition in nanodiamond-containing electrolyte and $LiPF_6$-containing electrolyte, respectively.
Figure 6B:
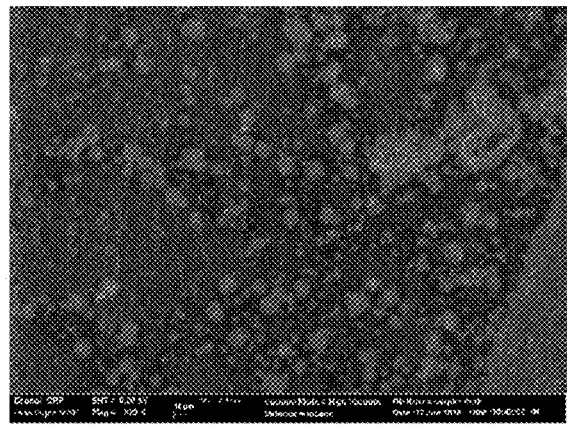
Figure 6C:
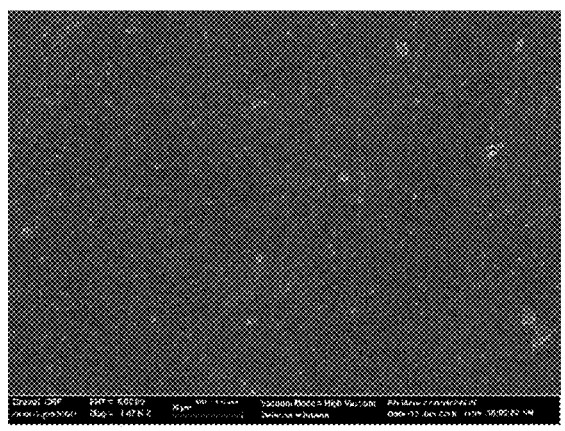
FIGS. 6C-6D show that the Li deposition in nanodiamond-containing electrolyte is more uniform than conventional $LiPF_6$.
Figure 6D:
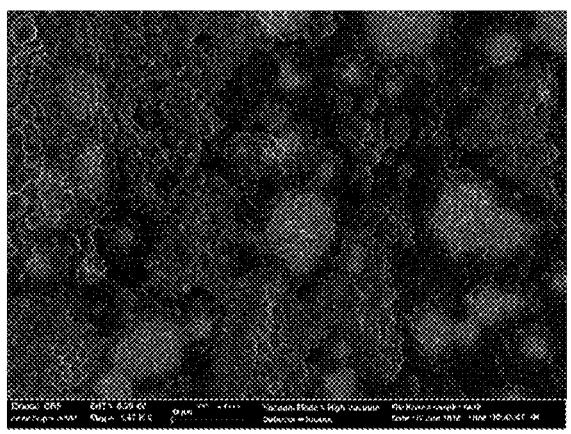
Figure 8A:
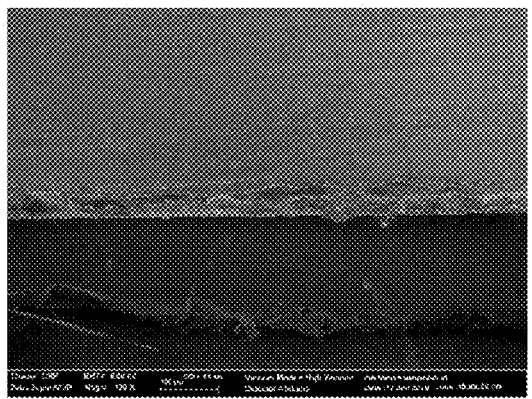
FIGS. 8A-8D show one-step Li deposition at 0.5 mA/cm$^{-2}$, for 6 hrs.
Figure 8B:
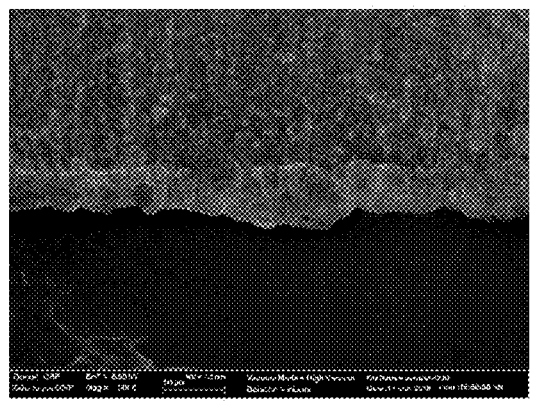
Figure 8C:
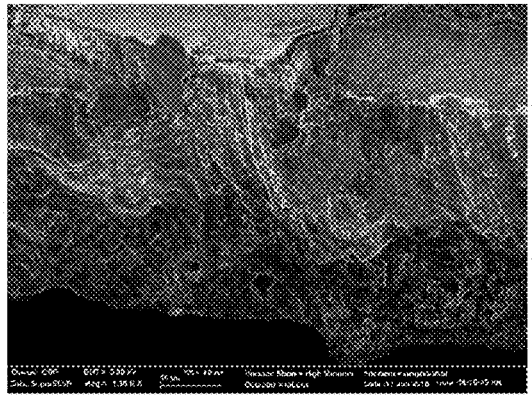
Figure 8D:
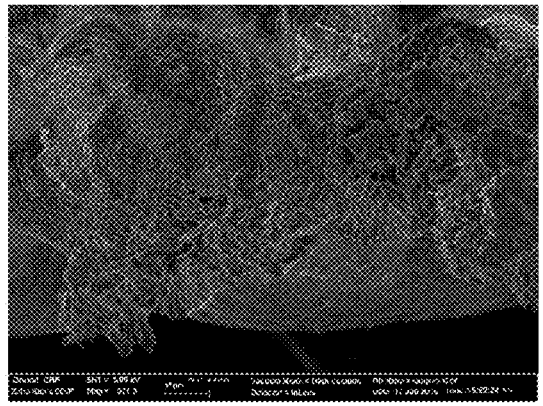
Figure 9A:
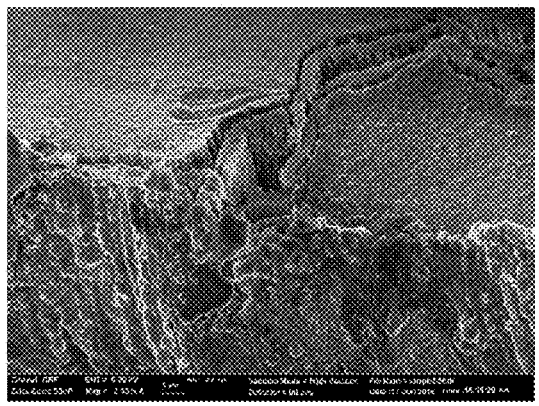
FIGS. 9A-9D show one-step Li deposition at 0.5 mA/cm$^{-2}$, for 6 hrs.
Figure 9B:
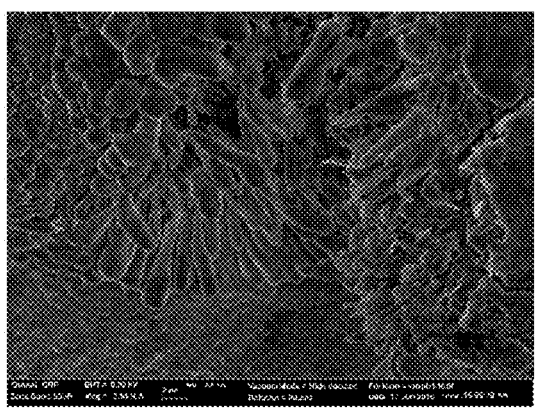
Figure 9C:
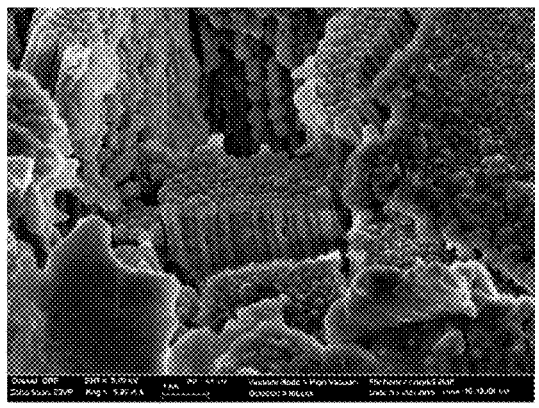
Figure 9D:
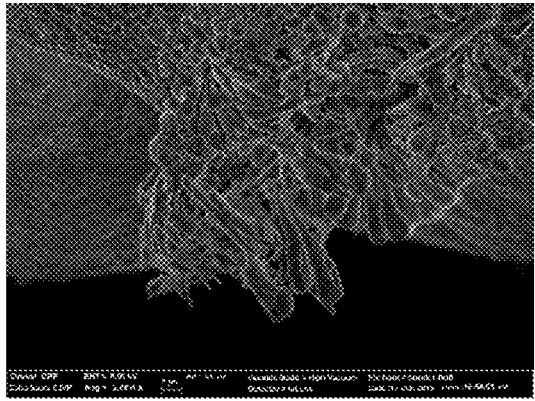
Figure 11A:
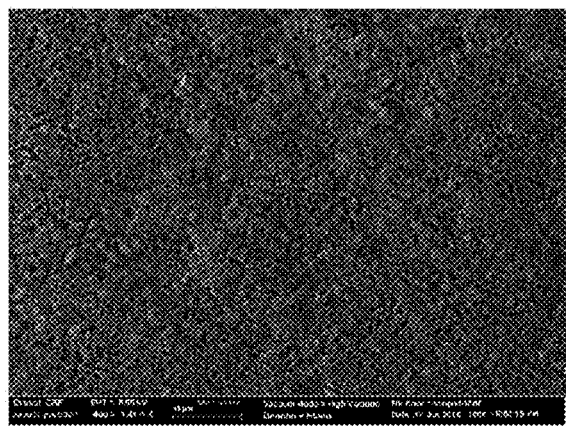
FIGS. 11A-11D show that the multi-step Li deposition and stripping (similar to battery cycling) process leads to growth of Li dendrites as shown in FIGS. 11B and 11D, which is suppressed in the nanodiamond-containing electrolyte shown in FIGS. 11A and 11C.
Figure 11B:
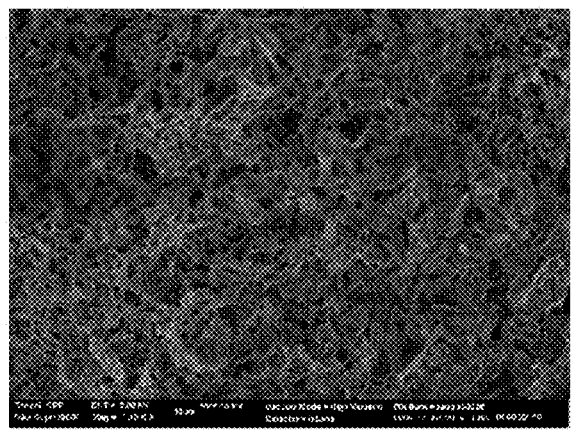
Figure 11C:
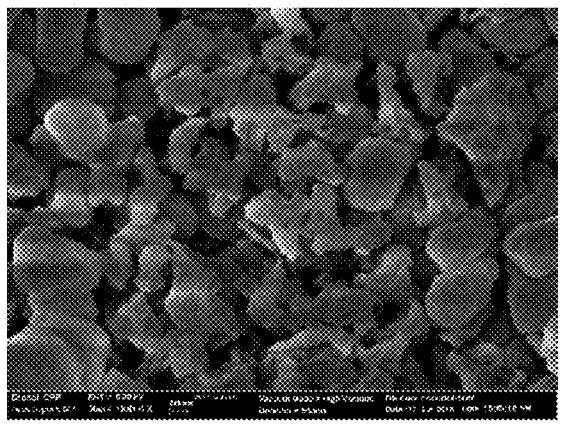
Figure 11D:
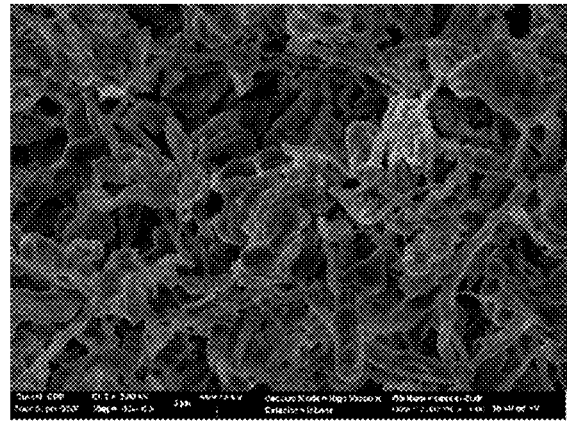
Figure 13:
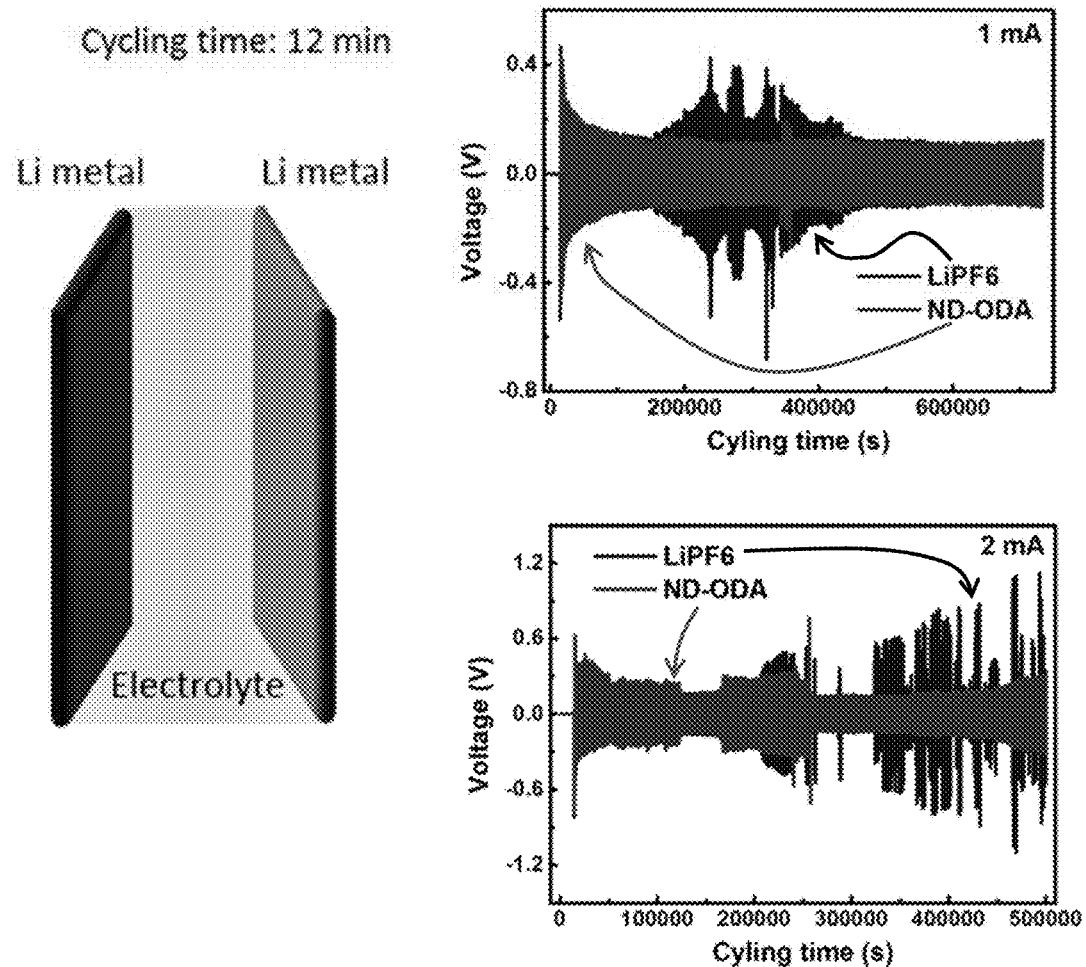
FIG. 13 shows that the Li—Li symmetrical cell, battery cycling life and stability in nanodiamond-containing electrolyte can be significantly increased by the present invention.
Figure 14:
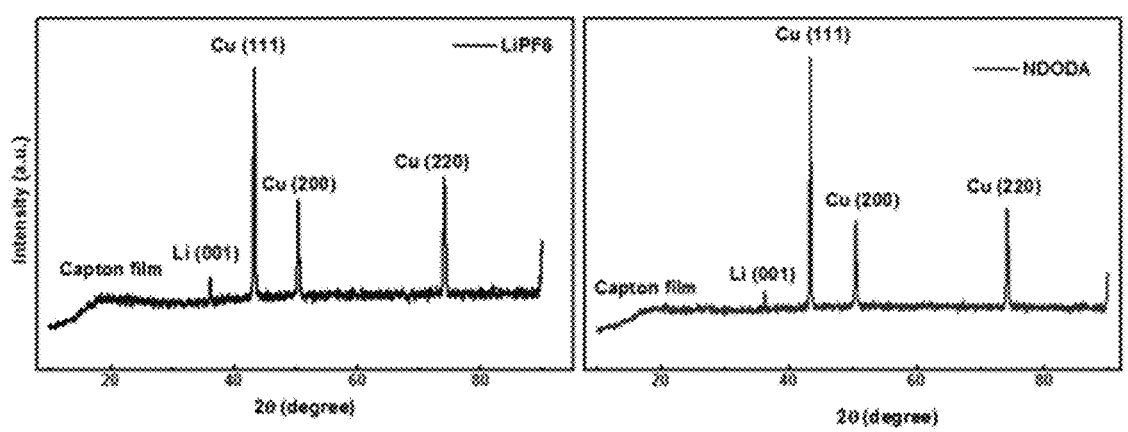
FIG. 14 shows the XRD patterns of Li deposits, with a Li deposition capacity of 80 mAh.

The present invention may be understood more readily by reference to the following description taken in connection with the accompanying Figures and Examples, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

Nanodiamonds have excellent mechanical and optical properties, high surface areas and tunable surface structures. They are produced by detonation of explosives in a closed steel chamber at commercial scale (tons per year) and the process is used for destroying stocks of expired explosives, this being a kind of recycled material. They are also non-toxic, which makes them well suited for a wide range of applications. The synthesis, structure, properties, surface chemistry and phase transformations of individual nanodiamonds and clusters of nanodiamonds were reviewed in V. Mochalin, et al., The properties and applications of nanodiamonds, Nature Nanotechnology, 7 (1) 11-23 (2012). In particular it was shown that the rational control of the mechanical, chemical, electronic and optical properties of nanodiamonds through surface doping, interior doping and the introduction of functional groups is possible. These little gems have a wide range of potential applications in tribology, electroplating and nanocomposites, but have not been studied in battery applications.

Two-dimensional (2D) solids—the thinnest materials available—also offer unique properties. The most famous example is graphene, which is an atomically thin layer of carbon atoms. Recently, an entirely new family of 2D solids—transition metal carbides ($V_2C$, $Ti_3C_2$, $Nb_4C_3$, etc.), nitrides (e.g., $Ti_4N_3$) and carbonitrides (e.g., $Ti_3CN$) labeled "MXenes"—have been discovered. More than 20 different MXenes have been synthesized to date and dozens more are predicted, promising to make MXenes the largest known family of 2D materials. MXenes can be metallic (e.g., $Ti_3C_2T_x$) or semiconducting (e.g., $Mo_2CT_x$[3]), depending on their composition and surface termination (T). Surface terminated MXenes are hydrophilic and can be dispersed in water and polar organic solvents. One of the many potential applications for 2D carbides is in electrical energy storage devices, such as Li-ion and Li—S batteries, Li-ion or Na-ion capacitors and supercapacitors. See, e.g., M. Naguib, et al., "MXenes: A New Family of Two-Dimensional Materials, *Advanced Materials*, 26, 992-1005 (2014). $Ti_3C_2$ paper electrodes show a higher Li-ion capacity than graphite anodes and can be charged/discharged at significantly higher rates. Most importantly, unprecedented control of electrical, optical, electrochemical and mechanical properties can be achieved in this new system, opening new horizons for design of materials with the required set of properties for a variety of applications.

Various embodiments of the present invention include battery cells, batteries, and devices incorporating these energy sources comprising novel electrolytes as described herein. Certain of these embodiments include battery cells, each battery cell having an electrolyte comprising:
 (a) sodium or lithium ions; and
 (b) nanoparticles of carbon (e.g., nanodiamonds, alliform carbon), metal or metalloid oxides or hydroxides (e.g., optionally hydrated alumina, silica, titania, zirconia), carbides (e.g., SiC), nitrides (e.g., BN, $Al_3N_4$), sulfides, or a combination thereof.

Other embodiments include battery cells, each having an electrolyte comprising:
 (a) sodium or lithium ions; and
 (b) a colloidal dispersion of graphene or MXene particles.

The battery cell may have an electrolyte comprising a colloidal dispersion of MXene particles, wherein the MXene particles comprise any of the compositions described in at least one of U.S. patent application Ser. No. 14/094,966 (filed Dec. 3, 2013), 62/055,155 (filed Sep. 25, 2014), 62/214,380 (filed Sep. 4, 2015), 62/149,890 (filed Apr. 20, 2015), 62/127,907 (filed Mar. 4, 2015) or International Applications PCT/US2012/043273 (filed Jun. 20, 2012), PCT/US2013/072733 (filed Dec. 3, 2013), PCT/US2015/051588 (filed Sep. 23, 2015), PCT/US2016/020216 (filed Mar. 1, 2016), or PCT/US2016/028,354 (filed Apr. 20, 2016), preferably where the MXene composition comprises titanium and carbon (e.g., $Ti_3C_2$, $Ti_2C$, $Mo_2TiC_2$, etc. The aforementioned patent applications are herein incorporated by reference in their entirety.

These battery cells include cells comprising ions such as $Li^+$ and/or $Na^+$, and include, but are not limited to, lithium-ion battery cells, lithium-sulfur battery cells, lithium-air battery cells, and sodium-ion battery cells. In related embodiments, two or more cells may be configured as a battery. Other embodiments include electronic devices comprising one or more battery cells or batteries. Such devices may include electric or hybrid cars or other vehicles, cell phones, computers, tablet computers (e.g., iPad), portable media players (e.g., iPods), digital music players, cameras, e-readers (e.g., Kindle), and video players. Other such devices not listed here, using these types of batteries, are also considered within the scope of the present invention.

In those cells, batteries, and devices comprising an electrolyte using lithium ions, the lithium ions may be present as complexes such as are known in the art for such purposes and include, but are not limited, to lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiCF_3SO_3$), lithium bis(oxalate)borate (LiBOB), lithium bis(trifluoromethane)sulfonamide (LiTFSI), lithium bis(fluorosulfonyl)imide (LiFSI), lithium iron phosphate (LFP, $LiFePO_4$), or a mixture thereof.

Similarly, in those cells, batteries, and devices comprising an electrolyte using sodium ions, the sodium ions may be present as complexes such as are known in the art for such purposes and include, but are not limited, to sodium hexafluorophosphate ($NaPF_6$), sodium hexafluoroarsenate monohydrate ($NaAsF_6$), sodium perchlorate ($NaClO_4$), sodium tetrafluoroborate ($NaBF_4$), sodium triflate ($NaCF_3SO_3$), sodium bis(oxalate)borate (NaBOB), sodium bis(trifluoromethane)sulfonamide (NaTFSI), sodium bis(fluorosulfonyl)imide (NaFSI), sodium iron phosphate (LFP, $LiFePO_4$), or a mixture thereof.

The electrolytes containing these ions may be aqueous or non-aqueous, though non-aqueous electrolytes are preferred. Exemplary solvents useful in the electrolytes of such cells, batteries, and devices include, but are not limited to, ethylene carbonate, diethyl carbonate, dimethyl carbonate, dioxolane, dimethoxyethane, or a combination thereof, containing complexes of lithium ions.

Other aqueous or non-aqueous solvents useful as electrolytes in the present invention include ionic liquids. Such materials are known in the art as salts in which the ions are poorly coordinated, resulting in these solvents being liquid below some arbitrary temperature, such as 100° C., or even at room temperature (room temperature ionic liquids, RTIL's). In some embodiments, the ionic liquid comprises an alkyl-substituted (e.g., methyl, ethyl, propyl, etc) imidazolium cation, a pyridinium cation, or a combination thereof. These cations are typically associated with anions such as hexafluorophosphate ($PF_6^-$), tetrafluoroborate ($BF_4^-$), bistriflimide $[(CF_3SO_2)_2N]^-$, or dicyanamide ($DCI^-$). Certain representative examples of such materials include, but are not limited to, 1-ethyl-3-methylimidazolium tetrafluoroborate ($EMI-BF_4$), 1-ethyl-3-methylimidazolium bis(trifluoromethanesulfonyl)imide (EMI-TSFI), 1-butyl-1-methylpyrrolidinium tetrafluoroborate ($BMP-BF_4$), and 1-butyl-1-methylpyrrolidinium bis(trifluoromethanesulfonyl)imide (BMP-TSFI).

As described elsewhere herein, the electrolytes further comprise dispersed nanoparticles, graphene, and/or MXene materials. As used herein, the term, "nanoparticles" refers to particles having at least one nanoscale dimension. These may include particles which are substantially spherical or quasi-spherical, nanotubes, hybrid-spherical-nanotube materials, etc., having dimensions on this order. In the present context, nanoparticles are defined as those nanotubes, substantially spherical or quasi-spherical particles, or hybrids of the two having at least one dimension in a range of from 1 nm to 5000 nm, or a particle having at least one dimension in at least one range of from 1 nm to 5 nm, from 5 nm to 10 nm, from 10 nm to 25 nm, from 25 nm to 50 nm, from 50 nm to 75 nm, from 75 nm to 100 nm, from 100 nm to 250 nm, from 250 nm to 500 nm, from 500 nm to 750 nm, from 750 nm to 1000 nm, from 1000 nm to 2500 nm, and/or from 2500 nm to 5000 nm.

The terms "substantially spherical" and "substantially quasi-spherical" refer to a particle shape being without near-sized appendages (i.e., having appendages such as carbon nanotubes). To the extent that a given particle or population of particles deviates from a purely spherical shape, such that each particle can be described as having a major and minor axis, the ratio of the lengths of the major and minor axis of each particle can be less than about 2, less than about 1.5, less than about 1.3, less than about 1.2, less than about 1.1, or less than about 1.05 or less than about 1.02. As used herein, where the particles are other than purely spherical, the term "mean diameter" refers to the arithmetic average of the lengths of the major and minor axes of the particles. These particle sizes and distributions are defined herein by TEM photomicrograph analysis. In this method, a predetermined number of particles (more than 100) are analyzed in representative transmission electron micrographs (typically derived from more than 3 randomly selected powder samples) by measuring the mean diameters of the particles, counting particles within a pre-determined size fraction gradient, and statistically correlating those numbers The particles may comprise carbon nanoparticles, including amorphous or crystalline materials. Carbon nanoparticles also include nanodiamonds, fullerenes, graphene, soot, or alliform carbon particles. As described herein, the term "alliform carbon particles" includes any of the particles as described in U.S. patent application Ser. No. 13/823,336 (which is incorporated by reference herein), and refers to substantially spherical or quasi-spherical carbon nanoparticles comprising at least one concentric external graphitic shell, but generally more than one such external shell, resembling the concentric shells of an onion (the term "alliform" derived from "*allium*" meaning onion). In fact, particles described as "carbon onions" or "onion-like carbon" particles, in many respects, are related to these alliform carbon particles, but these terms are normally associated with particles having multiple concentric shells. The external graphitic shell or shells of alliform carbon have surfaces wherein at least 25%, or at least 50%, or at least 75% of their area comprise $sp^2$ carbon.

The term "nanodiamond" such as described in U.S. patent application Ser. No. 14/117,652 (which is incorporated by reference herein), refers to a form of carbon derived from a detonation process. Such processes typically result in aggregated materials, but methods are available to deaggregate these clusters for use in the present invention. Such methods are described, for example, in U.S. patent application Ser. No. 14/117,652, which is also incorporated by reference herein for its teaching of disaggregated diamonds.

While these particles may be conductive or non-conductive, non-conductive particles are preferred to avoid transport via the separator and potential leakage current or even a short circuit within the cell or battery. This is primarily a concern for small spherical particles. MXenes or graphene sheets (see elsewhere) normally don't get transported through porous membranes, as they tend to adhere to the membrane surface. In preferred embodiments, the concentration of particles within the electrolyte media is below the saturation concentration/percolation limit in the electrolyte.

In addition to these types of particles, dispersions of graphene and MXene particles are also useful in the present invention. These materials are well-known in the art as two-dimensional materials. In the present context, in some embodiments, these can be described as planar or scrolled 2-D sheets having at least one lateral dimension in a range of from 10 nm to 5000 nm, or a particle having at least one dimension in at least one range of from 10 nm to 50 nm, from 50 nm to 100 nm, from 100 nm to 250 nm, from 250 nm to 500 nm, from 500 nm to 750 nm, from 750 nm to 1000 nm, from 1000 nm to 2500 nm, and/or from 2500 nm to 5000 nm.

MXenes provide a rich array of chemistries and properties. In certain embodiments of the present invention, the MXene particles comprise any of the compositions described in at least one of U.S. patent application Ser. No. 14/094,966 (filed Dec. 3, 2013), 62/055,155 (filed Sep. 25, 2014), 62/214,380 (filed Sep. 4, 2015), 62/149,890 (filed Apr. 20, 2015), 62/127,907 (filed Mar. 4, 2015) or International Applications PCT/US2012/043273 (filed Jun. 20, 2012), PCT/US2013/072733 (filed Dec. 3, 2013), PCT/US2015/051588 (filed Sep. 23, 2015), PCT/US2016/020216 (filed Mar. 1, 2016), or PCT/US2016/028,354 (filed Apr. 20, 2016), preferably where the MXene composition comprises titanium and carbon (e.g., $Ti_3C_2$, $Ti_2C$, $Mo_2TiC_2$, etc.).

As previously described, in some embodiments, MX-enes are materials comprising or consisting essentially of a $M_{n+1}X_n(T_s)$ composition having at least one layer, each layer having a first and second surface, each layer comprising:

a substantially two-dimensional array of crystal cells, each crystal cell having an empirical formula of $M_{n+1}X_n$, such that each X is positioned within an octahedral array of M, wherein M is at least one Group 3, 4, 5, 6, or 7 metal (corresponding to Group IIIB, IVB, VB, VIB or VIIB metals, respectively), wherein each X is C, and n=1, 2, or 3;

wherein at least one of said surfaces of the layers has surface terminations, $T_s$, independently comprising alkoxide, alkyl, carboxylate, halide, hydroxide, hydride, oxide, sub-oxide, nitride, sub-nitride, sulfide, sulfonate, thiol, or a combination thereof.

As described elsewhere within this disclosure, the $M_{n+1}X_n(T_s)$ or $M'_2M''_nX_{n+1}$, materials produced in these methods and compositions have at least one layer, and sometimes a plurality of layers, each layer having a first and second surface, each layer comprising a substantially two-dimensional array of crystal cells; each crystal cell having an empirical formula of $M_{n+1}X_n$, such that each X is positioned within an octahedral array of M, wherein M is at least one Group 3, 4, 5, 6, or 7 metal (corresponding to Group IIIB, IVB, VB, VIB or VIIB metals, respectively), wherein each X is C and n=1, 2, or 3; wherein at least one of said surfaces of the layers has surface terminations, $T_s$, comprising alkoxide, alkyl, carboxylate, halide, hydroxide, hydride, oxide, sub-oxide, nitride, sub-nitride, sulfide, sulfonate, thiol, or a combination thereof.

Supplementing the descriptions above, $M_{n+1}X_n(T_s)$ compositions may be viewed as comprising free standing and stacked assemblies of two dimensional crystalline solids. Collectively, such compositions are referred to herein as "$M_{n+1}X_n(T_s)$," "MXene," "MXene compositions," or "MXene materials." Additionally, these terms "$M_{n+1}X_n(T_s)$," "MXene," "MXene compositions," or "MXene materials" also refer to those compositions derived by the chemical exfoliation of MAX phase materials, whether these compositions are present as free-standing 2-dimensional or stacked assemblies (as described further below). Reference to the carbide equivalent of these terms reflects the fact that X is carbon, C, in the lattice. Such compositions comprise at least one layer having first and second surfaces, each layer comprising a substantially two-dimensional array of crystal cells; each crystal cell having an empirical formula of $M_{n+1}X_n$, where M, X, and n are as defined above. These compositions may be comprised of individual layers or a plurality of such layers. In some embodiments, the $M_{n+1}X_n(T_s)$ MXenes comprising stacked assemblies may be capable of, or have atoms, ions, or molecules, that are intercalated between at least some of the layers. In other embodiments, these atoms or ions are lithium. In still other embodiments, these structures are part of an energy-storing device, such as a battery or supercapacitor. In still other embodiments these structures are added to polymers to make polymer composites.

The term "crystalline compositions comprising at least one layer having first and second surfaces, each layer comprising a substantially two-dimensional array of crystal cells" refers to the unique character of these materials. For purposes of visualization, the two-dimensional array of crystal cells may be viewed as an array of cells extending in an x-y plane, with the z-axis defining the thickness of the composition, without any restrictions as to the absolute orientation of that plane or those axes. It is preferred that the at least one layer having first and second surfaces contain but a single two-dimensional array of crystal cells (that is, the z-dimension is defined by the dimension of approximately one crystal cell), such that the planar surfaces of said cell array define the surface of the layer. That is, as used herein, "a substantially two-dimensional array of crystal cells" refers to an array which preferably includes a lateral (in x-y dimension) array of crystals having a thickness of a single cell, such that the top and bottom surfaces of the array are available for chemical modification. It should be appreciated that real compositions may contain portions having more than single crystal cell thicknesses.

Metals of Group 3, 4, 5, 6, or 7 (corresponding to Group TIM, IVB, VB, VIB, or VIIB), may be used either alone or in combination, said metals including, for example, Ti, Zr, Hf, V, Nb, Ta, Cr, Mo, and W. For the purposes of this disclosure, the terms "M" or "M atoms," "M elements," or "M metals" may also include Mn. Also, for purposes of this disclosure, compositions where M comprises Ti, Zr, Hf, V, Nb, Ta, Cr, Mo, W, or mixtures thereof constitute independent embodiments. Similarly, the oxides of M may comprise any one or more of these materials as separate embodiments. For example, M may comprise any one or combination of Hf, Cr, Mn, Mo, Nb, Sc, Ta, Ti, V, W, or Zr. In other preferred embodiments, the transition metal is one or more of Ti, Zr, V, Cr, Mo, Nb, Ta, or a combination thereof. In even more preferred embodiments, the transition metal is Ti, Ta, Mo, Nb, V, Cr, or a combination thereof.

In certain specific embodiments, $M_{n+1}X_n$ comprises $M_{n+1}C_n$ (i.e., where X=C, carbon) which may be $Ti_2C$, $V_2C$, $V_2N$, $Cr_2C$, $Zr_2C$, $Nb_2C$, $Hf_2C$, $Ta_2C$, $Mo_2C$, $Ti_3C_2$, $V_3C_2$, $Ta_3C_2$, $Mo_3C_2$, $(Cr_{2/3}Ti_{1/2})_3C_2$, $Ti_4C_3$, $V_4C_3$, $Ta_4C_3$, $Nb_4C_3$, or a combination thereof.

In more specific embodiments, the $M_{n+1}X_n(T_s)$ crystal cells have an empirical formula $Ti_3C_2$ or $Ti_2C$. In certain of these embodiments, at least one of said surfaces of each layer of these two dimensional crystal cells is coated with surface terminations, $T_s$, comprising alkoxide, fluoride, hydroxide, oxide, sub-oxide, sulfonate, or a combination thereof.

The range of compositions available can be seen as extending even further when one considers that each M-atom position within the overall $M_{n+1}X_n$ matrix can be represented by more than one element. That is, one or more type of M-atom can occupy each M-position within the respective matrices. In certain exemplary non-limiting examples, these can be $(M^A{}_xM^B{}_y)_2C$, $(M^A{}_xM^B{}_y)$ or $(M^A{}_xM^B{}_y)_4C_3$, where $M^A$ and $M^B$ are independently members of the same group, and x+y=1. For example, in one non-limiting example, such a composition can be $(V_{1/2}Cr_{1/2})_3C_2$.

In other embodiments, the MXenes may comprise compositions having at least two Group 4, 5, 6, or 7 metals, and the $M_{n+1}X_n(T_s)$ composition is represented by a formula $M'_2M''_mX_{m+1}(T_s)$, where m=n−1. Typically, these are carbides (i.e., X is carbon). Such compositions are described in U.S. Provisional Application No. 62/149,890, this reference being incorporated herein by reference for all purposes. In these double transition metal carbides, M' may be Ti, V, Cr, or Mo. In these ordered double transition metal carbides, M" may be Ti, V, Nb, or Ta, provided that M' is different than M". These carbides may be ordered or disordered.

Individual embodiments of the ordered double transition metal carbides include those compositions where $M'_2M''_mX_{m+1}$, is independently $Mo_2TiC_2$, $Mo_2VC_2$, $Mo_2TaC_2$, $Mo_2NbC_2$, $Mo_2Ti_2C_3$, $Cr_2TiC_2$, $Cr_2VC_2$, $Cr_2TaC_2$, $Cr_2NbC_2$, $Ti_2NbC_2$, $Ti_2TaC_2$, $V_2TaC_2$, $V_2TiC_2$, or a combination thereof. In some other embodiments, $M'_2M''_mX_{m+1}$, is independently $Mo_2TiC_2$, $Mo_2VC_2$, $Mo_2TaC_2$, $Mo_2NbC_2$, $Cr_2VC_2$, $Cr_2TaC_2$, $Cr_2NbC_2$, $Ti_2NbC_2$, $Ti_2TaC_2$, $V_2TaC_2$, $V_2TiC_2$, or a combination thereof. In other embodiments, $M'_2M''_mX_{m+1}$, is independently $Mo_2Ti_2C_3$, $Mo_2V_2C_3$, $Mo_2Nb_2C_3$, $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$, $Ti_2Nb_2C_3$, $Ti_2Ta_2C_3$, $V_2Ta_2C_3$, $V_2Nb_2C_3$, $V_2Ti_2C_3$, or a combination thereof. In still other embodiments, $M'_2M''_mX_{m+1}$, is independently $Nb_2VC_2$, $Ta_2TiC_2$, $Ta_2VC_2$, $Nb_2TiC_2$ or a combination thereof.

Previously, these MXene materials, described above as either $M_{n-1}X_n(T_s)$ or $M'_2M''_mX_{m+1}$, may be prepared by selectively removing an A group element from a precursor MAX-phase material. Depending on the specific MAX being considered, these A group elements may be independently defined as including Al, As, Cd, Ga, Ge, P, Pb, In, S, Sn, or Tl. These same materials are contemplated as independent embodiments for the A element used in the present invention. Some of these A-group elements may be removed in aqueous media, for example, by a process comprising treatment with a fluorine-containing acid. For example, Al, As, Ga, Ge, In, P, Pb, S, or Sn may be removed in this way, although Al is especially amenable to such extractions. Aqueous hydrofluoric acid is particularly suitable for this purpose, whether used as provided, or generated in situ by conventional methods. Such methods include the use of any one or more of the following:

(a) aqueous ammonium hydrogen fluoride ($NH_4F \cdot HF$);

(b) an alkali metal bifluoride salt (i.e., $QHF_2$, where Q is Li, Na, or K), or a combination thereof; or (c) at least one fluoride salt, such as an alkali metal, alkaline earth metal, or ammonium fluoride salt (e.g., LiF, NaF, KF, CsF, $CaF_2$, tetraalkyl ammonium fluoride (e.g., tetrabutyl ammonium fluoride)) in the presence of at least one mineral acid that is stronger than HF (i.e., has a higher Ka value) and can react with fluorides to form HF in situ (such as HCl, HBr, HI, $H_3PO_4$, $HNO_3$, oxalic acid, or $H_2SO_4$); or (d) a combination of two or more of (a)-(c).

Nanoparticles, graphene particles, and MXene particles may be, and preferably are, functionalized to allow homogeneous or nearly homogeneous dispersion in the solvents employed. In those embodiments where the solvents are organic solvents (e.g., substantially free of water), the nanoparticles and MXene particles may be functionalized with pendant substituted $C_{1-36}$ alkyl groups, where the optional substituents include amine, halogen, chalcogen, aldehyde, ketone, carboxyl, carbonyl, ester, and hydroxyl groups.

As described herein, the presence of the nanoparticles, graphene, and MXene particles inhibits the growth of dendrites in lithium- or sodium-based batteries, and in certain embodiments, the cells, batteries, and/or devices may be characterized by this property. That is, in certain embodiments, the cell, battery, and/or device, when operating (charging or discharging) exhibits measurably less growth of lithium or sodium dendrites than a corresponding battery absent the nanoparticles, graphene, or MXene particles, when tested according to UN/DOT 38.3, IEC 62133 and UL 2054. In some embodiments, the cell, battery, and/or device exhibits no growth of such dendrites when tested by these methods.

While the invention thus far has been described in terms of cells, batteries, and/or devices containing these electrolytes, the electrolytes themselves represent separate embodiments. That is, any of the descriptions of the electrolytes made in the context of cells, batteries, and/or devices should each be seen as independent embodiments in their own right. For example, in some embodiments, the electrolyte composition comprises:

(a) a solvent suitable for use in a battery electrolyte comprising:
  (i) an organic liquid solvent, such as ethylene carbonate, diethyl carbonate, dimethyl carbonate, dioxolane and dimethoxyethane; or
  (ii) an ionic liquid such as 1-ethyl-3-methylimidazolium tetrafluoroborate (EMI-BF$_4$), 1-ethyl-3-methylimidazolium bis(trifluoromethanesulfonyl)imide (EMI-TSFI), 1-butyl-1-methylpyrrolidinium tetrafluoroborate (BMP-BF$_4$), and 1-butyl-1-methylpyrrolidinium bis(trifluoromethanesulfonyl)imide (BMP-TSFI); or
  (iii) a combination thereof;

(b) a lithium ion salt or sodium ion salt suitable for use in a battery electrolyte, such as lithium or sodium salts of hexafluorophosphate (LiPF$_6$), hexafluoroarsenate monohydrate (LiAsF$_6$), perchlorate (LiClO$_4$), tetrafluoroborate (LiBF$_4$), triflate (LiCF$_3$SO$_3$), bis(oxalate)borate (LiBOB), bis(trifluoromethane)sulfonamide (LiTFSI), bis(fluorosulfonyl)imide (LiFSI), or a mixture thereof; and (c) a dispersion of
  (i) nanoparticles of carbon (e.g., nanodiamonds, alliform carbon), metal or metalloid oxides or hydroxides (e.g., optionally hydrated alumina, silica, titania, zirconia), carbides (e.g., SiC), nitrides (e.g., BN, Al$_3$N$_4$), or sulfides;
  (ii) graphene or MXene particles; or
  (iii) a combination thereof.

Nanodiamond Electrolyte

Nanodiamond particles used herein were produced by a commercial detonation method at a low cost, then carboxylated and subsequently modified by covalent linking of octadecylamine (ODA)[59,60]. They may have a crystal size of ~5 nm and high crystallinity as seen in FIG. 15C and FIGS. 20A-20E. The interplanar crystal spacing in lattice-fringe transmission electron microscopy (TEM) images was measured to be ~0.21 nm, which corresponds to diamond (111) planes (0.206 nm, PDF #65-0537). An EC/DEC electrolyte with dispersed modified nanodiamond particles and a saturation concentration of 0.82 mg mL$^{-1}$ was prepared. Compared to the original colorless and transparent EC/DEC electrolyte, the solution became light-yellow after nanodiamond particle addition (FIG. 15D). Aggregation of nanodiamond particles cannot be fully avoided in the electrolyte and nanodiamond clusters with a size of ~530 nm were measured by dynamic light scattering (FIG. 15E). This size of nanodiamond clusters was largely reduced compared to the pristine commercial nanodiamond[61]. The solution color and size distribution of nanodiamond clusters in the electrolyte did not change after 2 months, indicating the stability of the nanodiamond dispersion in the electrolyte (FIGS. 20C-20E). The nanodiamond articles are able to adsorb Li ions onto their surfaces (FIG. 15F) and co-deposit onto the Cu foil with Li metal, thus acting as the nucleation seeds that guide Li ion deposition. Furthermore, the charged nanodiamond particles do not aggregate inside the electrochemical cells during the practical charging/discharging processes.

Li Plating Morphology

Figure 21:
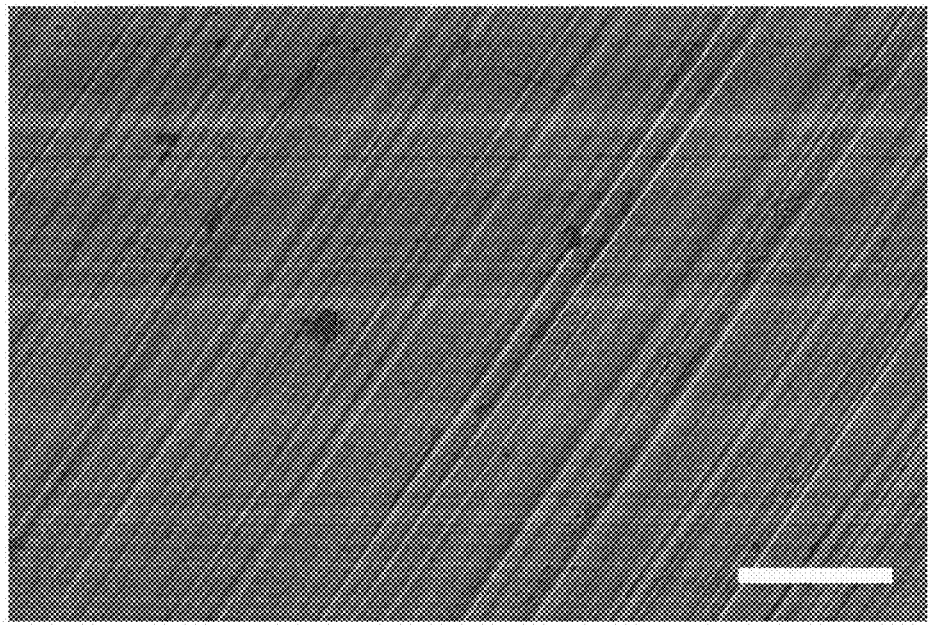
FIG. 21—shows the SEM image of Cu foil before Li plating. The scale bar is 50 μm.

FIGS. 15A-15F clearly illustrate the role of nanodiamond additives in Li ion deposition behavior. Stripping of Li ions from the Li foil to plate on the Cu foil was conducted in an electrolytic bath with or without nanodiamond additives (FIG. 15A). The Cu foil surface before plating was clean and even (FIG. 21). The morphologies of Li deposits after the first Li ion plating process (discharging at 0.5 mA cm$^{-2}$ for 6 h) are shown in FIGS. 16A-16G. Without nanodiamond in the electrolyte, an uneven morphology is clearly shown, as many bumps were observed on the surface of deposited Li films (FIG. 16B, 16D, 16F, 16H). After introducing nanodiamond into the electrolyte, uniform deposition of Li metal on Cu foil was achieved, as indicated by a bright metallic luster caused by the uniform and dense metal surface (FIGS. 16C, 16E, 16G, and 16I). Since no 500-nm diamond cluster could be observed on the Li surface or incorporated into Li, we assume that only a small number of individual nanometer-sized nanodiamond particles were captured by the growing Li film, if any at all.

Figure 16A:
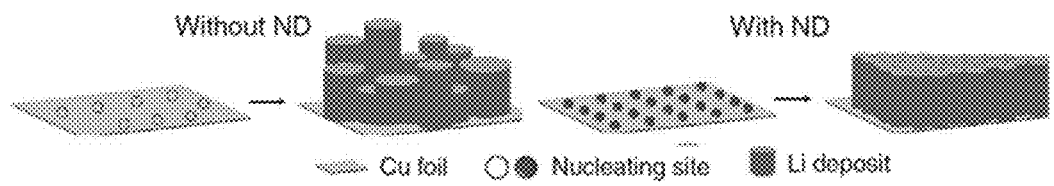
FIGS. 16A-16I show the morphology of Li deposits after galvanostatic plating.
Figure 16B:
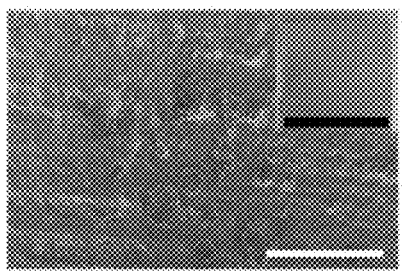
Figure 16C:
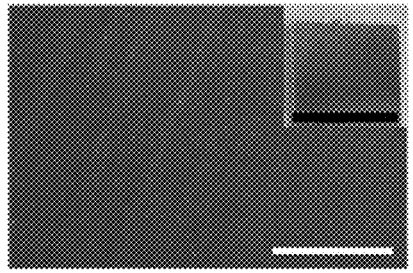
Figure 16D:
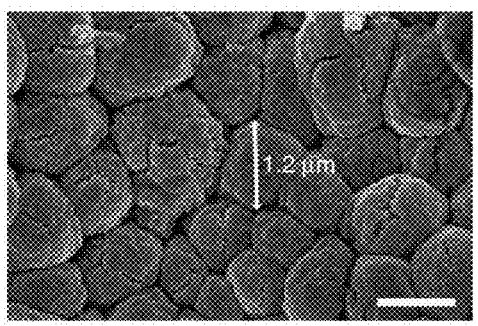
Figure 16E:
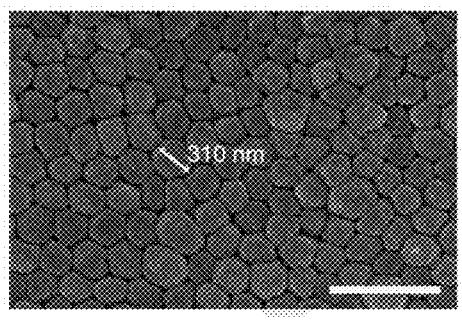
Figure 16F:
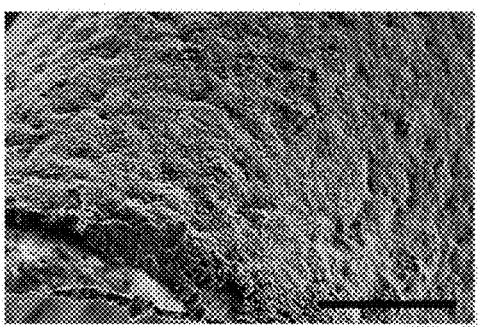
Figure 16G:
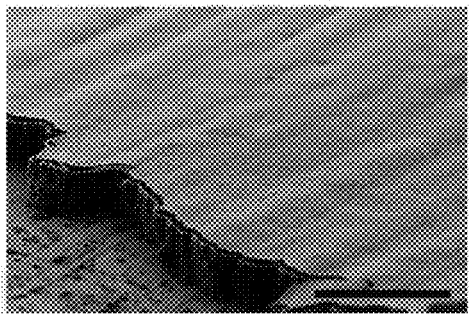
Figure 22:
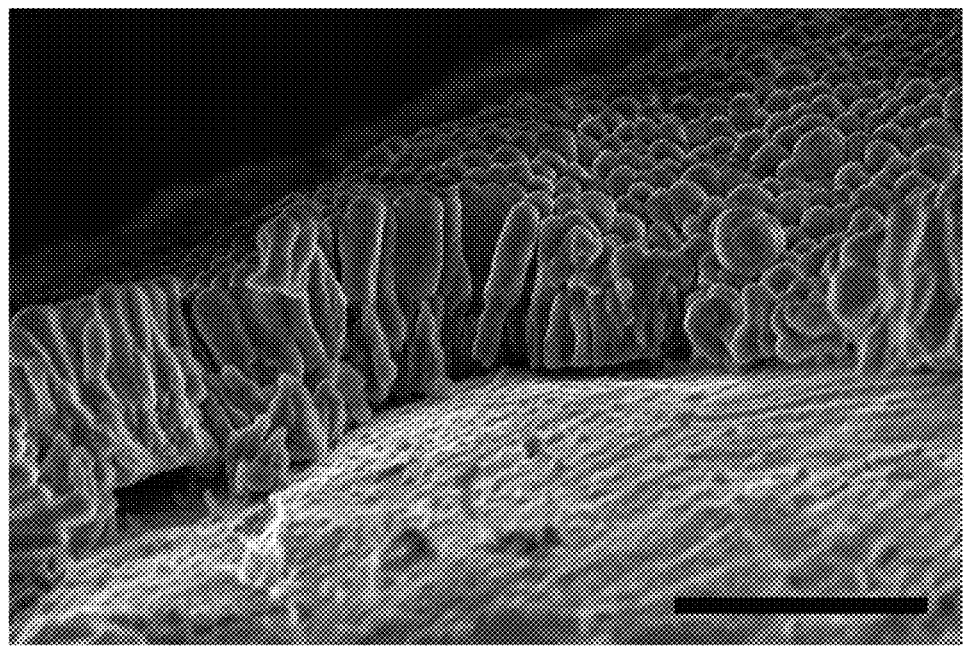
FIG. 22 shows the SEM image of first Li deposits with columnar structure in $LiPF_6$-EC/DEC electrolyte. The scale bar is 10 μm.
Figure 23A:
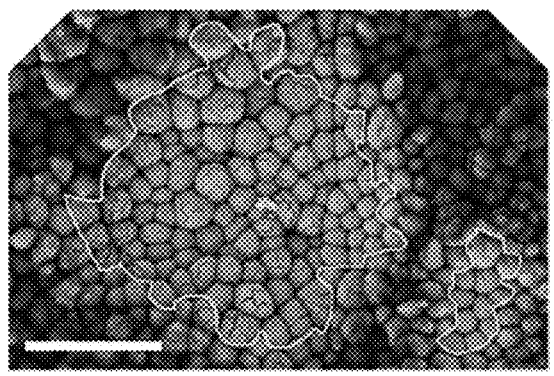
FIGS. 23A-23H show the size distribution of Li deposited in different electrolyte at 0.5 mA cm$^{-2}$ for 6 h. Li deposition morphology is shown with concentrations of 0 (FIG. 23A), 0.41 mg mL$^{-1}$ (FIG. 23B), 0.82 mg mL$^{-1}$ (FIG. 23C), and 4.1 mg mL$^{-1}$ of nanodiamond electrolyte (FIG. 23D), with corresponding size distributions shown in FIGS. 23E-23H, respectively. The white outlining in FIGS. 23A-23D was adopted to choose the regions to obtain the size distribution in FIGS. 23E-23H. The scale bars in FIGS. 23A-23D are 5, 5, 1, and 5 µm, respectively.
Figure 23B:
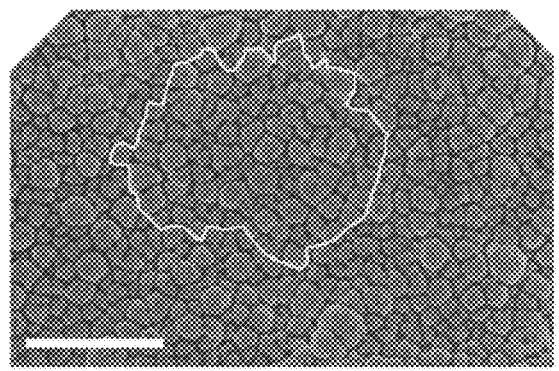
Figure 23C:
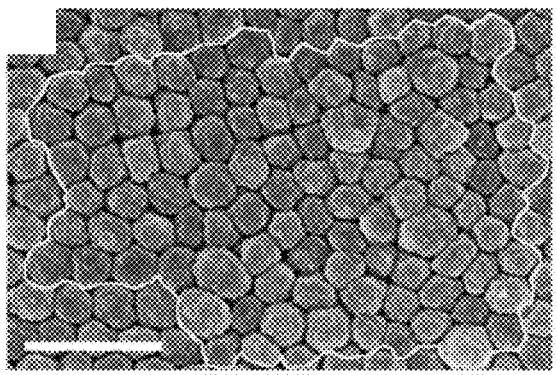
Figure 23D:
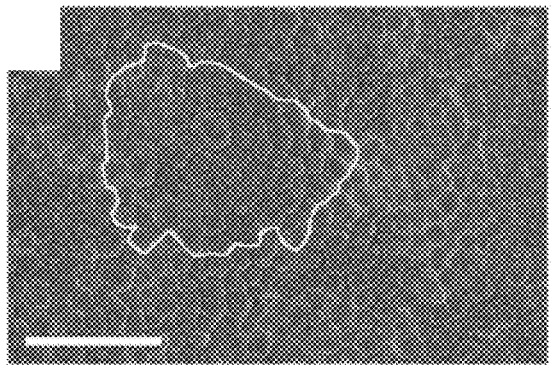
Figure 23E:
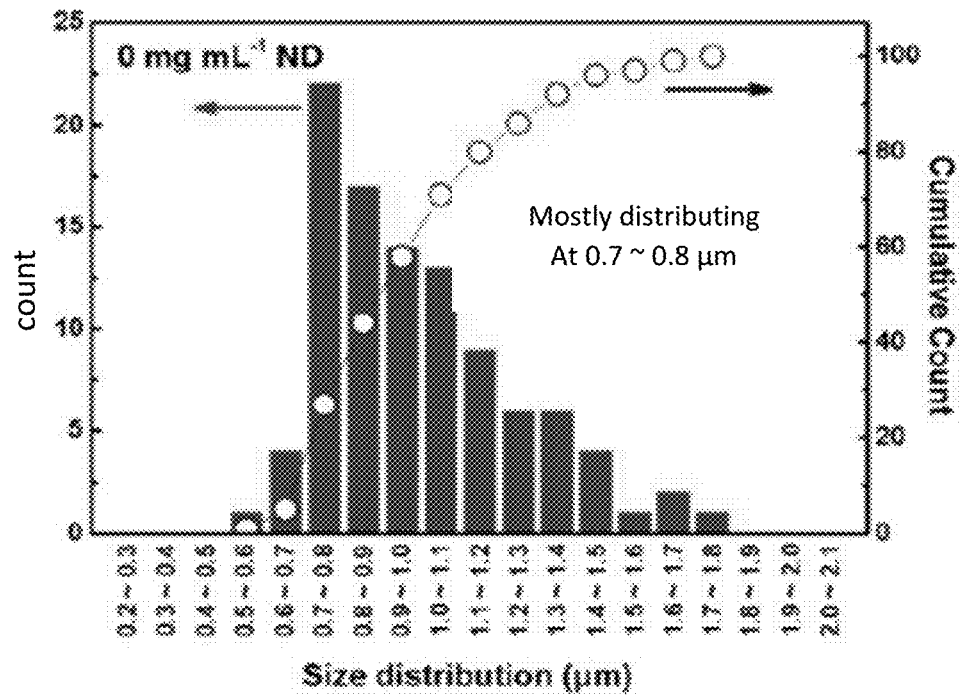
Figure 25:
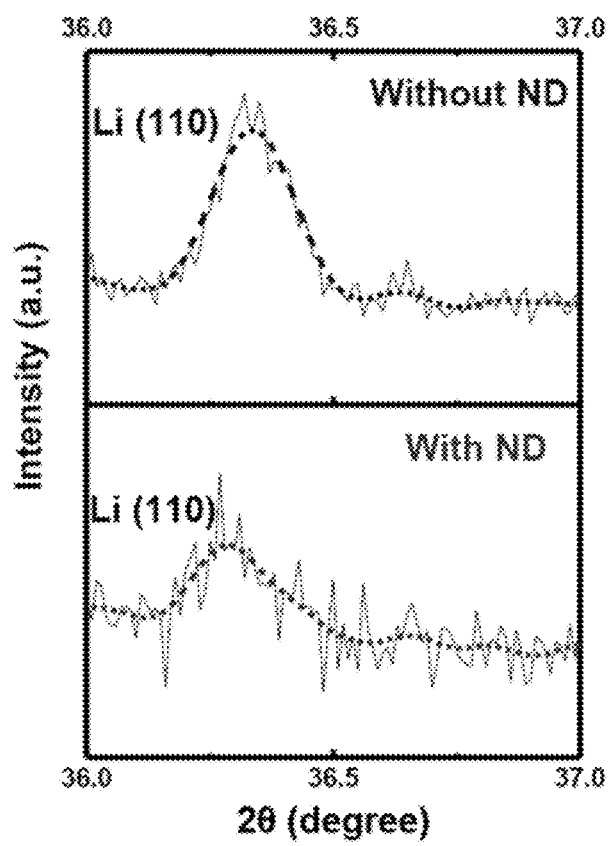
FIG. 25 shows XRD patterns of Li deposits at 0.5 mA $cm^{-2}$.
Figure 26A:
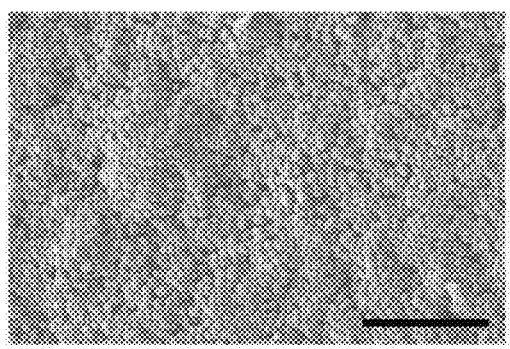
FIGS. 26A-26B show SEM images of Li deposits in nanodiamond-containing electrolyte.
Figure 26B:
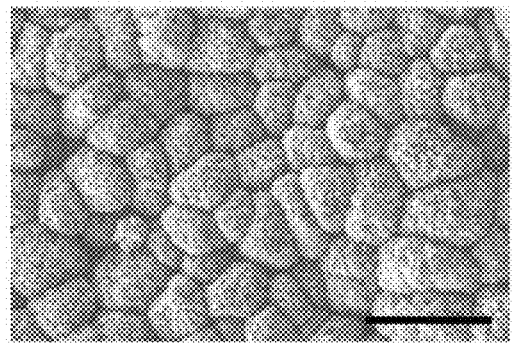
Figure 27A:
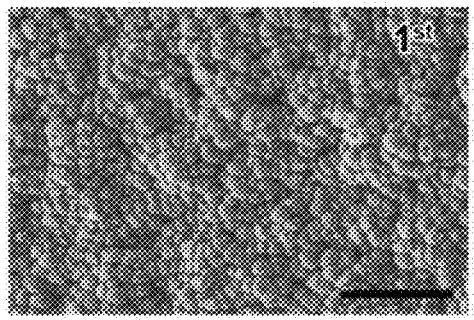
FIGS. 27A-27F show SEM images of Li deposits in nanodiamond-containing electrolyte after many cycles. Li morphology is shown after the $1^{st}$ cycle in FIG. 27A, after the $2^{nd}$ cycle in FIG. 27B, after the $5^{th}$ cycle in FIG. 27C, after the $10^{th}$ cycle in FIG. 27D, after the $20^{th}$ cycle in FIG. 27E, and after the $50^{th}$ cycle in FIG. 27F. The scale bars in FIGS. 27A-27F are 10 µm.
Figure 27B:
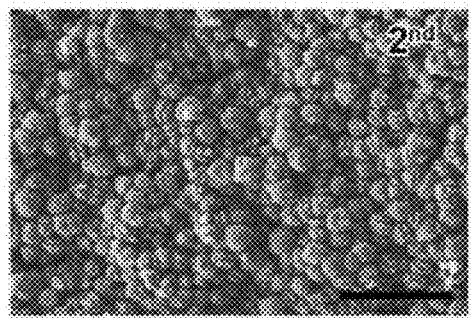
Figure 27C:
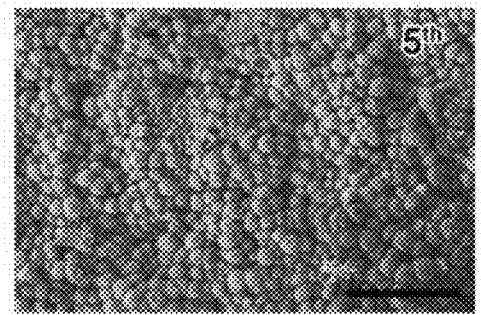
Figure 27D:
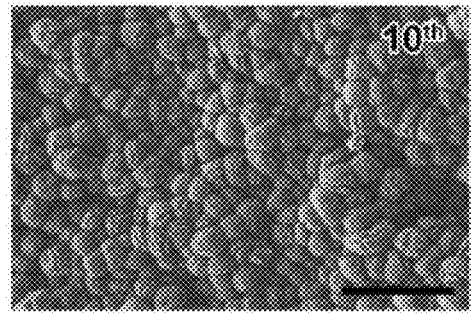
Figure 27E:
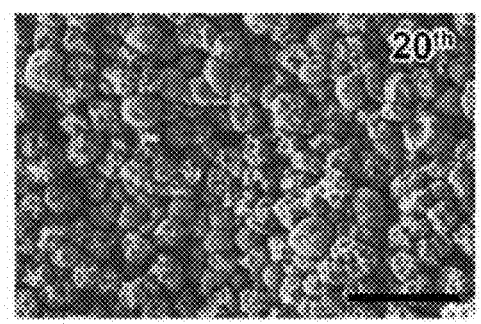
Figure 27F:
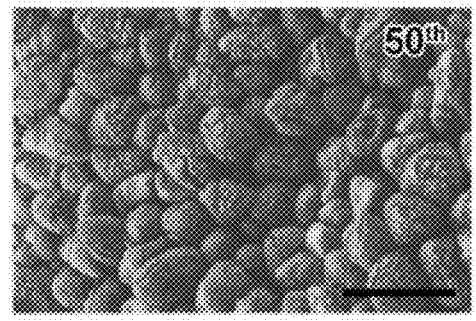

The Li deposits appear to have a columnar structure (FIG. 22). In the electrolyte without nanodiamond, the deposited Li columns had an average diameter of 0.7~0.8 μm (FIGS. 16D, 23A and 23E). Li columns with a small average diameters (0.3~0.4 μm) were obtained in the nanodiamond-containing electrolyte (FIGS. 16E, 23C and 23G), leading to a dendrite-free morphology[40]. The colloidal solution remains stable after the nanodiamond electrolyte was stored for 2 months (FIGS. 24A-24D). The size of those columns is smaller than the size of nanodiamond aggregates in solution, again suggesting that these 500-nm nanodiamond aggregates break apart during Li plating. The differences in the crystal sizes of Li deposits were analyzed by X-ray diffraction (XRD) (FIG. 25). In X-ray diffraction, the Scherrer Equation is applied which relates the size of sub-micrometre particles, or crystallites, in a solid to the broadening of a peak in a diffraction pattern. In the Scherrer Equation, as θ decreases and β increases, D decreases. The XRD pattern of Li deposits in the nanodiamond electrolyte indicates a smaller θ and larger β, thus the Li deposit in the nanodiamond-containing electrolyte has a smaller grain size (D) than that in neat electrolyte. $D=K\lambda/\beta \cos\theta$ where D is grain size, K is Scherrer constant (K=0.89), λ is the X-ray wavelength, β is the full width at half the maximum intensity (FWHM), θ is the Bragg angle. Therefore, a wider peak of Li (110) of Li deposits in the nanodiamond electrolyte confirms their smaller crystal size, compared to the Li crystal size in the nanodiamond-free electrolyte. The reduced size of Li deposits in the nanodiamond electrolyte is ascribed to the increased number of nucleation sites that are induced by the nanodiamond particles[33]. The arrayed morphology of Li deposits can be well maintained when the current density is increased to 3.0 mA cm$^{-2}$ for 1.0 h (3.0 mAh cm$^{-2}$) (FIGS. 26A-26B).

Figure 16H:
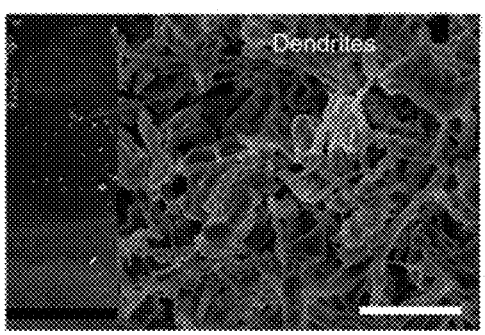
Figure 16I:
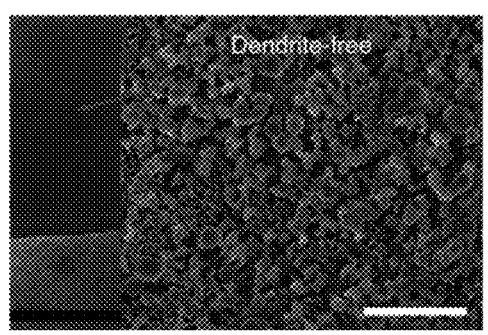

After the third Li plating and stripping (charging and discharging at 0.5 mA cm-2 for three cycles with each step time of 6 h), many optically visible particles on the Li deposits were observed in the nanodiamond-free electrolyte (FIG. 16H). Imaging via high-magnification scanning electron microscopy (SEM) revealed that these particles were dendritic Li clusters (FIG. 16H). In comparison, the dendrite-free morphology of Li deposits was observed in the nanodiamond-containing electrolyte (FIG. 16I). These results clearly indicate that nanodiamond additives successfully induce smaller crystal sizes of Li deposits, leading to a smooth surface and dendrite-free morphology.

Li morphologies were studied after 1st, 2nd, 5th, 10th, 20th, and 50th cycles at 0.5 mA cm$^{-2}$ with a plating/stripping time of 1 h in each cycle (FIGS. 27A-27F). Although some coarsening appears after 20 and 50 cycles, the primary morphology was maintained after 100 h Li plating/stripping at a relatively high-current density (0.5 mA cm$^{-2}$). This finding indicates that nanodiamond particles both remain available in the electrolyte and are able to preserve dendrite-free morphology, even after long-term cycling.

Figure 28:
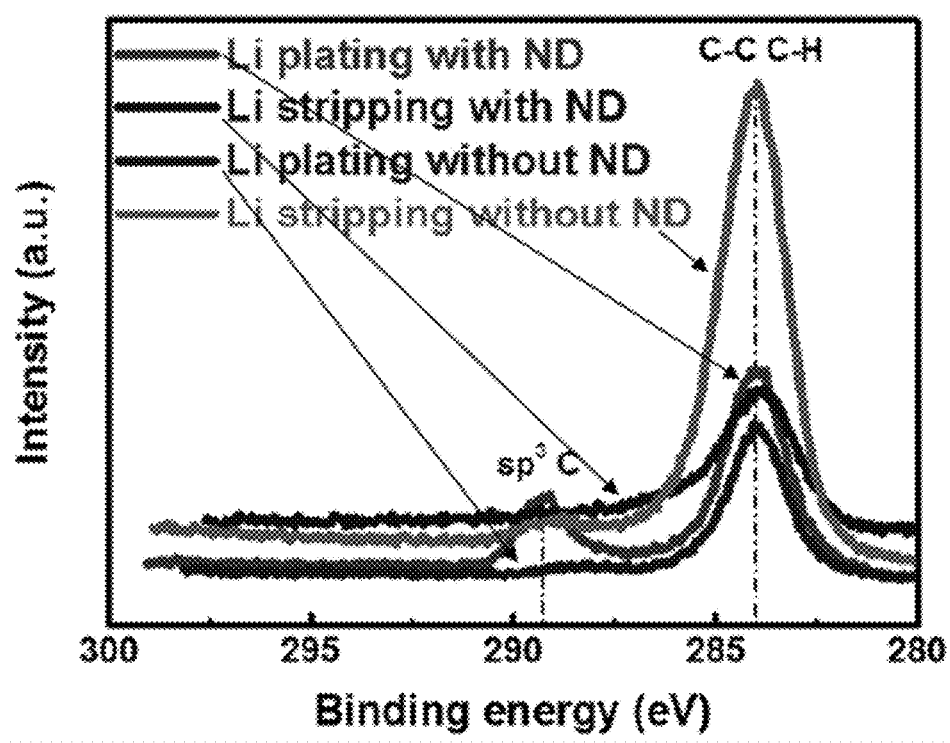
FIG. 28 shows the XPS C1s spectrum of the Li anode surface.
Figure 29A:
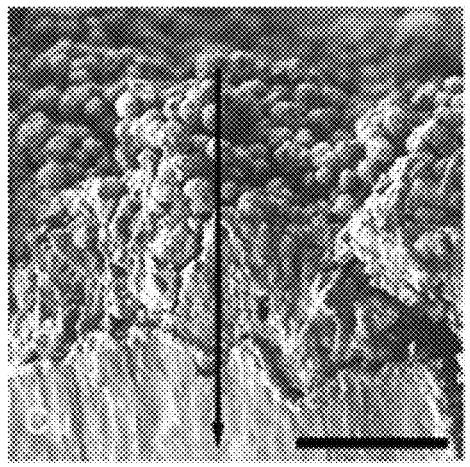
FIGS. 29A-29D show the elemental distribution in a cross-section of the Li deposits. The cross-sectional SEM image of Li deposits in FIG. 29A is without nanodiamond and in FIG. 29B is with nanodiamond additives.
Figure 29B:
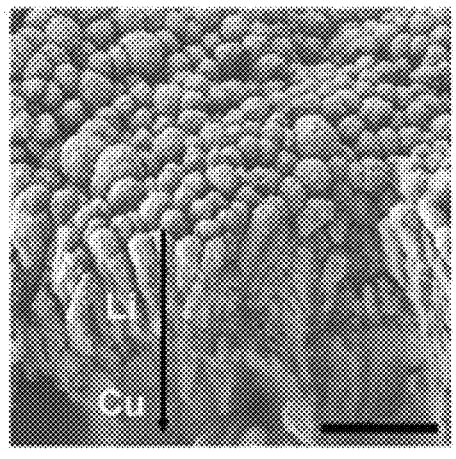
Figure 29C:
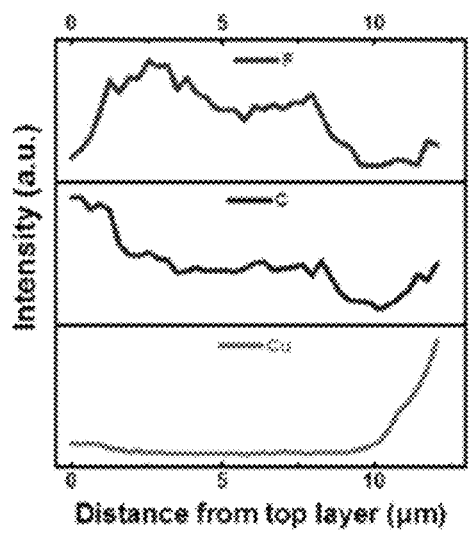
Figure 29D:
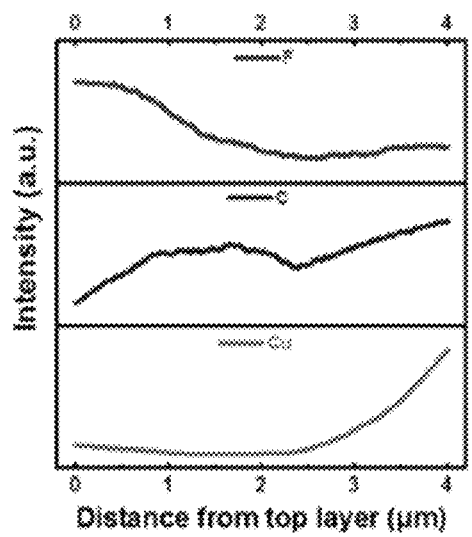
Figure 32A:
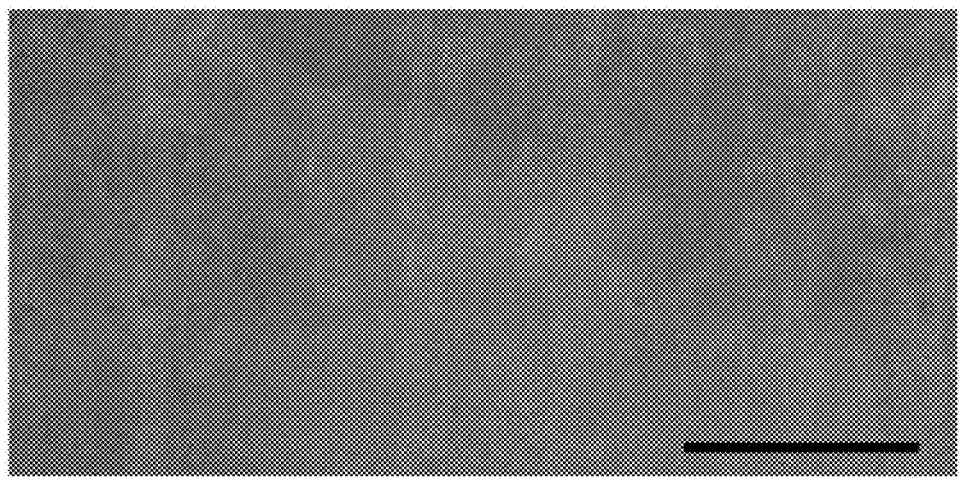
FIGS. 32A-32C show the morphology of Li deposits after galvanostatic plating one time in $LiPF_6$-EC/DEC electrolyte with 4.1 mg $mL^{-1}$ of nanodiamond.
Figure 32B:
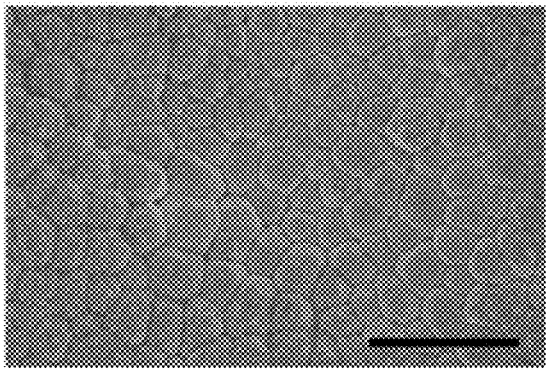
Figure 32C:
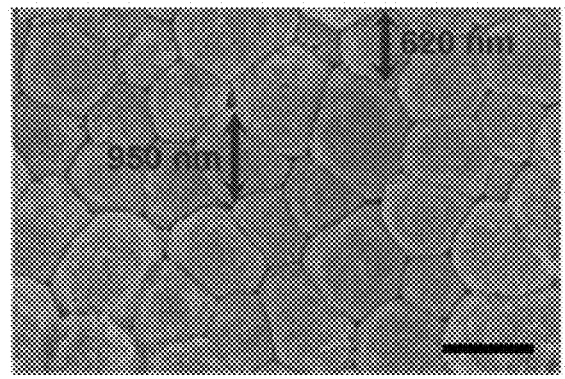

X-ray photoelectron spectroscopy (XPS) of Li deposits after Li plating/stripping confirmed that superior long-term stability is induced by the recyclability of nanodiamond during Li plating and stripping (FIG. 28). Relative to nanodiamond-free electrolyte, Li in nanodiamond-containing electrolyte displays a new peak, which originates from the co-deposited nanodiamond particles. The co-deposition of nanodiamond particles and Li was also confirmed by the carbon enrichment in the deposited Li layer (FIGS. 29A-29D).

From the surface layer to Li metal, the signal of Cu rises. This is because Cu exists in the current collector and no Cu is present on the surface Li layer. F is present in the SEI layer due to the $LiPF_6$ composition. Therefore, F herein is adopted as the indicator of the surface SEI film. Carbon can be introduced by solvent decomposition and nanodiamond co-deposits. In the nanodiamond-free electrolyte, the carbon content correlates to the F content, indicating the presence of the SEI layer. In the nanodiamond-containing electrolyte, the F content decreases, while the C content remains unchanged. If only decomposition products were present and no nanodiamond co-deposit, the signal of carbon would decrease. These results confirm that nanodiamond co-deposits with Li.

After Li stripping, the nanodiamond peak in the XPS spectrum disappears, demonstrating the recyclability of nanodiamond during Li plating and stripping. Additionally supporting their recyclability, nanodiamond particles cannot only co-deposit with Li ions, but also strip off from the Cu substrate to provide the long-term stability of Li plating morphology.

Figure 23F:
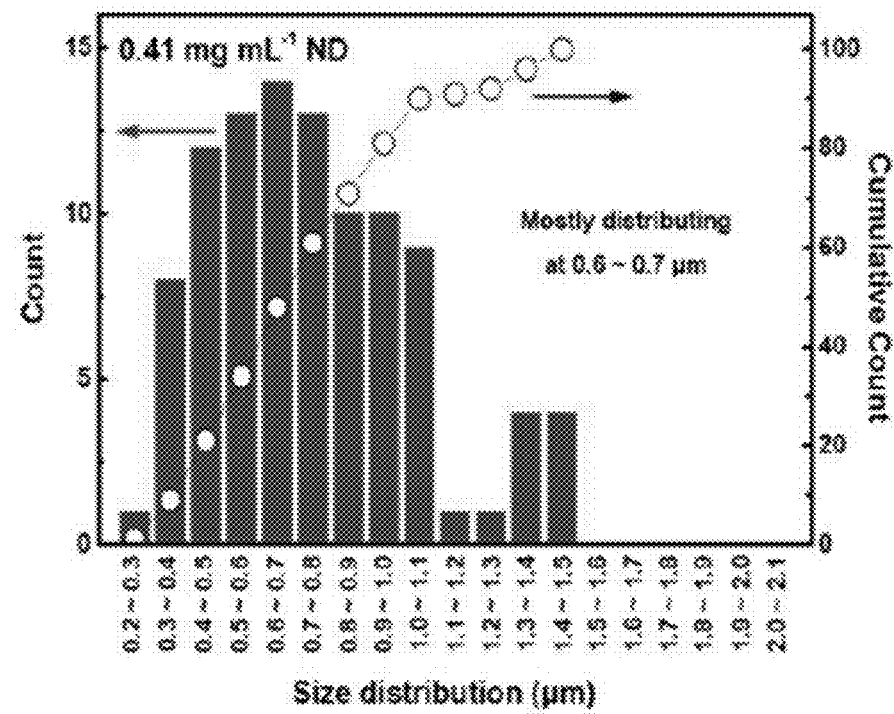
Figure 23G:
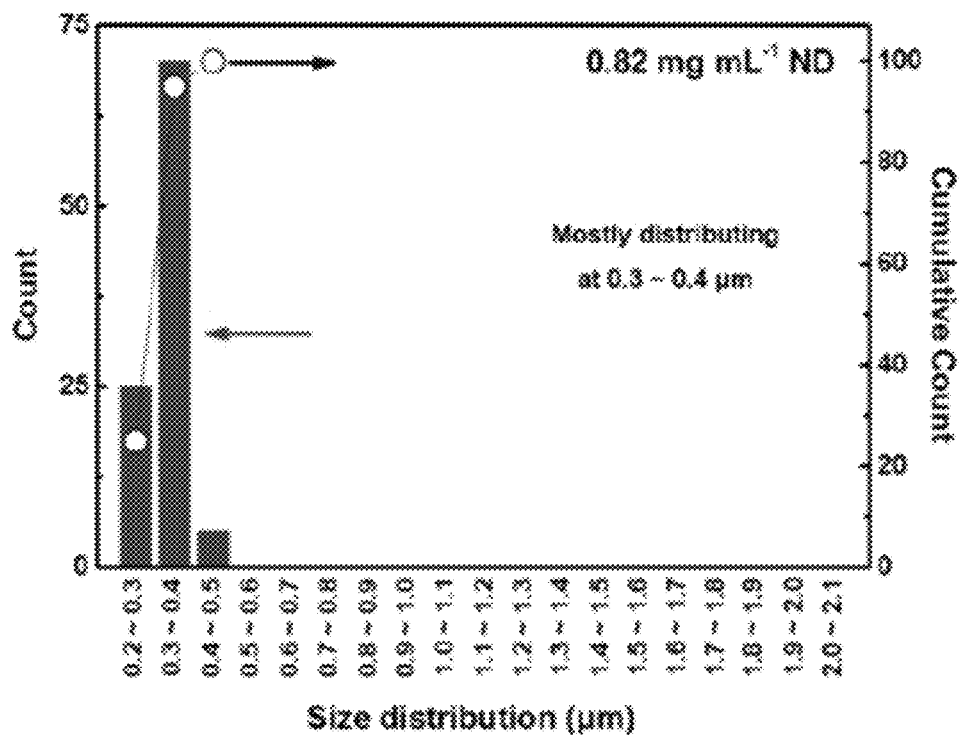
Figure 23H:
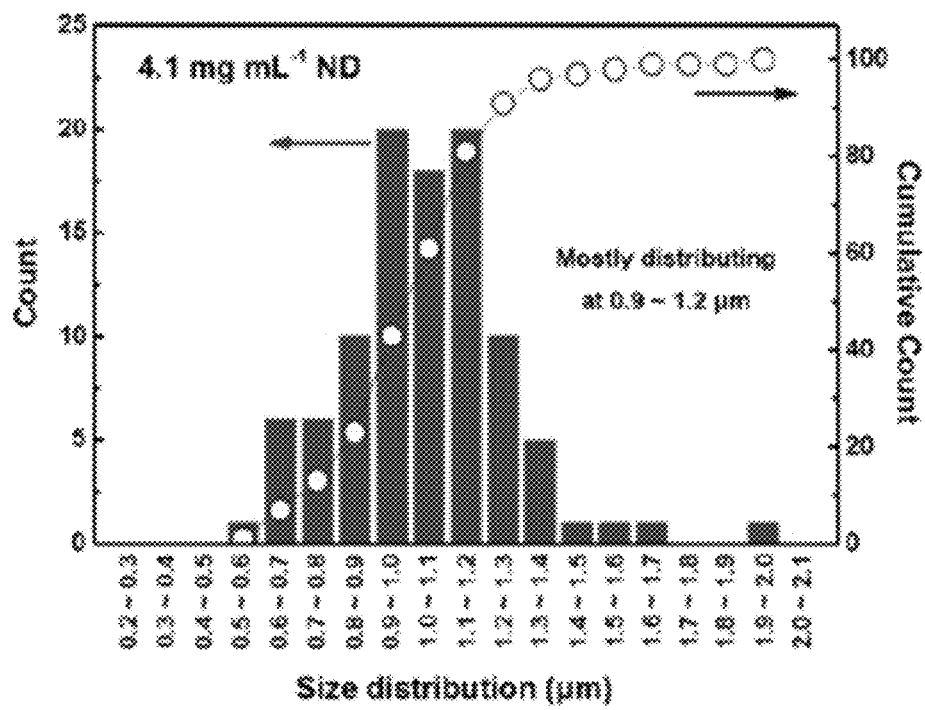
Figure 24A:
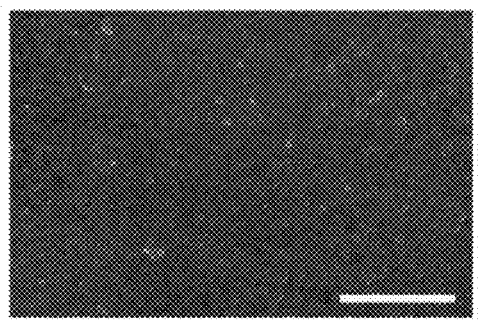
FIGS. 24A-24D show the stability of the morphology of Li deposits in the same nanodiamond electrolyte.
Figure 24B:
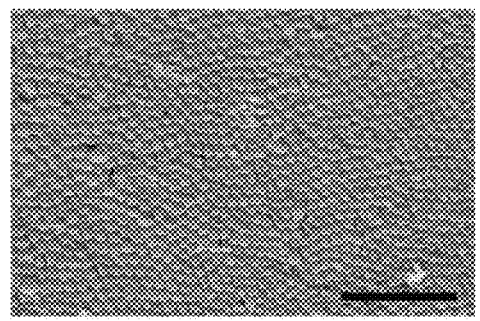
Figure 24C:
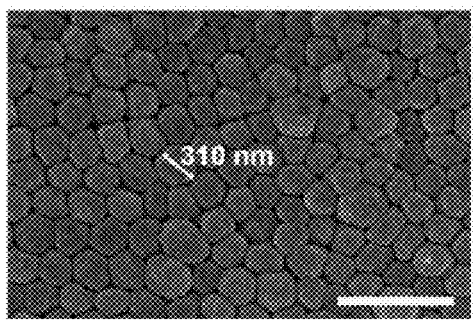
Figure 24D:
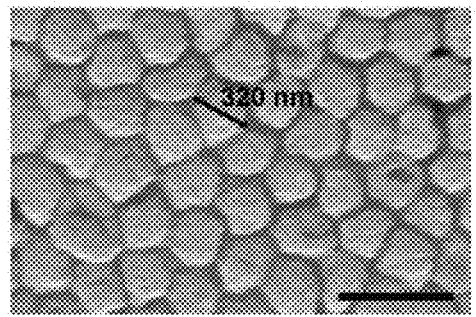

Diluted (0.41 mg mL$^{-1}$) and concentrated (4.1 mg mL$^{-1}$) nanodiamond electrolytes were prepared to investigate the effect of nanodiamond concentration on the Li plating morphology (FIGS. 30A-30B). In the 0.41 mg mL$^{-1}$ nanodiamond electrolyte, Li deposits were less uniform, containing clearly smooth regions and regions with a few bumps (the size of Li deposits is about 2.6 nm) (FIGS. 31A-31E). This can be ascribed to an insufficient number of nucleation sites. Even in the smooth regions, the size of Li crystals varied considerably, ranging from several hundred nanometers to a few microns with an average size of 0.6~0.7 μm (FIGS. 23B, 23F and 31C). An interesting phenomenon is that the size of Li in the bumpy regions was always larger than in the smooth regions. This emphasizes the importance of reducing the size of Li crystals by providing a large number of nucleation sites. In the 4.1 mg mL$^{-1}$ nanodiamond electrolyte, Li deposits had an average size of 0.9~1.2 μm (FIG. 23D, 23H and FIG. 32A-32C), which is more uniform than those in the 0.41 mg mL$^{-1}$ nanodiamond electrolyte. However, the smoothness in the 4.1 mg mL$^{-1}$ nanodiamond electrolyte was worse than in the 0.82 mg mL$^{-1}$ nanodiamond electrolyte. This is because the dispersion contains a large amount of nanodiamond aggregates, and is consequently oversaturated and unstable. The observed concentration dependence highlights the importance of a high concentration and a uniform dispersion of nanodiamond particles in the electrolyte, which may be improved by modifying the functionalization of nanodiamond and controlling the size of the aggregates.

Interaction Between Li Ions and Nanodiamond.

Figure 17A:
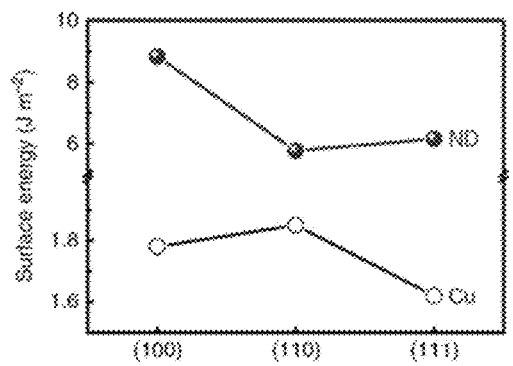
FIGS. 17A-17D show the first-principle calculations to describe Li ion plating behavior on nanodiamond surface.

To better understand the nanodiamond-guided Li plating behavior, first-principle calculations should be carried out. First, the surface energies of several low index facets for nanodiamond and Cu should be calculated to determine the most stable and dominating surfaces (FIG. 17A). The results indicate that nanodiamond (110) and Cu (111) are the dominating surfaces for each crystal with the lowest surface energies of 5.76 and 1.62 J m$^{-2}$, respectively. Therefore, nanodiamond (110) and Cu (111) were chosen as the base surfaces for the following discussions of binding energy and diffusion energy barriers.

Figure 17B:
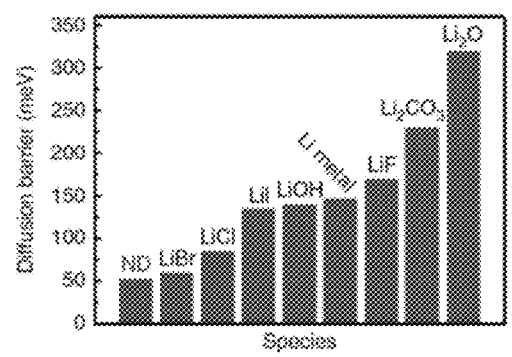
Figure 17C:
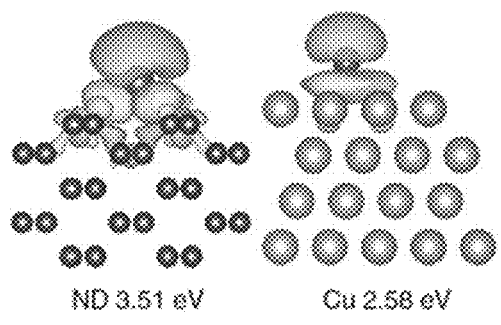
Figure 17D:
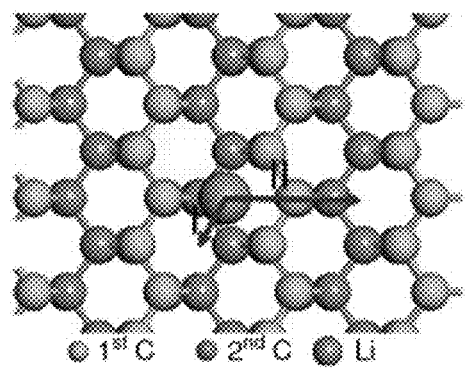

The binding energies of Li on nanodiamond (110) and Cu (111) surfaces were calculated to be 3.51 and 2.58 eV, respectively (FIG. 17C). The large charge transfer between Li and the nanodiamond (110) surface contributes to its high-binding energy. The nearly 1 eV higher binding energy for nanodiamond and Li ions results in a stronger preferential adsorption of Li ions on the nanodiamond surface rather than onto the Cu surface during Li plating. After adsorption, Li ions can either aggregate into a large dendrite, or distribute uniformly and form dendrite-free Li deposits. To investigate Li ion diffusion behavior, the diffusion barrier of Li on nanodiamond was calculated and compared with that on other materials published in literature (FIGS. 17B, 17D)[63]. Compared with these materials, nanodiamond has the lowest Li diffusion energy barrier. This indicates that at the interface of the cathode (Cu foil) and electrolyte, Li ions are inclined to adsorb onto the nanodiamond surface and weaken aggregation and can easily diffuse and distribute uniformly to produce a dendrite-free morphology[64,65].

Electrochemical Cycling Performance

Figure 33A:
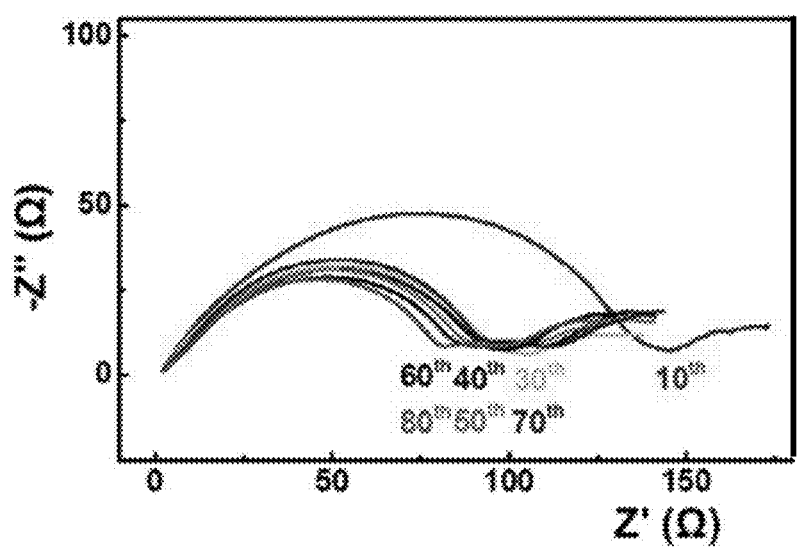
FIGS. 33A-33B show electrochemical impedance spectroscopy (EIS) images of Li|Li cells at 1.0 mA $cm^{-2}$.
Figure 33B:
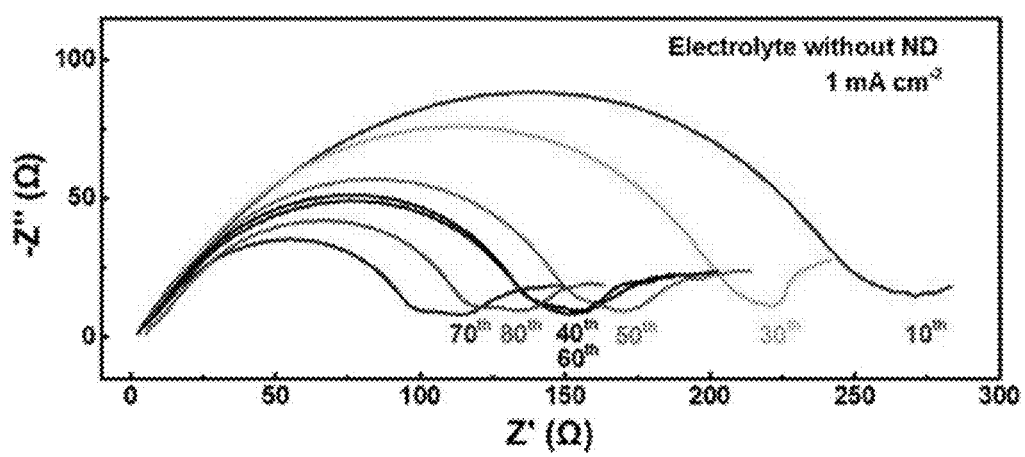

The long-term electrochemical cycling stability of Li electrodes was explored by testing symmetrical Li|Li cells. As shown in FIGS. 18A and 18B, symmetrical Li|Li electrodes have stable cycling in the nanodiamond electrolyte for 200 and 150 h (tests were stopped at that point) at 1.0 and 2.0 mA cm$^{-2}$, respectively, exhibiting stable Li metal deposition, though with little increase in the polarization (100 mV at 1 mA cm$^{-2}$ to 120 mV at 2 mA cm$^{-2}$). In comparison, symmetrical Li|Li electrodes in the nanodiamond-free electrolyte have obvious fluctuations in voltages caused by the ever-changing and increasing interfaces of the Li metal and electrolyte. At a high current rate (2.0 mA cm$^{-2}$), the polarization of the nanodiamond-free electrolyte is much larger than that of the nanodiamond electrolyte, due to Li dendrite growth and dead Li. Additionally, electrochemical impedance spectroscopy (EIS) for the Li|Li cells at 1.0 mA cm$^{-2}$ was conducted after 10, 30, 40, 50, 60, 70, and 80 cycles (FIGS. 33A-33B). After ten cycles, cells in the nanodiamond electrolyte exhibited a stable Li ion diffusion resistance of ~84Ω, while the impedances of nanodiamond-free electrolytes fluctuated largely, ranging between 219 and 97Ω, thus demonstrating a stable interfacial impedance induced by the nanodiamond-containing electrolyte.

Figure 34A:
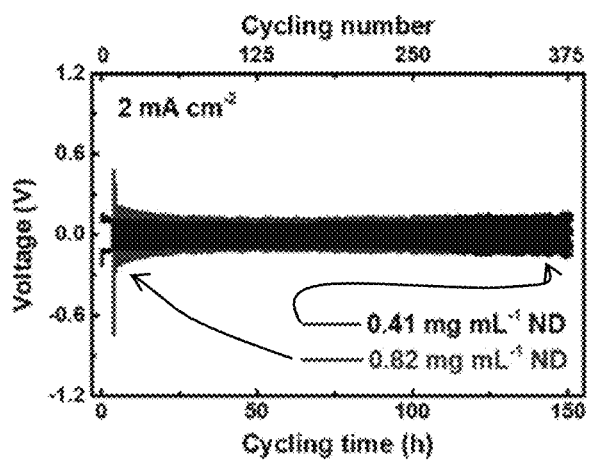
FIGS. 34A-34B show the electrochemical performance of nanodiamond electrolytes with different concentrations.

When decreasing the nanodiamond concentration from 0.82 to 0.41 mg mL-1, the cells also retained good stability after voltage was applied (FIG. 34A). In general, the 0.41 mg mL$^{-1}$ nanodiamond electrolyte showed much better performance than the nanodiamond-free electrolyte. While the 0.82 mg mL$^{-1}$ electrolyte showed similar cycling stability, it also exhibited less increase in the voltage polarization with extended cycles. These results clearly demonstrate the role of nanodiamond in stabilizing Li metal to achieve a stable long-term cycling performance.

Figure 34B:
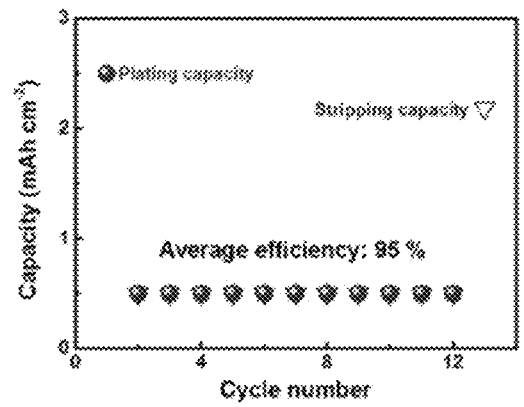
Figure 35:
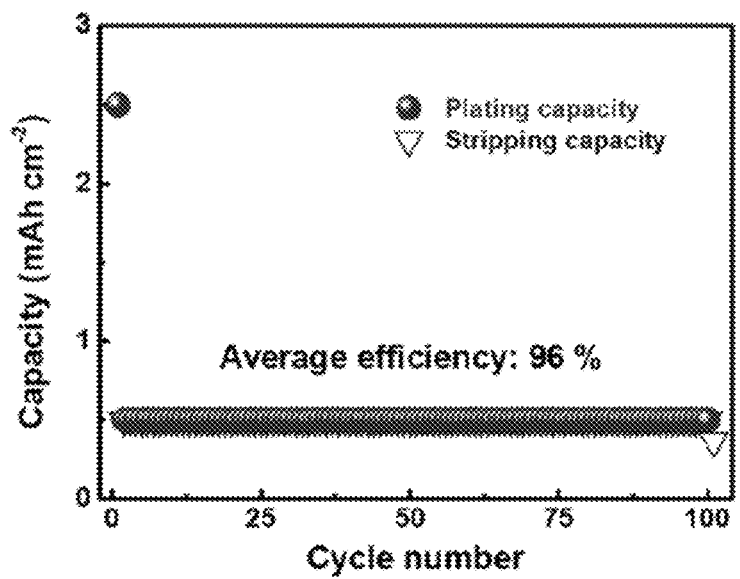
FIG. 35 shows the plating and stripping capacities of cells in the 0.82 mg $mL^{-1}$ nanodiamond electrolyte adopted to calculate the average Coulombic efficiency in 100 cycles.

The Coulombic efficiency during Li plating/stripping was probed in a Li Cu cell according to Aurbach et al.[66] (FIG. 18C). During 12 cycles, the average Coulombic efficiency of cells in the nanodiamond-containing electrolyte (0.82 mg mL$^{-1}$) was 96%, which is much higher than that in the nanodiamond-free electrolyte (88%). The higher Coulombic efficiency in the nanodiamond-containing electrolyte indicates a higher Li utilization during Li plating/stripping. When the cycling time and number were extended to 100 cycles (200 h), a stable performance was maintained with an average Coulombic efficiency of 96% (FIG. 35). For the reduced nanodiamond concentration of 0.41 mg mL$^{-1}$, an average Coulombic efficiency of 95% was achieved (FIG. 34B), which is only slightly smaller than the 0.82 mg mL$^{-1}$ nanodiamond electrolyte (96%), but still much higher than that of the nanodiamond-free electrolyte (88%). While close to 100% efficiency is expected in commercial batteries, we assume that a lower efficiency in our experiment does not result from the electrolyte breakdown. It rather comes from some Li staying adsorbed on nanodiamond particles due to the strong binding energy between nanodiamond and Li. Still, the nanodiamond additive also renders a reduced polarization of 19 mV during Li plating/stripping, while the polarization is 29 mV for nanodiamond-free electrolyte (FIG. 18D). In the nanodiamond-containing electrolyte, the electrode starts to plate Li at ~-15 mV, and strips Li at -27 mV. However, in the nanodiamond-free electrolyte, the plating and stripping processes start at approximately -21 and 48 mV, respectively. Thus, nanodiamond particles in the electrolyte effectively promote Li nucleation and dissolution.

SEM imaging of cycled electrodes revealed a large density of dendrites in the nanodiamond-free electrolyte (FIG. 18E), especially compared to the electrode in the nanodiamond-containing electrolyte. These dendrites lead to an unstable Li metal/electrolyte interface, the formation of dead Li, and poor long-term cycling performance. In the nanodiamond-containing electrolyte, the electrode shows a dendrite-free morphology (FIG. 18F). There are two key differences between the Li plating morphologies in the electroplating bath and the coin cells. Firstly, the plating morphology in the coin cells was flattened due to pressure, demonstrating the importance of the electroplating bath in investigating the original Li plating morphology. Secondly, the Li crystal size in the coin cells after many cycles grew larger than that in the electroplating bath. The increased crystal size can be attributed to the aggregation of nanodiamond particles during long-term cycling. Therefore, it is important to produce well dispersed and aggregate-free nanodiamond particles in the electrolyte.

Figure 36A:
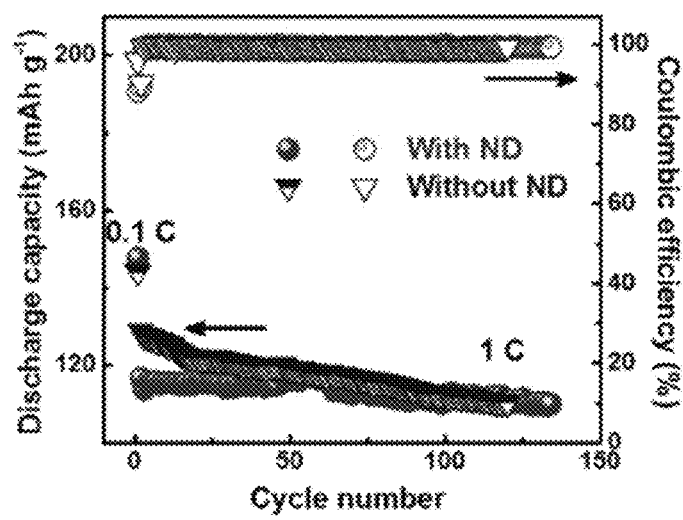
FIGS. 36A-36B show the cycling performance of Li|LFP cells at 1.0 C after an activation at 0.1 C (1.0 C=180 mA $g^{-1}$).
Figure 36B:
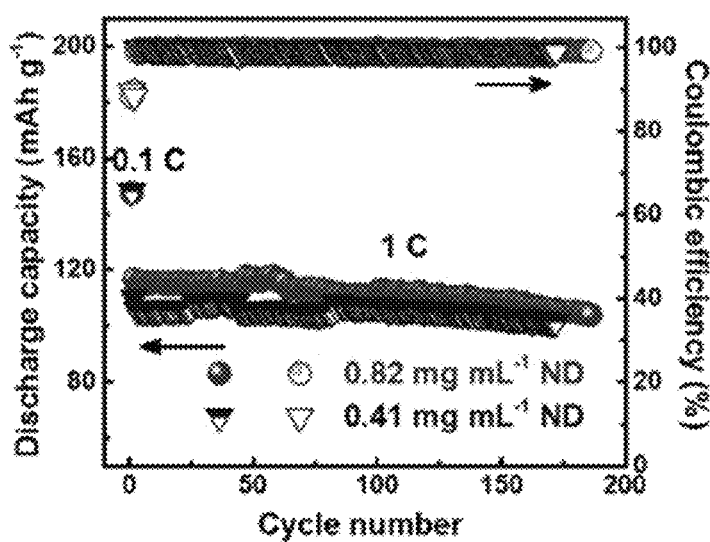
Figure 37A:
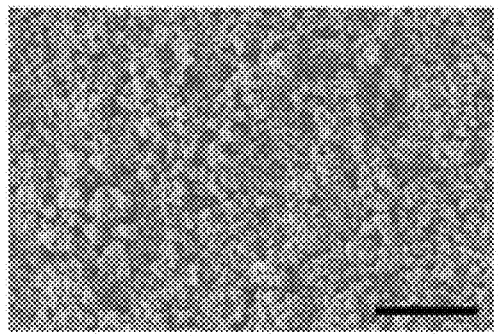
FIGS. 37A-37F show the morphology of LFP cathodes in Li|LFP cells.
Figure 37B:
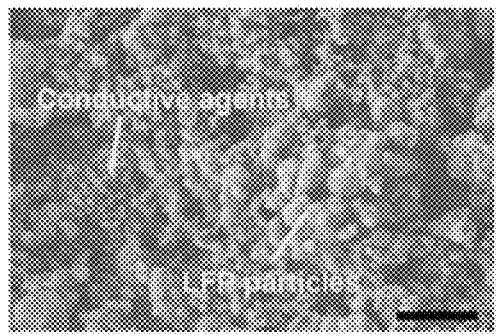
Figure 37C:
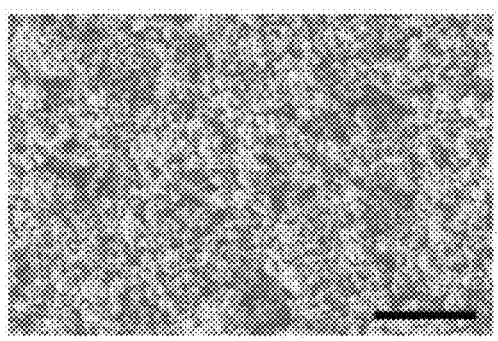
Figure 37D:
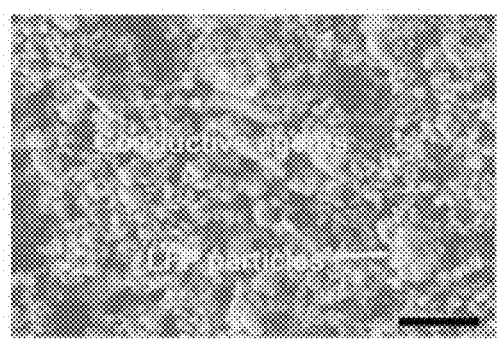
Figure 37E:
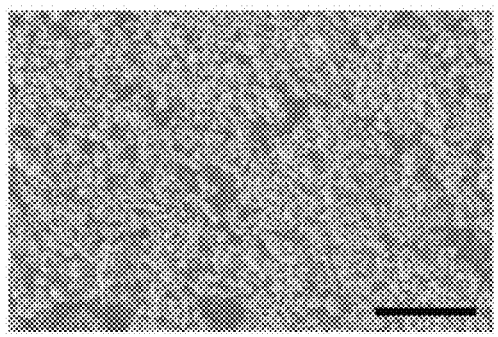
Figure 37F:
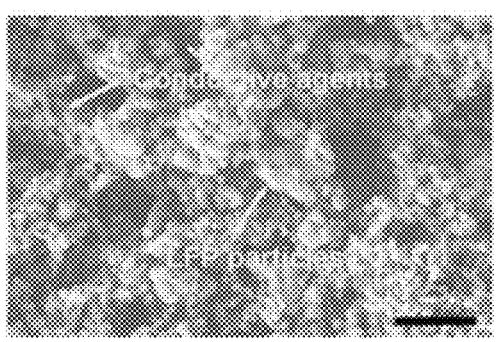
Figure 38A:
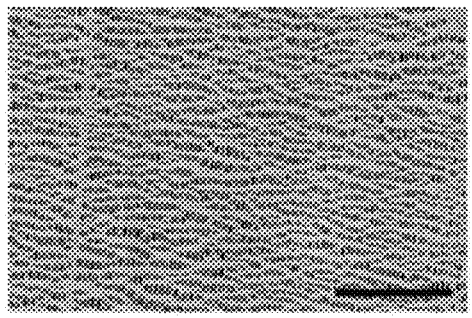
FIGS. 38A-38F show the morphology of separators in Li|LFP cells.
Figure 38B:
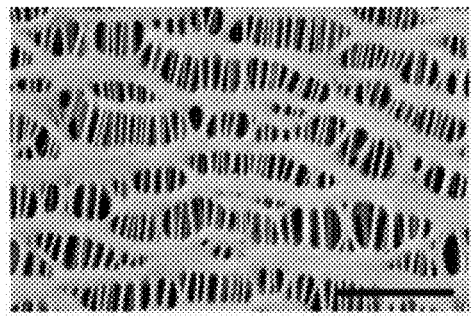
Figure 38C:
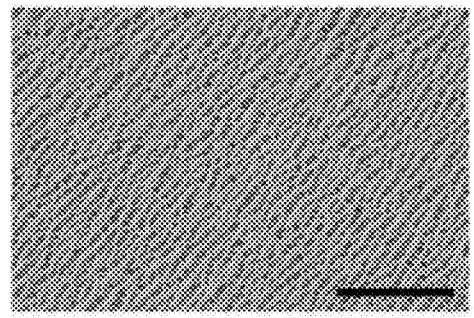
Figure 38D:
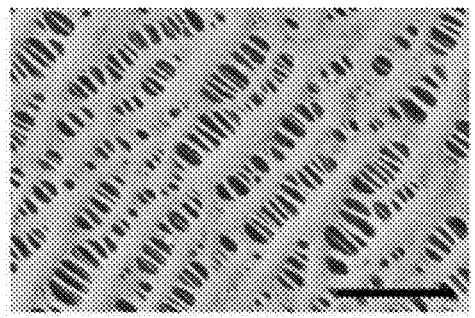
Figure 38E:
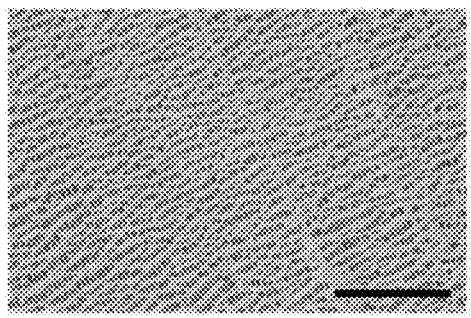
Figure 38F:
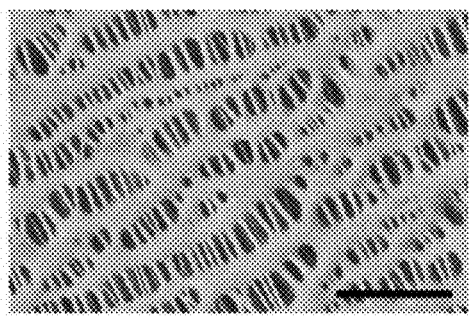
Figure 39A:
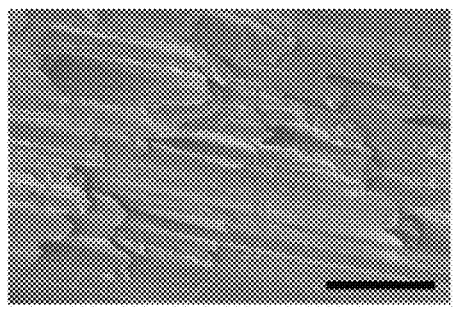
FIGS. 39A-39G show the morphology of the Li anode.
Figure 39B:
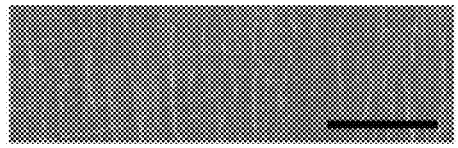
Figure 39C:
Figure 39D:
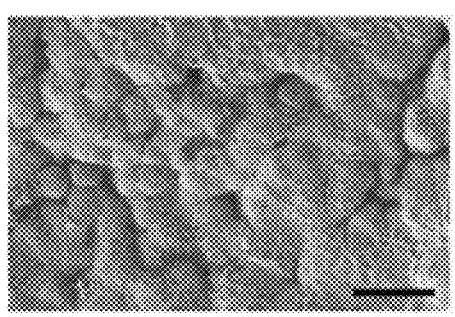
Figure 39E:
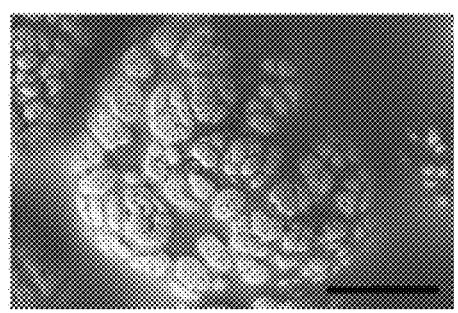
Figure 39F:
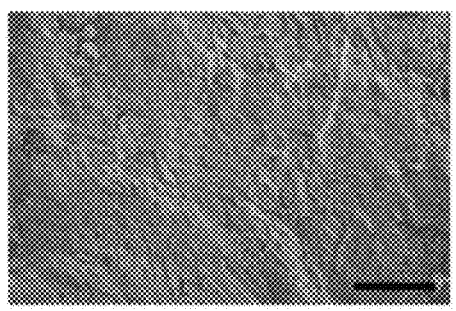
Figure 39G:
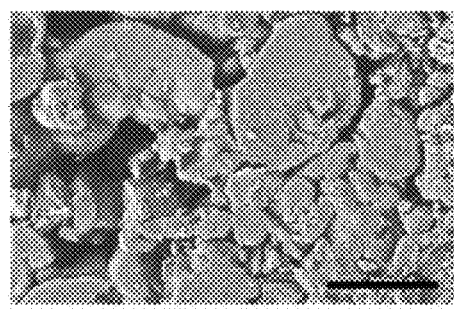

Li|LiFePO$_4$ (LFP) full cells were assembled to test the viability of nanodiamond-containing electrolyte in practical batteries (FIG. 36A-36B). After activation at 0.1 C (1.0 C=180 mA g$^{-1}$), testing of the LFP battery with nanodiamond electrolyte indicated a very stable cycling at 1.0 C with a capacity decay of 4.9% after 130 cycles, while the cell with nanodiamond-free electrolyte exhibited a larger capacity decay of 14.2% (FIG. 36A). As these cells have the same cathode, the capacity decay can be attributed to the anode depletion. The superior cycling stability of the LFP battery with nanodiamond-containing electrolyte is ascribed to dendrite-free Li deposits and a stable electrode-electrolyte interface on the Li metal anode. The morphologies of the LFP cathode, Celgrad 2400 separator, and Li foils were investigated after 5 and 20 cycles. The LFP morphologies were remarkably similar, with conductive agents (acetylene black) connecting LFP particles (FIGS. 37A-37F). Relative to the pristine separator, the separators after tests maintained their porous structure (FIGS. 38A-38F). There were no obvious nanodiamond particles on the LFP and separator surface, demonstrating that nanodiamond particles were not absorbed in noticeable amounts onto the high-surface-area LFP cathode and the separator, hence maintaining the stable nanodiamond concentration in the electrolyte. The cycled Li morphologies after 5 and 20 cycles (FIGS. 39A-39G) were similar to that in the Li|Cu coin-cell (FIG. 18F). After many cycles, the nanodiamond electrolyte was still able to maintain the arrayed and dendrite-free Li deposits in the Li|LFP cells. Therefore, nanodiamond particles can effectively maintain a stable Li-electrolyte interface and dendrite-free Li morphology in commercial electrolytes, while having little adverse effect on the cathode and separators.

The role of nanodiamond concentration on the full-cell cycling performance was also investigated (FIG. 36B). Similar to Li|Li and Li|Cu cells, the Li|LFP cells of both 0.41 and 0.82 mg mL$^{-1}$ nanodiamond electrolyte indicated a good cycling stability (capacity decay rate: 4.4%), but the cycling capacity of the 0.41 mg mL$^{-1}$ nanodiamond-electrolyte was 10 mAh g$^{-1}$ lower than that of the 0.82 mg mL$^{-1}$ nanodiamond electrolyte. These results indicate that both nanodiamond concentrations can lead to dendrite-free Li deposits and a stable Li-electrolyte interface, but the smaller nanodiamond concentration will not provide a sufficient number of nucleation sites for uniform Li plating.

Figure 19:
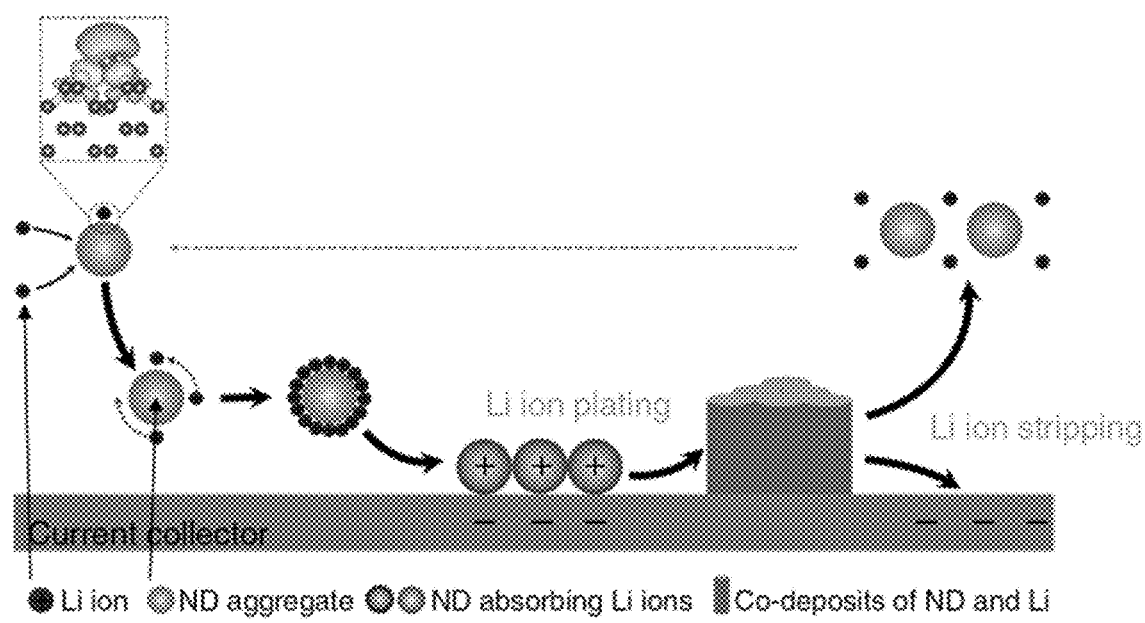
FIG. 19 is a schematic illustrating the co-deposition of Li ions on nanodiamond, growth of the columnar Li film and the stripping of Li deposits.

Nanodiamond shows a potential to suppress Li dendrite growth by acting as heterogeneous seeds for Li plating. Its critical role in Li ion plating can be described in four steps: (FIG. 19) (1) Li ions adsorb on nanodiamond, rather than Cu, due to the difference in binding energy and a large surface area of nanodiamond; (2) Nanodiamond particles with Li ions are transported to the surface of the Cu foil under solution-forced convection and electric field force; (3) As a heterogeneous seed, nanodiamond renders initial Li nucleation; (4) Due to the small sizes of nanodiamond particles, nanodiamond-guided Li deposits have small crystal sizes and uniform morphology. After that, the co-deposits of nanodiamond particles and Li ions can successfully strip off to the electrolyte during the Li stripping processes to maintain a stable concentration of nanodiamond in the electrolyte and provide long-term cycling stability of the Li metal anode.

Diamond nanoparticle co-deposition is an existing technology in the metal electroplating industry. Therefore, this commercially viable method can be transferred to the battery industry. Dielectric diamond nanoparticles do not represent a threat; even if they penetrate through the separator, they cannot short-circuit the device or increase leakage current. However, several issues must be addressed before their practical application in LMBs: (1) Compared to the high concentration in the aqueous solution (10-20 mg mL$^{-1}$) used in the electroplating industry, the saturation concentration of nanodiamond in the LiPF$_6$-EC/DEC electrolyte is only 0.82 mg mL$^{-1}$, though we used an ODA-modified hydrophobic nanodiamond. More efforts are required to decrease the particle size in solution and improve the solubility of nanodiamond in the electrolyte. This task has been accomplished for aqueous dispersions[60] and dispersion in organic electrolytes should be possible, too. (2) In the metal electroplating industry, trial-and-error tests have been used to choose the best additive for electrodeposition. Effects of other insulating nanoparticles, such as Al$_2$O$_3$, SiO$_2$, BN, or AlN, on the Li plating behavior should also be evaluated.

Besides their demonstrated potential in co-deposition with Li ions to suppress Li dendrite growth, nanodiamond particles may also be utilized as an electrolyte additive to regulate the solid electrolyte interphase (SEI) film. Similar to LiF[39], SiO$_2$[67], and Al$_2$O$_3$[68] particles in the surface film of Li deposits, nanodiamond particles form a low Li ion diffusion barrier and ensure a fast Li ion diffusion rate. When nanodiamond particles deposit on the anode surface, they can strengthen the pristine SEI film to protect the Li metal anode and render the practical application of the Li metal anode. In this work, a commercial Li ion electrolyte was used as a dispersant without any additional additives. When nanodiamond functions synergistically with other SEI-forming additives, such as fluoroEC47, Li polysulfide and LiNO$_3$[70], etc., the Coulombic efficiency and Li deposition morphology could be further enhanced. Here, we only present a feasibility study showing that the electroplated particles can be applied to the Li metal anode. After probing the mechanism and coupling with the SEI-forming additives, electroplated particles are expected to be used in next-generation commercial Li metal batteries. In summary, in this work, we propose the nanodiamond-assisted suppression of Li dendrites growth in LMBs. During Li plating, nanodiamond particles serve as heterogeneous nucleation seeds and adsorb Li ions. Due to the low diffusion energy barrier of Li ions on the nanodiamond surface, the adsorbed Li ions lead to formation of uniform Li deposits, rather than large Li dendrites, which have smaller crystal sizes than that obtained in the nanodiamond-free electrolyte. The dendrite-free morphology leads to an enhanced electrochemical performance. The nanodiamond-modified electrolyte provides stable cycling of Li|Li cell for 200 h at 1 mA cm$^{-2}$, 150 h at 2 mA cm$^{-2}$ and a high Coulombic efficiency of 96% in Li|Cu cells (88% for nanodiamond-free electrolyte). The nanodiamond-assisted co-deposition strategy presents a promising method for suppressing Li dendrite growth in LMBs.

When a value is expressed as an approximation by use of the descriptor "about," it will be understood that the particular value forms another embodiment. In general, use of the term "about" indicates approximations that can vary depending on the desired properties sought by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

EXAMPLES

Example 1: General Process Considerations

Example 1.1. Preparation of Modified Nanodiamond with Octadecylamine (NDODA)

30 mg of nanodiamond (ND, UD90 grade, NanoBlox, Inc., USA), purified by air oxidation and cleansed of metal impurities by boiling in 35 wt. % HCl for 24 h, was refluxed with 50 mL of SOCl2 (Sigma Aldrich) and 1 mL of anhydrous N,N-dimethylformamide (DMF) (Sigma Aldrich), which is well known as a catalyst for this reaction, at 70° C. for 24 h.

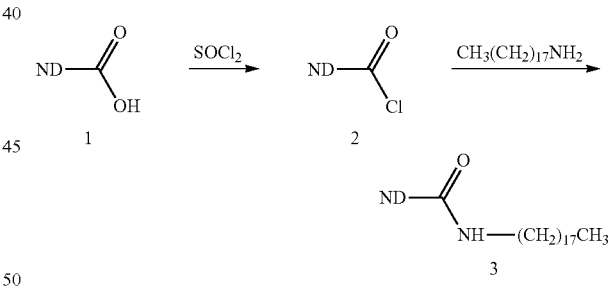

Example 1.2. Preparation of NDODA Based Electrolyte 50 mg NDODA was dispersed in the LiPF6 (1.0 M)-EC/DEC (1:1, in volume) electrolyte, followed by ultrasound for 2 hours. The obtained mixture was kept still for one day to obtain the saturated NDODA electrolyte.

Example 1.3. Electroplating Process

The electroplating process was conducted in a two-electrode electrolyzer with Cu and Li foils as the working and counter electrodes, respectively. The electrolyte was the saturated NDODA in the LiPF6-EC/DEC electrolyte. The electroplating process was controlled by an electrochemical station at a consult current of 0.5 mA cm$^{-2}$.

Example 1.4. Superiority of NDODA Based Electrolyte to Suppress Li Dendrite Growth NDODA is with a diameter of 200 nm. When employed in the electrolyte, NDODA can renders more nucleating sites for Li ions, then a small crystal size of Li metal and solid electrolyte interphase to suppress Li dendrite growth.

Example 2

In initial studies, nanodiamond additive in LiPF$_6$/EC/DEC electrolyte were introduced to modify Li deposition behavior. The nanodiamond were dispersed into LiPF$_6$/EC/DEC electrolyte with a concentration of 1-10 mg/mL, assemble an electroplating cell with a Cu foil current collector as the cathode, Li metal as the anode, and 1 M LiPF$_6$/EC/DEC with or without nanodiamond additive to the electrolyte. The Li depositing morphology on the Cu foil electrode were characterized by SEM.

Example 3.1 Preparation of the Modified Nanodiamond

Nanodiamond particles were modified using conventional methods. 1.5 g of nanodiamond (UD90 grade, provided by SP3, USA), was purified by air oxidation at 425° C. and cleansed of metal impurities by boiling in a mixture of HCl, HNO$_3$, and distilled water for 24 h. 1.5 g of the resulting material was refluxed with 50 mL of SOCl2 (Sigma Aldrich) and 1 mL of anhydrous N,N dimethylformamide (Sigma Aldrich), which is well known as a catalyst for this reaction, at 70° C. for 24 h. After removing supernatant by distillation, the obtained solid was washed with anhydrous tetrahydrofuran three times and then dried at ambient temperature in a desiccator under vacuum. The chlorinated nanodiamond powder was then stirred in a sealed flask with 5 g of octadecylamine (ODA obtained from Sigma Aldrich) at 90~100° C. for 96 h. After cooling, excess ODA was removed by rinsing 4~5 times with hot, anhydrous methanol (Sigma Aldrich). The ODA-modified nanodiamond can be easily dispersed in organic solvents[59].

Example 3.2 Preparation of NDODA Based Electrolyte

In an Ar-filled glove box, 50 mg of the obtained ODA-functionalized nanodiamond particles were dispersed in 10 mL of 1.0M lithium hexafluorophosphate (LiPF$_6$), which was dissolved in EC and DEC with a volumetric ratio of 1:1. The obtained colloidal solution was then tightly sealed and transferred to an ultrasonic bath for 3 h to achieve a good dispersion of nanodiamond in the LiPF$_6$-EC/DEC electrolyte. After ultrasonication, the solution was left in glove box for 1 day to obtain well-dispersed nanodiamond in the supernatant for the electroplating process and electrochemical long-term cycling tests.

Example 3.3 Electroplating Process

The electroplating process of Li onto the Cu foil was conducted galvanostatically in an electroplating bath at a current density of 0.5 mA cm$^{-2}$. The working electrode was a Cu foil (~1×7 cm$^{-2}$) and the counter electrode was a Li foil (~0.8×7 cm$^{-2}$). After electroplating, the obtained Li deposits were washed in 1,2-dimethoxyethane to remove electrolyte residues. All the experiments were conducted in an Ar-filled glove box with the water and oxygen contents below 0.5 ppm.

Materials Characterization

The morphology of nanodiamond was characterized using a TEM (JEOL JEM-2100, Japan) with an accelerating voltage of 200 kV. The TEM samples were prepared by dispersing powders in ethanol by sonication, depositing several drops of the solution onto a copper grid covered by lacey carbon films, and then drying in air. The particle size distribution of the 0.82 mg mL$^{-1}$ nanodiamond solution in LiPF$_6$-EC/DEC electrolyte was measured using a Zetasizer Nano ZS (Malvern Instruments) in 173° scattering geometry. The morphology of Li deposits was characterized using a SEM (Zeiss Supra 50VP, Germany), operated at 3.0 kV. The SEM samples were prepared in the glove box. The XRD patterns of Li deposits were recorded by a powder diffractometer (Rigaku Smart Lab, USA) with Cu Kα radiation at an acquisition rate of 0.2° min-1 and 0.5 s dwelling time.

First-Principles Calculations

The calculations were based on bare carbon without considering the functional groups on its surface. VASP code[71] based on density functional theory was used. The exchange-correlation energy was calculated using the general gradient approximation with the Perdew-Burke-Ernzerhof exchange correlation functional[72]. The effect of van der Waals interactions was taken into account and implemented in the optimized exchange van der Waals functional B86b of the Becke (optB86b vdW) functional[73]. The plane wave cutoff energy was 400 eV. The convergence condition for the energy was 10-4 eV, and the structures were relaxed until the force on each atom was less than 0.01 eV Å$^{-1}$. The c axis was set as 25 Å to ensure enough vacuum to avoid interactions between two periods. To calculate the diffusion energy barriers of Li on the surfaces of nanodiamond and Cu, we used the climbing image nudged elastic band method (CI-NEB) implemented in VASP[74]. The NEB paths were relaxed until the forces on all atoms were below 0.03 eV A$^{-1}$.

Surface energies γ were defined as:

$$\gamma \times (E_{slab} - NE_{unit})/2A, \quad (1)$$

where $E_{slab}$ is the total energy of the slab, $E_{unit}$ is the total energy per unit of nanodiamond or Cu crystal, N is the total number of units contained in the slab model and A is the area of each surface.

Binding energies $E_b$ were defined as:

$$E_b = E_{sub+Li} - (E_{sub} + E_{Li}), \quad (2)$$

where $E_{sub+Li}$ is the total energy of the substrate with a Li atom, $E_{sub}$ is the total energy of the substrate and $E_{Li}$ is the total energy of the Li atom.

Electrochemical Cycling Tests

To evaluate the electrochemical long-term performance of nanodiamond-containing electrolyte, symmetrical Li|Li cells and Li|Cu cells were assembled in the glove box. These electrodes were tested in the LiPF$_6$-EC/DEC electrolyte with and without nanodiamond in standard CR-2032 coin cells. Polypropylene membranes (Celgard 2400) were used as separators. The coin cells were tested in a galvanostatic mode using a battery cycler (Arbin BT-2143-11U, College Station, Tex., USA). The Li|Li cell was operated at 1 and 2 mA cm$^{-2}$ with a plating/stripping time of 12 min. The Li|Cu cell was operated at 0.5 mA cm$^{-2}$. The average Coulombic efficiency was calculated after Aurbach et al. 44. An initial amount of lithium (2.5 mAh cm$^{-2}$ at 0.5 mA cm$^{-2}$) was deposited on a copper electrode. Then, 10% of this initial amount (0.25 mAh cm$^{-2}$) was stripped and redeposited galvanostatically at 0.5 mA cm$^{-2}$ for 12 cycles. The final stripping process was interrupted when the working electrode potential exceeded 1 V vs. Li/Li+. The average cycling efficiency was calculated from the following equation.

$$X=[Q_c-(XQ_1-Q_r)/N]/Q_c \times 100 \quad (3)$$

where X is the cycling efficiency (%), N is the number of cycles, $Q_c$, $Q_1$, $Q_r$ are the charges involved in a single deposition/stripping process (half cycle), initial loading (massive lithium deposition), and final charging (the residual Li), respectively. Li|LiFePO$_4$ (LFP) cells were assembled to evaluate the effect of nanodiamond electrolytes in the practical cells. A homogeneous slurry was prepared by mixing LFP, super P, and polyvinylidene fluoride (PVDF) with a mass ratio of LFP:super P:PVDF=80:10:10, followed by magnetic stirred for 24 h. The slurry was coated onto an Al foil and dried in a vacuum drying oven at 60° C. for 6 h. The as-obtained foil was punched into 13 mm disks as the working electrodes. 1.0 mm thick Li metal foil was employed as the counter electrode. The coin cells were monitored in galvanostatic mode within a voltage range of 2.5~3.8 V at 1.0 C (1.0 C=180 mA g$^{-1}$) after one cycle activation at 0.1 C.

Example 4

MXenes also forms colloidal solutions and can be introduced into electrolyte to suppress Li dendrite growth. In case of successful tests in the deposition test, coin cells can be assembled with LiFePO$_4$ as the cathode, Li metal as the anode, with or without a MXene or nanodiamond film interlayer at the anode side. The discharge capacity, cycling stability, and Coulombic efficiency of the cells will be measured to determine if these nanoparticle additives have effect in real cell conditions.

REFERENCES

The following references are useful in understanding some of the principles discussed herein:
1. E. Peled, *J. Electrochem. Soc.* 126 (1979) 2047-2051.
2. X.-B. Cheng, R. Zhang, C.-Z. Zhao, F. Wei, J.-G. Zhang and Q. Zhang, *Adv. Science* 2015) 1500213.
3. I. A. Shkrob, T. W. Marin, Y. Zhu and D. P. Abraham, *J. Phys. Chem. C* 118 (2014) 19661-19671.
4. R. Miao, J. Yang, X. Feng, H. Jia, J. Wang and Y. Nuli, *J. Power Sources* 271 (2014) 291-297.
5. J. Qian, W. A. Henderson, W. Xu, P. Bhattacharya, M. Engelhard, O. Borodin and J.-G. Zhang, *Nat. Comm.* 6 (2015) 6362.
6. Y. Lu, Z. Tu and L. A. Archer, *Nat. Mater* 13 (2014) 961-969.
7. C. Zu, N. Azimi, Z. Zhang and A. Manthiram, *J. Mater Chem. A* 3 (2015) 14864-14870.
8. F. Ding, W. Xu, G. L. Graff, J. Zhang, M. L. Sushko, X. L. Chen, Y. Y. Shao, M. H. Engelhard, Z. M. Nie, J. Xiao, X. J. Liu, P. V. Sushko, J. Liu and J. G. Zhang, *J. Am. Chem. Soc.* 135 (2013) 4450-4456.
9. Y. Zhang, J. Qian, W. Xu, S. M. Russell, X. Chen, E. Nasybulin, P. Bhattacharya, M. H. Engelhard, D. Mei, R. Cao, F. Ding, A. V. Cresce, K. Xu and J.-G. Zhang, *Nano Letters* 14 (2014) 6889-6896.
10. L. Suo, Y.-S. Hu, H. Li, M. Armand and L. Chen, *Nat. Comm.* 4 (2013) 1481.
11. Heine, J. et al. Coated lithium powder (CLiP) electrodes for lithium-metal batteries. *Adv. Energy Mater* 4, 1300815 (2014).\
12. Cheng, X. B. et al. Dual-phase lithium metal anode containing a polysulfide-induced solid electrolyte interphase and nanostructured graphene framework for lithium-sulfur batteries. *ACS Nano* 9, 6373-6382 (2015).
13. Zhang, R. et al. Conductive nanostructured scaffolds render low local current density to inhibit lithium dendrite growth. *Adv. Mater* 28, 2155-2162 (2016).
14. Lin, D. et al. Layered reduced graphene oxide with nanoscale interlayer gaps as a stable host for lithium metal anodes. *Nat. Nanotechnol.* doi:10.1038/nnano.2016.1032 (2016).
15. Cheng, X. B., Peng, H. J., Huang, J. Q., Wei, F. & Zhang, Q. Dendrite-free nanostructured anode: Entrapment of lithium in a 3D fibrous matrix for ultra-stable lithium-sulfur batteries. *Small* 10, 4257-4263 (2014).
16. Yang, C. P., Yin, Y. X., Zhang, S. F., Li, N. W. & Guo, Y. G. Accommodating lithium into 3D current collectors with a submicron skeleton towards long-life lithium metal anodes. *Nat. Comm.* 6, 8058 (2015).
17. Lu, L.-L. et al. Free-standing copper nanowire network current collector for improving lithium anode performance. *Nano Letters* 16, DOI: 10.1021/acs.nanolett.1026b01581 (2016).
18. Yun, Q. et al. Chemical dealloying derived 3D porous current collector for li metal anodes. *Adv. Mater* 28, doi:10.1002/adma.201601409 (2016).
19. Huang, C. et al. Manipulating surface reactions in lithium-sulphur batteries using hybrid anode structures. *Nat. Comm.* 5, 3015-3023 (2014).
20. Cheng, X.-B. et al. Dendrite-free lithium deposition induced by uniformly distributed lithium ions for efficient lithium metal batteries. *Adv. Mater* 28, 2888-2895 (2016).
21. Liang, Z. et al. Polymer nanofiber-guided uniform lithium deposition for battery electrodes. *Nano Letters* 15, 2910-2916 (2015).
22. Chu, S. & Cui, Y. Selective deposition and stable encapsulation of lithium through heterogeneous seeded growth. *Nat. Energy* 1, 16010 (2016).
23. Ji, X., Lee, K. T. & Nazar, L. F. A highly ordered nanostructured carbon-sulphur cathode for lithium-sulphur batteries. *Nat. Mater.* 8, 500-506 (2009).
24. Aurbach, D., McCloskey, B. D., Nazar, L. F. & Bruce, P. G. Advances in understanding mechanisms underpinning lithium-air batteries. Nat. Energy 1, 16128 (2016).
25. Cheng, X.-B. et al. A review of solid electrolyte interphases on lithium metal anode. Adv. Sci. 3, 1500213 (2016).
26. Xu, W. et al. Lithium metal anodes for rechargeable batteries. Energy Environ. Sci. 7, 513-537 (2014).
27. Sun, Y, Liu, N. & Cui, Y. Promises and challenges of nanomaterials for lithium-based rechargeable batteries. Nat. Energy 1, 16071 (2016).
28. Tikekar, M. D., Choudhury, S., Tu, Z. & Archer, L. A. Design principles for electrolytes and interfaces for stable lithium-metal batteries. Nat. Energy 1, 16114 (2016).
29. Bai, P., Li, J., Brushett, F. R. & Bazant, M. Z. Transition of lithium growth mechanisms in liquid electrolytes. Energy Environ. Sci. 9, 3221-3229 (2016).
30. Tu, Z., Nath, P., Lu, Y, Tikekar, M. D. & Archer, L. A. Nanostructured electrolytes for stable lithium electrodeposition in secondary batteries. Accounts Chem. Res. 48, 2947-2956 (2015).

31. Zhang, K., Lee, G.-H., Park, M., Li, W. & Kang, Y.-M. Recent developments of the lithium metal anode for rechargeable non-aqueous batteries. Adv. Energy Mater. 6, 1600811 (2016).
32. Wang, D. et al. Towards high-safe lithium metal anodes: Suppressing lithium dendrites via tuning surface energy. Adv. Sci. 3, 1600168 (2016).
33. Zheng, J., Tang, M. & Hu, Y-Y. Lithium ion pathway within Li7La3Zr2O12-polyethylene oxide composite electrolytes. Angew. Chem. Int. Ed. 55, 12538-12542 (2016).
34. Zhou, D. et al. SiO2 hollow nanosphere-based composite solid electrolyte for lithium metal batteries to suppress lithium dendrite growth and enhance cycle life. Adv. Energy Mater 6, 1502214 (2016).
35. Yao, X. et al. All-solid-state lithium batteries with inorganic solid electrolytes: Review of fundamental science. Chinese Phys. B 25, 018802 (2016).
36. Ding, F. et al. Dendrite-free lithium deposition via self-healing electrostatic shield mechanism. J. Am. Chem. Soc. 135, 4450-4456 (2013).
37. Li, W. et al. The synergetic effect of lithium polysulfide and lithium nitrate to prevent lithium dendrite growth. Nat. Commun. 6, 7436-7444 (2015).
38. Zhao, C.-Z. et al. Li2S5-based ternary-salt electrolyte for robust lithium metal anode. Energy Storage Mater 3, 77-84 (2016).
39. Lu, Y., Tu, Z. & Archer, L. A. Stable lithium electrodeposition in liquid and nanoporous solid electrolytes. Nat. Mater. 13, 961-969 (2014).
40. Zu, C. et al. Breaking down the crystallinity: The path for advanced lithium batteries. Adv. Energy Mater 6, 1501933 (2016).
41. Aurbach, D., Zinigrad, E., Cohen, Y. & Teller, H. A short review of failure mechanisms of lithium metal and lithiated graphite anodes in liquid electrolyte solutions. Solid State Ionics 148, 405-416 (2002).
42. Wood, S. M. et al. K+ reduces lithium dendrite growth by forming a thin, less-resistive solid electrolyte interphase. ACS Energy Lett. 1, 414-419 (2016).
43. Lu, Y. et al. Stable cycling of lithium metal batteries using high transference number electrolytes. Adv. Energy Mater 5, 1402073 (2015).
44. Tikekar, M. D., Archer, L. A. & Koch, D. L. Stabilizing electrodeposition in elastic solid electrolytes containing immobilized anions. Sci. Adv. 2, e1600320 (2016).
45. Lin, D. et al. Layered reduced graphene oxide with nanoscale interlayer gaps as a stable host for lithium metal anodes. Nat. Nanotechnol. 11, 626-632 (2016).
46. Liang, Z. et al. Polymer nanofiber-guided uniform lithium deposition for battery electrodes. *Nano Lett.* 15, 2910-2916 (2015).
47. Zhang, R. et al. Conductive nanostructured scaffolds render low local current density to inhibit lithium dendrite growth. Adv. Mater. 28, 2155-2162 (2016).
48. Cheng, X.-B. et al. Dendrite-free lithium deposition induced by uniformly distributed lithium ions for efficient lithium metal batteries. Adv. Mater. 28, 2888-2895 (2016).
49. Zhang, R. et al. Lithiophilic sites in doped graphene guide uniform lithium nucleation for dendrite-free lithium metal anodes. Angew. Chem. Int. Ed. 56, 7764-7768 (2017).
50. Yan, K. et al. Selective deposition and stable encapsulation of lithium through heterogeneous seeded growth. Nat. Energy 1, 16010 (2016).
51. Petrov, I. et al. Nickel galvanic coatings co-deposited with fractions of detonation nanodiamond. Diam. Relat. Mater. 15, 2035-2038 (2006).
52. El Rehim, S. S. A., El Wahaab, S. M. A., Ibrahim, M. A. M. & Dankeria, M. M. Electroplating of cobalt from aqueous citrate baths. J. Chem. Technol. Biot. 73, 369-376 (1998).
53. Shrestha, N. K., Takebe, T. & Saji, T. Effect of particle size on the co-deposition of diamond with nickel in presence of a redox-active surfactant and mechanical property of the coatings. Diam. Relat. Mater. 15, 1570-1575 (2006).
54. Medeliene, V, Stankevic, V. & Bikulcius, G. The influence of artificial diamond additions on the formation and properties of an electroplated copper metal matrix coating. Surf. Coat. Tech. 168, 161-168 (2003).
55. Lee, J. & Talbot, J. B. Simulation of particle incorporation during electrodeposition process: Primary and secondary current distributions. J. Electrochem. Soc. 152, C706-C715 (2005).
56. Xu, H. et al. Synthesis and properties of electroless Ni—P-nanometer diamond composite coatings. Surface Coatings Technol. 191, 161-165 (2005).
57. Pavlatou, E. A., Stroumbouli, M., Gyftou, P. & Spyrellis, N. Hardening effect induced by incorporation of SiC particles in nickel electrodeposits. J. Appl. Electrochem. 36, 385-394 (2006).
58. Gurga, A., Mochalin, V, Pepe, D., Picardi, C. & Gogotsi, Y. Nanoindentation study of the effect of nanodiamond additives on electroless deposition nickel-boride coating. Adv. Technol. Mater. Mater. Process. J 10, 47-52 (2008).
59. Mochalin, V. N. & Gogotsi, Y. Wet chemistry route to hydrophobic blue fluorescent nanodiamond. J. Am. Chem. Soc. 131, 4594-4595 (2009).
60. Mochalin, V. N., Shenderova, O., Ho, D. & Gogotsi, Y. The properties and applications of nanodiamonds. Nat. Nanotechnol. 7, 11-23 (2012).
61. Krueger, A. & Boedeker, T. Deagglomeration and functionalisation of detonation nanodiamond with long alkyl chains. Diam. Relat. Mater. 17, 1367-1370 (2008).
62. Cheng, X. B., Peng, H. J., Huang, J. Q., Wei, F. & Zhang, Q. Dendrite-free nanostructured anode: Entrapment of lithium in a 3D fibrous matrix for ultra-stable lithium-sulfur batteries. Small 10, 4257-4263 (2014).
63. Ozhabes, Y, Gunceler, D. & Arias, T. A. Stability and surface diffusion at lithium-electrolyte interphases with connections to dendrite suppression. arXiv preprint arXiv 1504, 05799 (2015).
64. Aogaki, R. & Makino, T. Morphological instability in nonsteady galvanostatic electrodeposition: I. Effect of surface diffusion of adatoms. J. Electrochem. Soc. 131, 40-46 (1984).
65. Aogaki, R. & Makino, T. Morphological instability in nonsteady galvanostatic electrodeposition: II. Experimental demonstration of the surface diffusion effect of adatoms by means of image analysis. J. Electrochem. Soc. 131, 46-51 (1984).
66. Aurbach, D., Gofer, Y. & Langzam, J. The correlation between surface chemistry, surface morphology, and cycling efficiency of lithium electrodes in a few polar aprotic systems. J. Electrochem. Soc. 136, 3198-3205 (1989).
67. Peng, Z. et al. Volumetric variation confinement: Surface protective structure for high cyclic stability of lithium metal electrodes. J. Mater. Chem. A 4, 2427-2432 (2016).

68. Zhang, X.-Q. et al. Fluoroethylene carbonate additives to render uniform Li deposits in lithium metal batteries. Adv. Funct. Mater. 27, 1605989 (2017).
69. Cheng, X.-B. et al. Implantable solid electrolyte interphase in lithium-metal batteries. Chem. 2, 258-270 (2017).
70. Kresse, G. & Hafner, J. Ab initio molecular-dynamics simulation of the liquid-metal/amorphous-semiconductor transition in germanium. Phys. Rev. B 49, 14251-14269 (1994).
71. Perdew, J. P., Burke, K. & Ernzerhof, M. Generalized gradient approximation made simple. Phys. Rev. Lett. 77, 3865-3868 (1996).
72. Klimeš J., Bowler, D. R. & Michaelides, A. Van der waals density functionals applied to solids. Phys. Rev. B 83, 195131 (2011).
73. Henkelman, G., Uberuaga, B. P. & Jonsson, H. A climbing image nudged elastic band method for finding saddle points and minimum energy paths. J. Chem. Phys. 113, 9901-9904 (2000).

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document and the Appendices attached to this specification are hereby incorporated herein by reference, each in its entirety, for all purposes, or at least for the purpose described in the context in which the reference was presented.

What is claimed is:

1. A battery cell having an electrolyte comprising:
   (a) sodium or lithium ions; and
   (b) nanoparticles selected from the group consisting of nanodiamonds and alliform carbon, or a combination thereof.

2. The battery cell of claim 1, wherein the battery cell is a lithium-ion battery cell, a lithium-sulfur battery cell, a lithium-air battery cell, or a sodium-ion battery cell.

3. The battery cell of claim 1, wherein the electrolyte comprises lithium ions.

4. The battery cell of claim 3, wherein the lithium ions are present as complexes selected from the group consisting of lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiCF_3SO_3$), lithium bis(oxalate)borate (LiBOB), lithium bis(trifluoromethane) sulfonamide (LiTFSI), lithium bis(fluorosulfonyl)imide (LiFSI), lithium iron phosphate (LFP, $LiFePO_4$), and a mixture thereof.

5. The battery cell of claim 1, wherein the electrolyte comprises sodium ions.

6. The battery cell of claim 5, wherein the sodium ions are present as complexes selected from the group consisting of sodium hexafluorophosphate ($NaPF_6$), sodium hexafluoroarsenate monohydrate ($NaAsF_6$), sodium perchlorate ($NaClO_4$), sodium tetrafluoroborate ($NaBF_4$), sodium triflate ($NaCF_3SO_3$), sodium bis(oxalate)borate (NaBOB), sodium bis(trifluoromethane)sulfonamide (NaTFSI), sodium bis(fluorosulfonyl)imide (NaFSI), sodium iron phosphate (NaFP, $NaFePO_4$) and a mixture thereof.

7. The battery cell of claim 1, wherein the electrolyte comprises an organic solvent selected from the group consisting of ethylene carbonate, diethyl carbonate, dimethyl carbonate, dioxolane, dimethoxyethane, and a combination thereof, containing the ion complexes.

8. The battery cell of claim 1, wherein the electrolyte comprises an ionic liquid.

9. The battery cell of claim 8, wherein the ionic liquid comprises an alkyl-substituted imidazolium cation, a pyridinium cation, or a combination thereof.

10. The battery cell of claim 9, wherein the ionic liquid comprises a hexafluorophosphate ($PF_6^-$), a tetrafluoroborate ($BF_4^-$), a bistriflimide $[(CF_3SO_2)_2N]^-$, or a dicyanamide ($DCI^-$) anion.

11. The battery cell of claim 1, which when operating, exhibits less growth of lithium or sodium dendrites relative to a corresponding battery absent the presence of the nanoparticles, graphene, or MXene particles.

12. A battery comprising at least two battery cells of claim 1.

13. An electronic device comprising the battery cell of claim 1 or the battery of claim 12, wherein the electronic device is selected from the group consisting of an electric vehicle, a cell phone, a computer, a tablet computer, a portable media player, a digital music player, a camera, an e-reader and a video player.

* * * * *